(12) United States Patent
Weik, III et al.

(10) Patent No.: US 8,831,970 B2
(45) Date of Patent: *Sep. 9, 2014

(54) VIRTUAL ATTENDANT SYSTEM AND PARKING MANAGEMENT SYSTEM

(76) Inventors: Martin Herman Weik, III, Stanardsville, VA (US); David Fields, Alexandria, VA (US); Gary Altenberg, Buffalo, MN (US)

( * ) Notice: Subject to any disclaimer, the term of this patent is extended or adjusted under 35 U.S.C. 154(b) by 139 days.

This patent is subject to a terminal disclaimer.

(21) Appl. No.: 13/598,142

(22) Filed: Aug. 29, 2012

(65) Prior Publication Data

US 2013/0117078 A1    May 9, 2013

Related U.S. Application Data

(63) Continuation-in-part of application No. 11/228,395, filed on Sep. 19, 2005, now abandoned, which is a continuation of application No. 10/303,025, filed on Nov. 25, 2002, now Pat. No. 6,945,303, which is a continuation-in-part of application No. 10/131,029, filed on Apr. 25, 2002, now Pat. No. 7,146,345, which is a continuation-in-part of application No. 09/644,901, filed on Aug. 24, 2000, now Pat. No. 6,484,784, application No. 13/598,142, which is a continuation-in-part of application No. 12/930,437, filed on Jan. 6, 2011, now Pat. No. 8,479,258.

(60) Provisional application No. 61/741,111, filed on Jul. 10, 2012, provisional application No. 61/575,833, filed on Aug. 29, 2011.

(51) Int. Cl.
*G07B 15/02*    (2011.01)
*G06Q 10/00*    (2012.01)
*G06Q 20/00*    (2012.01)

(52) U.S. Cl.
USPC .................................. 705/13; 705/22; 705/28

(58) Field of Classification Search
None
See application file for complete search history.

(56) References Cited

U.S. PATENT DOCUMENTS

| 1,617,440 | A | 2/1927 | Duncanson |
| 3,604,898 | A | 9/1971 | Magnusson |

(Continued)

FOREIGN PATENT DOCUMENTS

| DE | 37 15 314 A1 | 11/1988 |
| DE | 298 23 240 U1 | 5/1999 |

OTHER PUBLICATIONS

Bajic et al., "Auto-ID mobile information system for vehicle life cycle data management", Systems; Man and Cybernetics, 2002 IEEE International Conference on; Date of Conference: Oct. 6-9, 2002, vol. 4.

*Primary Examiner* — Mussa A Shaawat
(74) *Attorney, Agent, or Firm* — Michael J. Foycik, Jr.

(57) ABSTRACT

A control and management system for defined areas, employs a card reader, vehicle sensing loop detectors and electric eyes, entrance door sensors and operators, truck securement devices, cameras, a control system with memory, and a wireless connection or internet/intranet connection, is provided to produce event log documentation. The event information is readily accessible by management or supervisory personnel, to see all of the recorded information concerning a specified event. Thus, an event can be readily reconstructed after the fact, using all available sensors and other information relevant to a manager or supervisor. An alert can be issued whenever an abnormal or unauthorized event occurs during operations. A QR code reader can be provided which communicates with the system to enable a person carrying the cell phone to scan QR codes at specified locations or on specified items or vehicles.

12 Claims, 29 Drawing Sheets

(56) References Cited

U.S. PATENT DOCUMENTS

| | | | |
|---|---|---|---|
| 3,989,932 | A | 11/1976 | Koerner |
| 4,147,197 | A | 4/1979 | Bailey et al. |
| 4,785,293 | A | 11/1988 | Shearer et al. |
| 4,794,973 | A | 1/1989 | Perisic |
| 4,848,522 | A | 7/1989 | Wolf |
| 4,953,608 | A | 9/1990 | Larsson |
| 5,022,452 | A | 6/1991 | Burrell |
| 5,034,739 | A | 7/1991 | Gruhl |
| 5,070,442 | A | 12/1991 | Syron-Townson et al. |
| 5,228,492 | A | 7/1993 | Jou |
| 5,243,735 | A | 9/1993 | Obrien, III |
| 5,245,879 | A | 9/1993 | McKeon |
| 5,270,629 | A | 12/1993 | Hsieh |
| 5,323,151 | A | 6/1994 | Parsadayan |
| 5,332,021 | A | 7/1994 | Todd et al. |
| 5,355,927 | A | 10/1994 | McKeon |
| 5,386,891 | A | 2/1995 | Shea |
| 5,414,624 | A | 5/1995 | Anthonyson |
| 5,540,269 | A | 7/1996 | Plumer |
| 5,542,460 | A | 8/1996 | McKeon |
| 5,557,887 | A | 9/1996 | Fellows et al. |
| 5,576,581 | A | 11/1996 | Iannuzzi et al. |
| 5,577,541 | A | 11/1996 | McKeon |
| 5,605,185 | A | 2/1997 | McKeon |
| 5,634,507 | A | 6/1997 | Kwoka |
| 5,673,514 | A | 10/1997 | McKeon |
| 5,706,875 | A | 1/1998 | Simon |
| 5,729,101 | A | 3/1998 | Richmond et al. |
| 5,740,050 | A * | 4/1998 | Ward, II ................. 705/418 |
| 5,743,320 | A | 4/1998 | McKeon |
| 5,828,302 | A | 10/1998 | Tsutsumi et al. |
| 5,832,665 | A | 11/1998 | Miller et al. |
| 5,893,234 | A | 4/1999 | McKeon |
| 5,956,081 | A * | 9/1999 | Katz et al. ................ 348/163 |
| 6,079,162 | A | 6/2000 | Hein |
| 6,082,433 | A | 7/2000 | Vafaie et al. |
| 6,229,455 | B1 * | 5/2001 | Yost et al. ................ 340/943 |
| 6,323,761 | B1 * | 11/2001 | Son ........................ 340/426.35 |
| 6,329,930 | B1 | 12/2001 | Parsadayan |
| 6,388,559 | B1 | 5/2002 | Cohen |
| 6,522,352 | B1 * | 2/2003 | Strandwitz et al. ......... 348/211.2 |
| 6,715,586 | B1 | 4/2004 | Shubin |
| 6,945,303 | B2 | 9/2005 | Weik, III |
| 7,065,140 | B1 * | 6/2006 | Ritter et al. .............. 375/240.25 |
| 7,104,447 | B1 * | 9/2006 | Lopez et al. ................ 235/384 |
| 7,113,090 | B1 | 9/2006 | Saylor et al. |
| 7,138,912 | B2 | 11/2006 | Fitzgibbon et al. |
| 2003/0014316 | A1 | 1/2003 | Pratt et al. |
| 2003/0081747 | A1 | 5/2003 | Ahlstrom et al. |
| 2003/0084328 | A1 | 5/2003 | Tarquini et al. |
| 2003/0112335 | A1 * | 6/2003 | Strandwitz et al. ......... 348/211.2 |
| 2003/0193393 | A1 | 10/2003 | Ford |
| 2003/0197188 | A1 | 10/2003 | Watatani et al. |
| 2004/0172283 | A1 | 9/2004 | Vanderveen et al. |
| 2005/0138111 | A1 | 6/2005 | Aton et al. |
| 2008/0271109 | A1 | 10/2008 | Singh et al. |
| 2009/0216876 | A1 | 8/2009 | Hsieh et al. |
| 2010/0201482 | A1 | 8/2010 | Robertson et al. |
| 2010/0289661 | A1 | 11/2010 | Styers et al. |
| 2010/0328104 | A1 | 12/2010 | Groft |
| 2011/0084840 | A1 | 4/2011 | Mercier et al. |
| 2011/0084855 | A1 | 4/2011 | Simon |
| 2011/0260851 | A1 | 10/2011 | Richman |
| 2012/0062395 | A1 | 3/2012 | Sonnabend et al. |

* cited by examiner

VIRTUAL ATTENDANT
MANAGEMENT SYSTEM

VIRTUAL ATTENDANT SYSTEM AND PARKING MANAGEMENT SYSTEM

CONTINUING DATA

This application is a continuation-in-part of, and claims the priority of U.S. patent application Ser. No. 11/228,395 by inventor Martin Herman Weik, III, entitled "Intruder, theft and vandalism deterrent management system for controlling a parking area," now pending, and which in turn is a Continuation of Applicant's prior U.S. application Ser. No. 10/303,025, filed on Nov. 25, 2002 and now U.S. Pat. No. 6,945,303, and which is also a continuation-in-part of Applicant's prior U.S. patent application Ser. No. 10/131,029, filed Apr. 25, 2002 now U.S. Pat. No. 7,146,345, and which is also a continuation-in-part of U.S. patent application Ser. No. 09/644,901, filed on Aug. 24, 2000, now U.S. Pat. No. 6,484,784 issued on Nov. 26, 2002. This application also is a Continuation-in-part of and claims the priority of U.S. patent application Ser. No. 12/930,437, filed on Jan. 6, 2011 by inventor Martin Herman Weik, III, entitled "GARAGE MANAGEMENT SYSTEM", now U.S. Pat. No. 8,479,252 and which is also expressly incorporated herein by reference thereto. This application also claims the priority of provisional patent application No. 61/575,833 filed Aug. 29, 2011 to inventor Martin H. Weik, III entitled "MANAGEMENT AND CONTROL SYSTEM FOR A DESIGNATED FUNCTIONAL SPACE HAVING AT LEAST ONE PORTAL", and which is also expressly incorporated herein by reference thereto. This application also claims the priority of provisional patent application No. 61/741,111 filed Jul. 10, 2012 to inventor Martin H. Weik, III entitled "VIRTUAL ATTENDANT SYSTEM AND PARKING MANAGEMENT SYSTEM USING QR CODES", and which is also expressly incorporated herein by reference thereto.

The contents of each of the above-identified parent applications are hereby expressly incorporated herein by reference.

FIELD OF THE INVENTION

The present invention relates to a management and control system for a designated functional space having at least one portal. Such designated spaces can include, for example, shipping and loading docks, fire stations, homes, offices, parking areas and campgrounds.

BACKGROUND OF THE INVENTION

A door, opening, or portal between defined areas address the human need to satisfy different human concerns. For instance, the human concerns that are satisfied in a designated area called a bathroom are different than the concerns satisfied by an area defined by the term "kitchen", "bedroom," etc. The commonality of concerns that are satisfied in a particular designated space create common designations such as loading dock, fire station, garage entrance or garage exit, etc. Each designated space and its possibility of satisfaction of the concerns it is designed to address has within its possibilities inherent transparent functionality and the possibility for breakdown and malfunction where operational transparency breaks down.

To a great degree the transparent functionality of a designated space as well as the breakdown of the transparency is predictable. Because both transparency and breakdown are predictable to masterful practitioners who utilize the space, tools can be created to help manage the inevitable predictable outcomes. Furthermore, often there are multiple practitioners who utilize a space. The tools can then be designed to satisfy the concerns of different groups of practitioners. Typically, specialized tools have evolved separately to satisfy different concerns. The art of successful integration then is developing tools that satisfy concerns across a wide network of practitioners who operate in a defined space.

In previous applications and issued patents by this inventor, there has been examined a building's garage portal as an example of an opportunity to address multiple concerns for a designated space.

A specific area of interest is, for example, the shipping industry. Here there are a myriad of participants, each with their individual and sometimes overlapping concerns. Security officers deal with theft, service technicians deal with dock equipment malfunctions, shipping schedulers manage the details of shipping and deal with the logistics of moving packages and items, the public including those ordering goods wish to know where their shipment is, and dock personnel load, unload and sometimes lose or even damage goods they are handling. Systems such as bar code or RFID technology have evolved to track shipments, GPS to track the trucks, and access cards and secure locked and gated areas have evolved to address particular concerns of the participants noted above.

That is, individual and piecemeal solutions have been provided to deal with the individual concerns of the individuals mentioned above. Once any malfunction, error, mishap, theft, vandalism, crime, or other unusual event occurs, it is not possible to successfully reconstruct the available information in a readily useful and readily available form as the information is often located on different platforms that have evolved to address the different domains of concern.

The problem with the individual approach to solutions is that it lacks the coherency and advantages that might be available in well-conceived inventive integrated solutions. For instances of such piecemeal solutions, as a first example, the safety eye on the dock bay door that is designed to address door safety issues is not integrated into the camera system. A video recorder might take pictures based on motion or may constantly be generating mountains of useless data that has to be examined at length if a breakdown is identified.

In a second example, a shipment security officer is interested in the integrity of the shipments. Typically, the shipping terminal puts a device called a security seal that cannot be removed without its destruction, and which is installed on the truck doors in addition to a removable lock. However, there is no associated data when such security seal is broken, and thus the value of the security seal is limited. The safety eye on the dock door does not activate the cameras and there is no touch pad screen on a portal manager on which to enter the employee ID and security tag number that can track the event of opening the cargo door or an APP on a smartphone that connects the shipment and terminal to a video of the seal breaking.

Turning attention to the fire station industry, here there can be a myriad of participants, each with their individual and sometimes overlapping concerns. Security officers deal with equipment theft and station security, service technicians deal with door and fire equipment malfunction, dispatch schedulers deal with the assigning equipment to various alarms; the public may show up at stations randomly, and fire station personnel must be trained, managed and their presence recorded for payroll and assignment functions. Thieves and rogue employees might steal from unattended firehouses when personnel are responding to alarms and emergencies. Various piecemeal solutions to such concerns include systems such GPS to track the trucks, access cards issued to fire personal to record or control access, doors which may be transmitter controlled, and secure areas within the station can be locked and/or gated. Video recorders and security alarm systems may be installed to record ongoing activities. However, this information is not accessible by event, and is not readily available for checking by managers or supervisors in a manner that gathers all available data into a conveniently accessible form.

As a third example of a need in the prior art, the safety eye on the station bay door that is designed to address door safety issues is not integrated into the camera system or intruder detection system. A video recorder might take pictures based on motion or is constantly generating mountains of useless data that has to be looked at if an intrusion event is identified. Other information is similarly useless, and is often unrecorded and unavailable after the fact.

As a fourth example of a need in the prior art, an outside safety loop that holds a portal door open against its timeout is not integrated into a system where the system can notify an administrator that a vehicle is blocking the exit door to the fire station, parking garage, etc. or that someone is loitering outside a portal as detected by a motion/presence detector and a message is not currently sent to a guard or security officer and in high security cases actually block the portal door from opening. There is in the prior art no way to define high, medium or low security run profiles that defines different operational formats under different security threat levels or time periods.

As a fifth example of a need in the prior art, a camera that is constantly recording will not allow individual frames to be associated with specific events. Station bay doors typically can open on individual ceiling pull command, by push button station either at the door or at the station manager desk and or on "alarm." The doors will then often close on timer command after the fire vehicle has exited. Not uncommon is the circumstance where the safety eye is blocked, safety loop malfunctions or other event occurs where the door fails to close which leaves the station open and vulnerable to theft and vandalism. There exists a need to set an alert parameter to email, text message, or otherwise alert a fire station or security officer that a door has failed to close so specific action can be taken to address the problem.

As a sixth example of a need in the prior art, in existing rental car facility arrangements, rental cars exit the rental lot by a typical system having a barrier gate (e.g., a gate arm, "tiger teeth" plate barrier, or similar devices or combination) which is opened by an employee checking the contract and documents at the gate, or by a ticket issued at the counter which allows a single use within a determined time window through an un-manned gate. Also typically seen in such existing rental car facilities are CCTV cameras at various locations around the exit which record 24/7 to a VCR or hard-drive based recording system, with no correlation between the "event" (car exiting) and the recording. Current systems to monitor vehicle condition is handwritten notes on the contract or a small paper card on which the agent or renter marks the approximate location of any damage.

Any missed damage at checkout leads to either trying to prove when damage occurred, dealing with customers trying to pass off damage caused while the car was in their possession as "not their fault", or, in the absence of any proof, paying for the repair out of profits.

Another problem is outright theft of vehicles. Boards can be placed over tiger teeth and driven over, exit personnel (sometimes third-party hired guards) might be "in on it" and open the gate, or leave their post at a certain time. Equipment breakdowns that have not been noticed yet leave gaps in the security envelope around the lot.

The gate equipment is subject to tremendous stress due to the high volume of vehicles exiting through an exit typically having one to three lanes. Many locations clear hundreds of rental cars per day. In addition, shuttle buses, car carriers, tow trucks, and delivery trucks require special consideration regarding the exiting sequence to prevent damage to the equipment or vehicle.

A seventh example involves the camping industry. KOA and other campgrounds typically control access to the campground and its amenities which can include swimming pools, gyms, tennis courts, hiking trails, lake beaches, etc. by issuing a vehicle access card to the camping "family". It is not uncommon for the access cardholder to pass the card to a "friend" who can then drive into the campground and enjoy its amenities for free or instruct the "friend" to follow closely and tailgate into the campground. The campground owner loses revenue and provides "free" services. What is needed is a combined access card, gate control and camera image system to event log the coming and goings of the cardholders. Since the card is associated with a particular vehicle, an event log that combines card usage data, single use or tailgate signal data and image data into an event log would allow campground personnel to easily spot the cheaters and trespassers.

Access Control

The traditional pathway into a facility for over a millennium has been by inserting a "key" into a lock of some type that allows a door or barrier to be opened if the key "fits". Although the lock industry has evolved over the years to many different types, the traditional lock and key remains the essential components.

More recently, "key" card access systems have become commonplace where the card is read electronically and if the card is in the "authorized" (it fits) category of the database, a signal is sent to release a latch or bolt or open a motorized door/gate/barrier.

Biometric systems read fingerprint or eye scan data into a system where an analysis against a preauthorized database allows or disallows access. The biometric data (key) has to fit the database (lock).

Each of these systems has their own histories of capabilities and costs required to construct and maintain the system. Biometric systems, although proven to create a more secure system, have a much greater cost to construct and administer. In all these systems, the "user" is he who possesses the "key." "Security" is determined by possession or loss thereof and the robustness (pick proof capability) of the mechanism.

The problem arises when numerous persons need access to multiple doors or entry points in numerous buildings and/or numerous locations in a facility. Keeping inventory and security over hundreds or keys or key access cards and knowing where they fit becomes an overwhelming—and therefore expensive—management problem. The popular TV show in the 80's One Day at a Time showed the building engineer/maintenance man "Snyder" with a ring of what could have been over 50 keys. In reality, the problem is even greater when there is a roving maintenance team responsible for numerous buildings such as truck maintenance and garage facilities for a company such as Verizon, for example, or any other organization with numerous and scattered facilities. Additionally, if the keys or keycards are lost or stolen, security is compromised and it can cost many thousands of dollars in lock replacement and access card reprogramming costs. The cost of biometric solutions mentioned above makes this solution impractical in many applications.

In an issued U.S. Pat. No. 6,945,303 to Martin H. Weik III, one of the inventors of the subject application, as well as in pending U.S. Ser. No. 61/575,833 filed on Aug. 29, 2011, pending Ser. No. 12/930,437 filed on Jan. 6, 2011, and pending Ser. No. 13/134,698 filed on Jun. 14, 2011, there is shown an access system based on a credit card, driver's license or other ID with readable media that would normally be carried by the user which would be read into a system at a point of authorization that would allow access at other points. The readable media was the "key" inserted into the system database "lock". In the aforementioned application U.S. Ser. No. 13/134,698 this inventor disclosed an access system that was internet based and included an event logging system to include the capture of video, access card and door subsystem event data into a single, accessible database to include a task management event logger to aid in facility management. This application expands on and combines these inventions to allow a device "normally carried by a user" (a cell phone) to be the interface device that allows the user to access a single or plurality of access points in single or a plurality of access points without the need to carry inventory and keep secure numerous keys or access cards.

SUMMARY OF THE INVENTION

From the foregoing, it is seen that it is a problem in the art to provide a device meeting the above requirements. According to the present invention, a device and process are provided which meets the aforementioned requirements and needs in the prior art.

As noted above, the individual and piecemeal solutions previously provided to deal with the unique concerns of the individuals mentioned above, are useful separately. But, these uses are merely piecemeal and do not make use of all of the available information in a form that is both convenient and useful to a manager or supervisor trying to reconstruct an event after the fact. Nor do they cross connect, which taken together allow for the sum to be greater than the parts. Once any malfunction, error, mishap, theft, vandalism, crime, or other unusual event occurs, the prior art devices and systems do not make it possible to successfully reconstruct the available information in a readily useful and readily available form. In addition, the piecemeal systems are much easier to defeat leaving the "secure" area much less secure. For instance, a magnetic door closed sensor can easily be defeated by placing a magnet on the sensor. However, when the manual chain hoist switch is integrated into the security program as an "event" to be monitored on a day/time schedule, anyone opening the door via the manual chain hoist could result in a security threat log event and notification.

By the present invention, a system and devices are shown which enable use of the information surrounding any of the identified events. Examples of such events are as noted above, and many more such events can be identified by users. The system of the present invention is flexible and adaptable to accommodate these needs.

For example, if a theft occurs or there is a lost package, it would be useful for a manager or supervisor to be able to check each event (examples include unloading, opening of a door or portal, a malfunction report, or a timeout event, among many other possible types of events) to see all of the available information surrounding that specific event. Such available information is that provided by the sensors (presence sensors for vehicles, gate and door sensors showing positions thereof), as well as frames of video for that specific event). Thus, an unloaded package and the dock personnel handling that package will be visible in video frames at the "unloading" event, and may also be visible during "intruder" events, "malfunction" events, "scanning" events where bar codes of packages are scanned, along with access card data, etc.

Referring to the first example mentioned in the Background of the Invention relating to piecemeal solutions used in the prior art, by the present invention a camera system is advantageously provided and used, and integrated into a system, such that it is controlled by the dock door being "not closed" and "safety eye activated" or perhaps scanned so that it would generate data only when activities relating to loading or unloading into a particular vehicle are actually occurring.

Referring to the second example mentioned in the Background of the Invention relating to piecemeal solutions used in the prior art, by the present invention a camera system is advantageously provided and used, and integrated into a system, such that it is controlled by or activated by any of the various devices that control the portal equipment. For instance: Since the shipping seal is located on the truck rear door and the truck is backed up to the dock, anyone cutting the seal would be by necessity also be breaking the door safety eye beam if the doors are motor operated. A camera that was triggered by the safety eye would then capture the seal cutting event.

Thus, various other data is associated by the present inventive system relating to this event, such as vehicle sensor data, shipping door position, other doors' positions, and video frame data, etc. These items of information are all stored in such a way that they can be associated with specific events, and reports can be generated and the data can be reviewed by a manager or supervisor for such events. Thus, there is associated data when such security seal is broken, and thus the value of the security seal is greatly enhanced.

Referring to the third example mentioned in the Background of the Invention relating to piecemeal solutions used in the prior art for fire stations, by the present invention a camera system is advantageously provided and used, and integrated into a system, such that it is controlled by or activated during events such as the station door being "not closed" and "safety eye activated" and would generate data only when an intrusion event is actually occurring. This information is provided by the present invention as information related to the specific event in question. The camera "control" can take the form of the server or controller asking the camera for data based on the time-stamped event data from the system devices. Since camera memory has evolved with SD card capability, a multi-gigabyte card can record continuously for weeks. The controller's times-stamped events, become the basis for a server request to the camera for video data during a defined time period even "before" and "after" the time-stamp event occurs. Furthermore, this allows the video "events" to be labeled and sorted by type. For instance, reports can be run by type: tailgater, card access, safety eye activation, chain hoist engagement, pull switch activated, safety loop timeout, etc. In a multi-facility system, reports can be run by type from all or some of the facilities during all or specified time periods. Custom specific reports can be created to address the concerns of security, operations and maintenance personnel.

In addition, the present invention provides a system that immediately e-mails and/or text messages a concerned participant such as the station manager or supervisory personnel, when specified types of events occur or fail to occur within a defined time window, or in a proper sequence.

Referring to the fourth example noted hereinabove of a need in the prior art, a safety loop that holds the bay door open against its timeout can by the present invention be integrated into a vehicle presence detector, and optionally can also use RFID technology that would be able to determine that a piece of equipment is "home" and ready for dispatch; and all this information is associated with individual recorded events.

Referring to the fifth example of a need in the prior art, a camera that is constantly recording will by the present invention allow individual frames to be associated with specific events. If integrated into the door controller, the camera would capture door vehicle impacts as noted in one or more of this inventor's previous patent applications and patents identified hereinabove, and can also work to detect intruders in combination with the safety eye activation. The same camera integrated into the station operation platform according to the present invention would also enable remote verification that a piece of equipment is "home" and ready for use, would capture intruder events, and allow remote operation of door equipment on camera which would allow safe overriding of safety controls as is specified in UL specifications. Further, station bay doors typically can open on individual ceiling pull command, by push button station either at the door or at the station manager desk and or on "alarm" and by the present invention these events are recorded and associated with other available information for retrieval later in a convenient and readily accessible form. Likewise, the doors will then often close on timer command after the fire vehicle has exited, and not uncommon is the circumstance where the safety eye is blocked, safety loop malfunctions or other event occurs where the door fails to close which leaves the station open and venerable to theft and vandalism. In the present invention all of this information is available readily and conveniently associated together by recorded events.

An example of an apparatus and system related to the foregoing and which can be used in the present invention is a commercial embodiment which is known as SmartDoor System model SDS-0400™, iPortal™ Manager, and which in combination with the teachings of the present invention addresses the concerns of parking managers, parking attendants, overhead door service technicians, emergency fire and rescue, parking patrons, building engineers, building owners, building managers and security officers. Each activity that occurs in the portal area is broken down into its individual components and then parsed into a data base where it can be reconstructed in report form so as to address the individual concerns of the designated area practitioners noted above. The above-noted iPortal™ Manager also is designed to switch into different operational formats in direct response to commands or circumstances as sensed by its network of sensors and its program. In the event of multiple signals or commands for simultaneous different run characteristics, the system responds based on a hierarchy determined by its program. This is standard "state machine" technology that is well understood by developers and programmers dealing in the art of motion control.

Referring to the sixth example of a need in the prior art, the controlled exit system for a rental car facility according to the present invention solves the aforementioned breakdowns in existing systems by adding accountability, data logging, equipment monitoring, and communication to a system that typically lacks all of these.

The controlled exit system envisioned by the present invention comprises: one or more high resolution cameras (IP or similar), the iPortal™ Manager, the gate/barrier system, and the sensors and control inherent to the gate/barrier system and a broadband connection to the internet and system server.

The present invention allows for car rental businesses to shift more vehicle damage costs to renters using the time-stamped, search-able data logs with high resolution attached images to more accurately assess the condition of the car as it exited, which can then be compared to the returned condition. A hand-held tablet computer with W-Fi connection to the custom server software can instantly bring up high resolution video of car leaving the lot, making it easy to see what condition the car was in as it left the lot. This would eliminate the renter from arguing about when the damage occurred. A second set of cameras installed at the entrance to the lot would record the condition as the car was returned, eliminating human error or inattention from the process. This benefits the customer's peace of mind regarding scratch and dent scams. The rental company benefits from have verifiable proof of any damages done to the car.

The system also monitors, controls, and notifies appropriate personnel of any breakdowns, failures, or tampering of the barrier and sensor system, in real-time via electronic communication, text message, email, SMS, or through a sounder, light or buzzer controlled by the SDS-0400IP™ panel. Logs of sensor activations, along with the photo records, simplifies troubleshooting of problems, including intermittent failures normally requiring multiple costly service calls to repair technicians. Such diagnostics can help onsite personnel repair simple problem themselves, reducing security-compromising downtime.

Through signal monitoring and analysis, the iPortal™ Manager panel detects and notifies if more than one vehicle exits during a let-out, eliminating vehicles from being "waved through" or otherwise leave the lot without proper verification. Each vehicle that is sensed that exits without proper verification is logged and data captured and the iPortal Manager™ instantly notifies the manager, security, and/or other appropriate personnel. Eyewitness reports are notoriously unreliable, existing CCTV systems are unwieldy and slow to use, typically have very poor image quality, thus increasing the time to gather license plate number, vehicle description, and driver descriptions to give to law enforcement in order to recover the vehicle. In these situations time is a critical factor, and with the iPortal™ Manager on duty and with the management system of the present invention an operations or security manager can have high quality pictures of the car and driver in his email in-box long before reports of the theft gathered from daily inventory logs can make it to him/her from the other personnel. This added, high quality, timely information should prove invaluable to the speedy recovery and prosecution of thefts.

This system also allows for verified, times-tamped, photographed, contract linked unmanned let-out, reducing staffing needs and cost, especially during off hours. Entering a contract number into the device initiates a let out procedure which can be either fully automated or verified and egress granted by an agent located at the rental counter or office.

Implementation of the Rental Car Facility Management System of the Present Invention:

Upon a vehicle entering the gate exit area, a loop, motion, or other vehicle sensor signals to the iPortal™ Manger device that a vehicle is present. The Manager communicates through LAN, serial or direct control to the camera or cameras to begin capturing images at a predetermined frame rate or create a video clip. This can continue until the sensor indicates that the car is no longer present, or alternatively can continue for a predetermined period of time.

Manned Locations:

A car rental agent would enter contract number into the iPortal Management System device via touchscreen display or other terminal, reader, barcode scanner or other connected input device connected to the iPortal™ Manager server or data storage device through the LAN or internet. This then ties the let-out event to the rental contract, and to the set of pictures, time-stamped and available for review.

The car rental agent then selects the type of let-out from a list: rental, delivery, contractor, vehicle maintenance, personal car, airport bus, etc. This creates a search-able log of all exit events, search-able by time, type, contract number. Any different types of let-outs can be defined and tracked by the system. An RFID or other uniquely identifiable readable device on a customer shuttle bus would open the gate and also be tracked into the system.

After data is entered, the iPortal™ Manager device opens the barrier system, continuing to record until the vehicle has cleared the gate and the gate has returned to the secure position. Or, as noted earlier, the server would grab the video data during the "event" time window.

Through the complete monitoring of sensor signals, the iPortal™ Manager device can determine if more than one vehicle has exited, triggering notification. Equipment breakdowns or signal anomalies are detected and notifications immediately sent, reducing damages to vehicles and equipment such as tire shredding by poorly performing tiger teeth.

Through automatic signal analysis, the iPortal™ Manager can detect multiple types of faults, notify as needed, and disable equipment until repaired.

Manual control is possible in some fault conditions to allow equipment to be run with sensor faults. This is not the case with current control designs.

Un-Manned Exit:

A renter enters a contract number on a touchscreen of the iPortal™ Manager device or uses another connected input device. An agent at a second terminal remotely located verifies the contract number and initiates let-out as in manned exit, and can view high resolution video feed as the renter exits to verify the process. Alternately, the system can forward the contract number let-out request to the exit lane(s) barrier controller memory data base which would allow the egress to occur automatically when the security conditions are met.

Non-renters can be let out by same process, by entering for instance a "0" to initiate the process or by selecting from a list of authorized exceptions. (preferred) which would allow reports to be generated by let-out "type".

Alternative Entry/Exit Method:

Permission to exit is granted at a rental office counter by a terminal that will generate a code using the let-out algorithm. This code can be set to be valid for a set amount of time and good for a single use. The code can be linked to the contract number, allowing for the same search-able, verified data as described above. The contractor then enters the code at the exit gate.

An entry lane or lanes preferably includes a terminal, touchscreen, card reader, bar-code scanner or similar data entry device, at least one or more cameras mounted such that as the car drives through, all sides are recorded, and a vehicle presence device. The renter would enter or scan an identifying contract number, a frequent renter card, or other unique identifier as was used to exit the facility originally. The server software would link the entering and exiting photo records together, time-stamped, and linked to the renter.

Alternately, an APP on a smartphone type device could scan the contract or vehicle barcode, QR code sticker and take the ingress event pictures which would be uplinked to the contract data file.

Referring to the seventh example: The campground access card allowance file can be linked to payment account data, uses per day restrictions, area restrictions or any other parameter allowed or disallowed by the system. Attempts to use the card inside its allowance or outside its allowance can generate event log data with imagery for immediate review by campground operator(s) and multiple facility operators can review multiple facility data from a single access point or points.

An access system is shown and described herein that is based on the combination of five technologies. There technologies are: an IP door/gate/barrier controller; QR codes; the Internet; a server; and a smart phone with a QR code scanning application. Additional specific equipment will be described within the text hereunder and the system according to the present invention is not limited by the aforementioned.

How the Present Invention Operates

A readable image, such as a QR code, is displayed near a door or access gate that is controlled by an IP door (access) controller. A user with a smart phone would scan the QR code with the aforementioned QR code scanning application. The QR code would contain information that directs the scanning application to connect to the access control center on the server through the smart phone's Internet capability. The access control center would check the database to determine if the user is authorized in the system. If the user is authorized and presented the proper credential, such as a PIN, the server would issue an open or access command to the IP door controller, such as the SmartDoor Systems, Inc's iPortal Manager SDS-0400IP. The controller would then activate a routine which would activate a lock release mechanism or provide an open command to the door motor operator. In this manner, access would be granted (or denied) at one or more access points at one or more facilities without the need of keys or keycards.

A more capable embodiment would have the access event be recorded into the access log and an IP camera would provide a picture or video of the access event. The picture or video would be transmitted to and compiled on the server for logging and review of the event as described in this applicant's earlier patent applications and issued patent as described hereinabove.

Further Refinements:

Image Missing or Damaged

In the event that the QR code or "image" is damaged, missing, or unreadable, an access administrator could email a new readable image to support staff that manages the portal related to the image in question for posting. If it is impossible or inconvenient to post a QR code, a code could be emailed to a colleague and the end user could then scan the image directly from the second user's smart phone thereby initiating the routine to gain access. Or the remote operations center could just open the door by the command protocol on his operations platform that is linked to the portal controller that must be opened as was described in the previously-mentioned pending patent applications and the aforementioned issued patent.

Once or Limited Use Access:

In a pay to park facility a customer could pre-purchase image codes assigned to a specific access point and make them available to clients (or himself) via mail, e-mail fax or any other conveyance where the client would present the image to an authorized agent such as a parking attendant who would scan the image via his smart phone or other scanning device which would be authorized into the system. Upon successful reading of the scanned image code, the client would be able to do one or more of the following: gain access, park free, park with payment from his on-line parking account, electronically pay for access, or be allowed to enjoy whatever privilege the holder is authorized to receive. A further embodiment would have a flat screen display panel located in visual range that would display the image read acknowledgement for both the "in" (access) and "out" (egress) event. The server could calculate the time lapsed and the resulting charges that accrued to the parking customer. The system could deduct and register the payment from the user's on-line parking account and display the transaction on the screen without the need to make payments in cash to the attendant who may or may not report the transaction, or make the payment in cash or credit card as determined by the system and displayed on the screen.

Dynamic/Digital Time-Sensitive Codes

If higher security is required, a dynamic, digital version of the QR code can be displayed through a digital display. This QR code will grant access to the system in a similar manner to the aforementioned static codes, but will include the timestamp encoded with the payload. Upon decoding the payload, the access control center would take this timestamp into consideration when denying or allowing access. If a pre-defined period of time has passed since the QR code's initial generation, access will be denied despite a user's credentials. The dynamic QR code could be updated periodically at pre-defined increments.

In the event that a digital display is not feasible, hard copies of the codes can be updated periodically to address security concerns. On-site technicians can print out these codes and display them as necessary.

On-Demand Payments

Upon scanning the QR code, an option for the user to pay via an online payment portal would be provided. Users can use this portal to make a payment with a credit card. Upon receiving notice that the payment was successful, the access control server will submit the command to grant the user access.

Internet Failure; Wireless Access

A local server with a wireless login can provide a local "hot spot" a user would log onto through his/her Smartphone's Wi-Fi connection. The local access controller can keep a log of all previous users who were authorized, and follow protocols to periodically scrub the database or to update it with a primary server-based data file when the connection is active. Since many uses are routine, access can be granted if it was granted previously from the locally based database.

Conclusion:

The present invention shows a system which overcomes the problems associated with keys, cards, and money and presents a way to manage the gaining of access to a plurality of scattered locations, tracks and logs those who have gained access, charges those who should pay and presents a universal way (for those with smart phones, which encompasses many persons already and in the future may include just about anyone) to have access granted or denied with nothing more than their smart phone that is becoming increasingly universal.

Other objects and advantages of the present invention will be more readily apparent from the following detailed description when read in conjunction with the accompanying drawings.

DETAILED DESCRIPTION OF THE INVENTION

Figure 1:
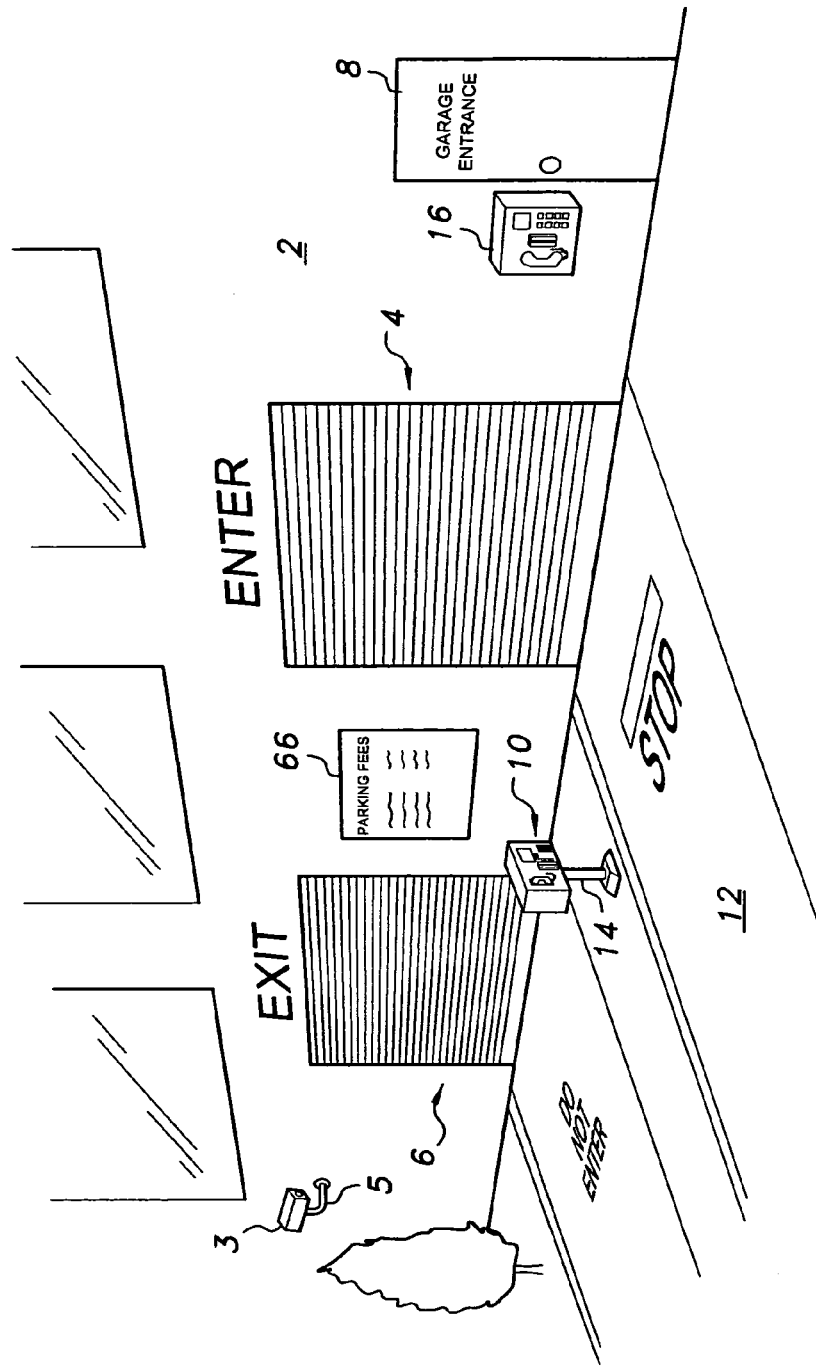
FIG. 1 is an outside perspective view of a parking garage entrance and exit area for vehicles and foot traffic.

FIG. 1 is a perspective view of a building 2 having an underground parking garage viewed from a street outside of the building 2. The building 2 includes a vehicle entrance 4 and a vehicle exit 6. The building 2 also includes an access door 8 for entering and exiting the parking garage by foot. A first customer terminal 10 is located alongside an entrance ramp 12. The first customer terminal 10 is mounted on a post 14, which is situated on a driver's side of the entrance ramp 12. A similar, second customer terminal 16 is provided on an exterior wall of the building 2 adjacent to the door 8. The customer terminals 10, 16 will be described in greater detail with reference to FIG. 3.

A first camera 3 is provided on a post 5 attached to the building 2. The first camera 3 has a view of the outside portions of the vehicle entrance 4, the vehicle exit 6 and the access door 8. The first camera 3 may take one image of the entrance and exit area of the building 2, or a series of images over a time period, as will be further described below.

Figure 2:
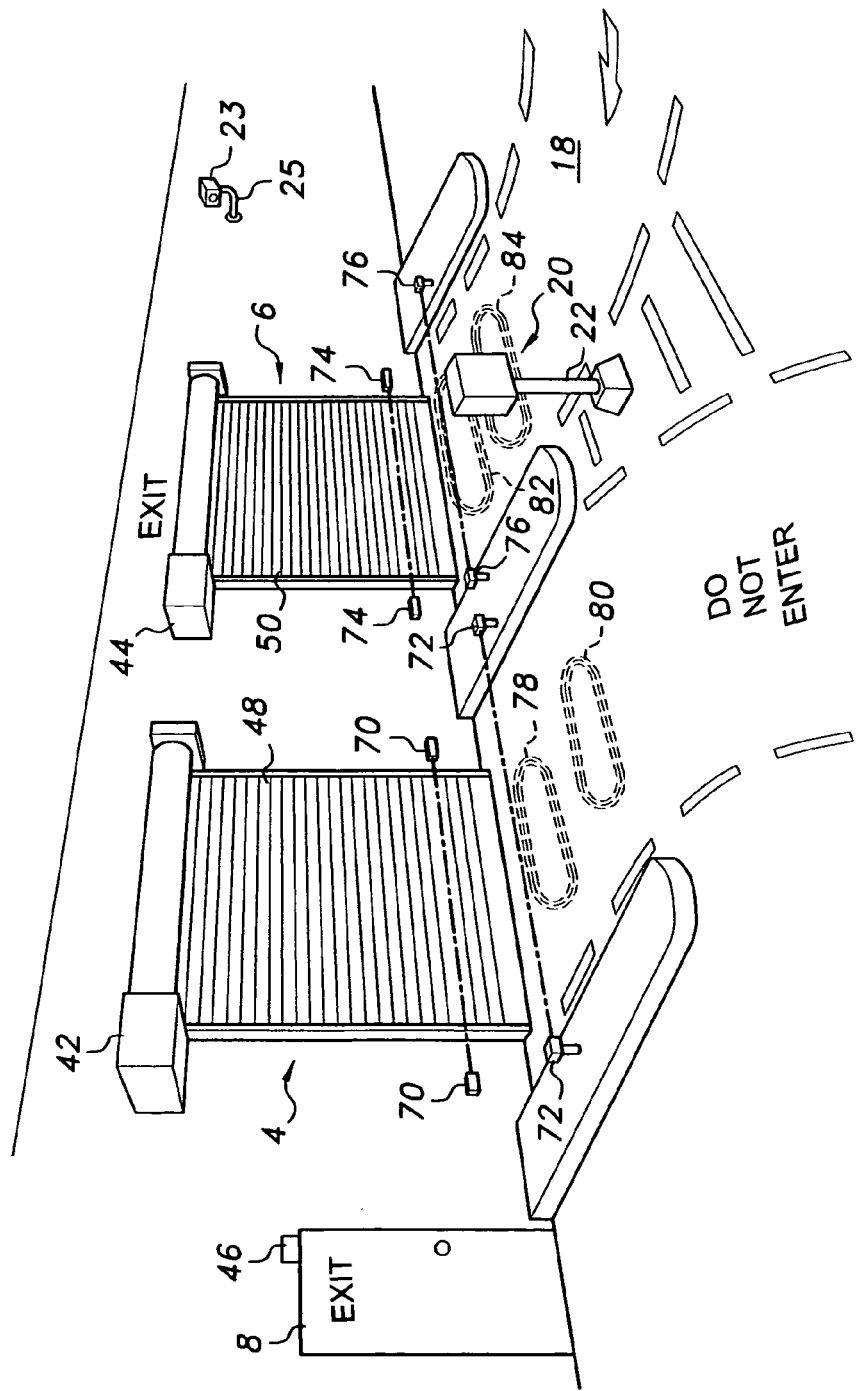
FIG. 2 is an inside perspective view of the parking garage entrance and exit area for vehicles and foot traffic.

FIG. 2 is a perspective view of the vehicle entrance and exit area taken from inside the parking garage. An exit lane 18 leads to the vehicle exit 6. A third customer terminal 20 is located alongside the exit lane 18. The third customer terminal 20 is mounted on a post 22, which is situated on a driver's side of the exit ramp 18.

A second camera 23 is provided on a post 25 attached to an interior wall of the building 2. While a post is mentioned, the camera 23 could instead be mounted on a wall, a pedestal, or the ceiling; all such variations are contemplated as being within the scope of the present invention. The second camera 23 has a view of the inside portions of the vehicle entrance 4, the vehicle exit 6 and the access door 8. The second camera 23 may take one image of the entrance and exit area of the building, or a series of images over a time period, as will be further described below.

Figure 3:
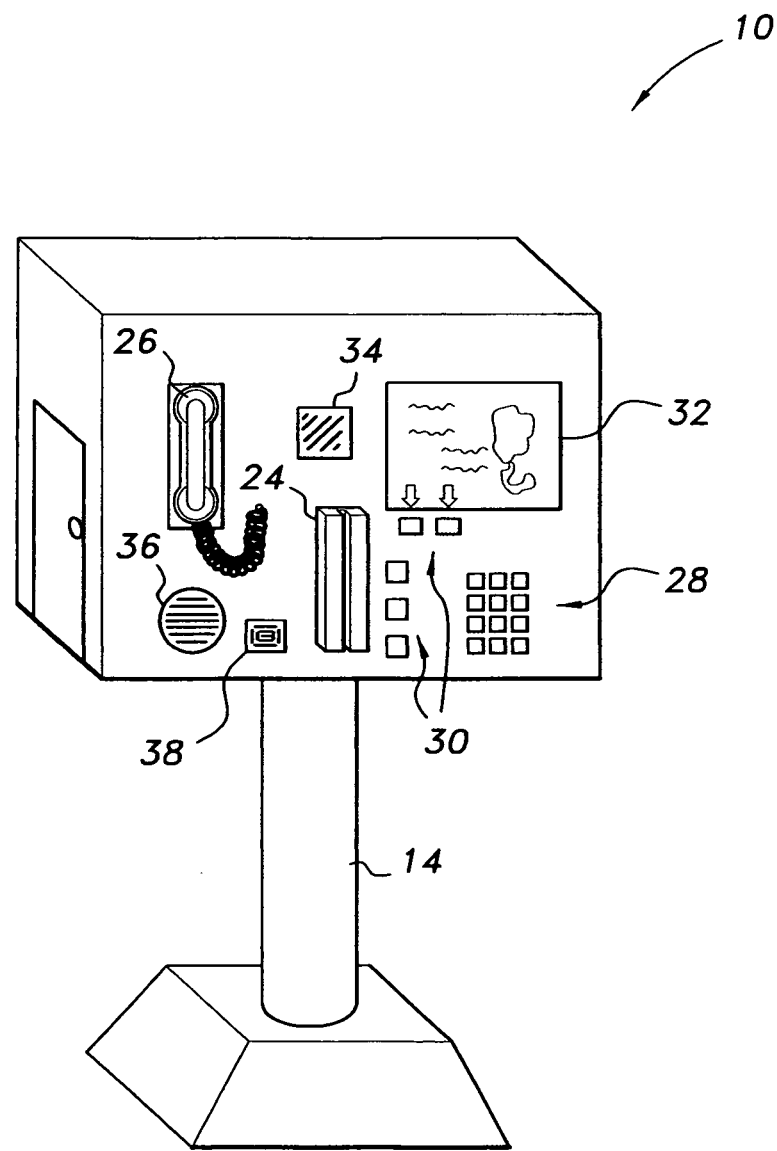
FIG. 3 is a front view of a customer terminal.

FIG. 3 illustrates a configuration for the first, second and/or third customer terminals 10, 16, and 20. Each customer terminal would include at least a card reader in the form of a pull through slot 24 (as commonly used in grocery store checkout lanes) or an insert/withdraw slot (as commonly used at pay gas pumps). The card reader could be used for reading one or more types of cards, such as a magnetic strip or bar code provided on a credit card, a driver's license, etc.

Additionally, the card reader can be a contact reader of a type now used for example by AmEx®, with gasoline credit cards at some gas stations, for keyless entry automobiles, and at metro stations in the Washington, D.C. area.

Further, each customer terminal could include a telephone handset 26 for voice communications, a numeric or alpha-numeric input keypad 28, a plurality of function keys 30, a video display 32, and a camera 34. Of course, the handset 26 could be replaced with a hands-free speakerphone, such as a speaker 36 and a microphone 38. Communication with the remote operator could also be by cell phone. Further, the keypad 28 and function keys 30 could be replaced with a touch sensitive graphics display provided on the video display 32, or a computer input to interface with a personal digital assistant (PDA) or laptop or cell phone.

Figure 4:
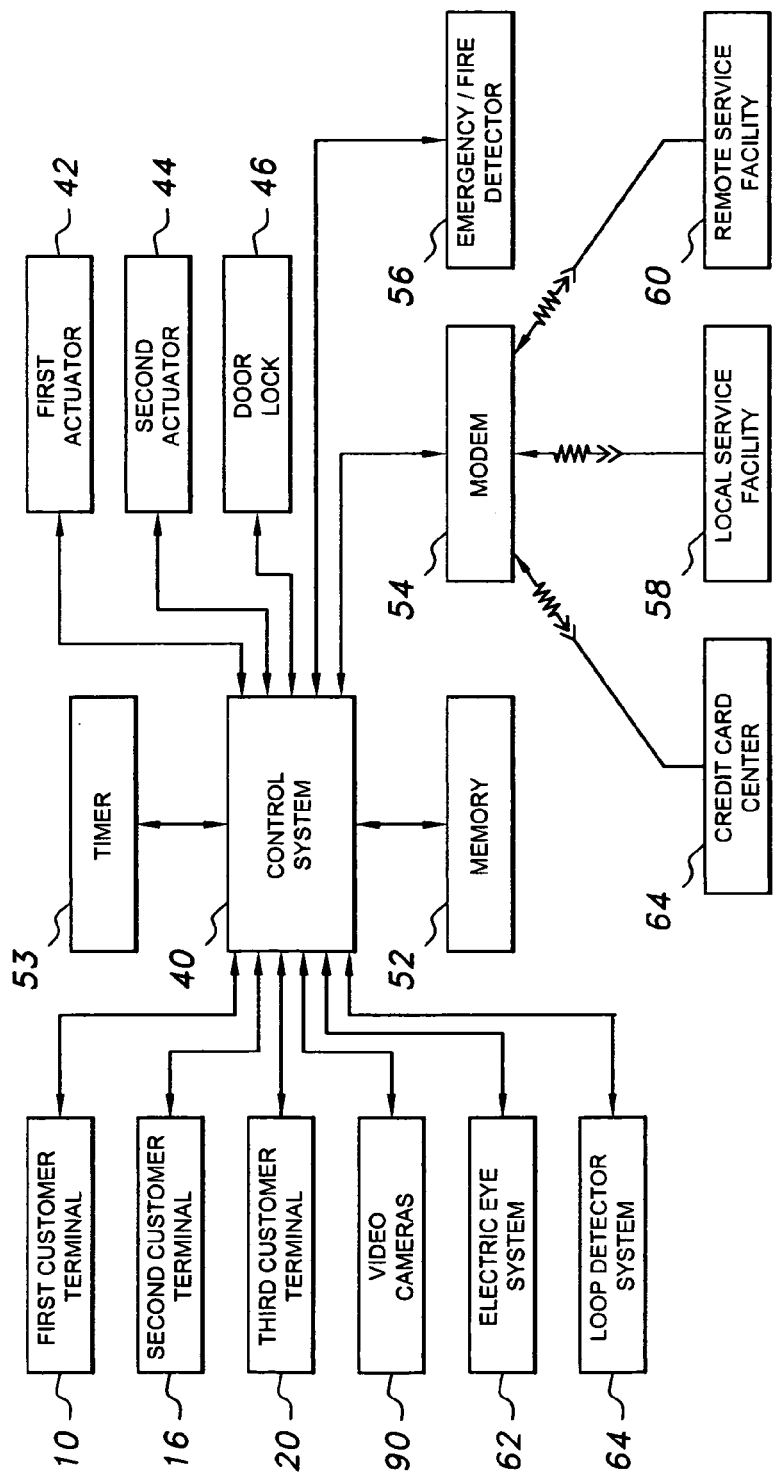
FIG. 4 is a block diagram illustrating an interconnection between various components of the parking area control and management system of the present invention.

FIG. 4 is a block diagram illustrating the interconnections between various components of the present invention. The first customer terminal 10, second customer terminal 16 and third customer terminal 20 are connected to a control system 40. The connections may be hardwired or wireless.

The controller 40 is also connected to a first actuator 42, a second actuator 44 and a door lock 46. The first actuator 42 controls opening and closing of a first gate or door 48, serving as a barrier to the vehicle entrance 4. The second actuator 44 controls opening and closing of a second gate or door 50, serving as a barrier to the vehicle exit 6. The door lock 46 controls the locking of the foot traffic door 8. For example, the door lock 46 could drive a solenoid for withdrawing a dead bolt, and hence unlocking the pedestrian door 8. Alternatively, the door lock 46 may be an electromagnet, which holds the door 8 locked when energized, and which releases the door 8 when de-energized.

As also illustrated in FIG. 4, a memory 52 and a timer 53 are connected to the control system 40. The memory 52 could be a hard drive integrated into, or in the proximity of, the control system 40, or alternatively could be a remote memory device, such as a memory space allocated/at a local personal computer or service provider connected to the control system 40 via a modem 54 over the Internet. Also, the timer 53 could be integrated into the control system 40.

An emergency/fire detector 56 is also connected to the control system 40. The emergency/fire detector 56 could be a collection of fire sensors and pull alarms located in the garage area. More preferably, the emergency/fire detector 56 is tied into a master management system of the building 2, and hence would signal trouble to the control system 40 under the circumstance of any emergency within the building 2. In an emergency condition, the vehicle barriers 48, 50 and door 8 could be held opened, as for a bomb threat, or could be held locked, in response to a child-abduction in the building 2.

A credit card center 64 may also be connected to the control system 40, directly or via the modem 54, as will be further discussed below. A local service facility 58 is connected directly to the control system 40, or connected to the control system 40 via the modem 54. The local service facility 58 could be manned a security person located onsite of the building 2, such as at a guard desk in the lobby of the building 2. Alternatively, or in addition, a remote service facility 60 could connected directly to the control system 40, or connected via the modem 54. The remote service facility 60 would be located offsite, and would service the parking garages of several different buildings 2.

As also illustrated in FIG. 4, a presence detector, such as an electric eye system 62, is connected to the control system 40. The electric eye system 62 includes one or more transmitter/receiver sets, arranged proximate the vehicle entrance 4 and/or exit 6. In FIG. 2 a first transmitter/receiver set 70 is located closer to the first barrier 48 of the vehicle entrance 4, as compared to a second transmitter/receiver set 72. Therefore, a vehicle or person entering via the vehicle entrance 4 will trigger the first transmitter/receiver set 70 prior to triggering the second transmitter/receiver set 72. Each transmitter/receiver set 70, 72 is located sufficiently high so that it is unlikely that a pedestrian will step over the light beam. Yet, each transmitter/receiver set 70, 72 is not located so high that the light beams will pass over a vehicle.

The electric eye system 62 may be embodied as an infrared light beam transmitter and receiver for detecting the passage of vehicles or people past the vehicle entrance 4. Of course, other types of electric eye systems may be employed to detect the passage of vehicles or people past the vehicle entrance 4, such as an ultra-sonic transmitter/receiver set. As illustrated in FIG. 2, the electric eye system 62 may also include third and fourth transmitter/receiver sets 74, 76, arranged proximate the vehicle exit 6, to detect the passage of vehicles and people past the vehicle exit 6, in a like manner.

As also illustrated in FIG. 4, a loop detector system 64 is connected to the control system 40. The loop detector system 64 includes one or more loop detectors, arranged proximate the vehicle entrance 4 and/or exit 6. In FIG. 2, a first loop detector 78 is located closer to the first barrier 48 of the vehicle entrance 4, as compared to a second loop detector 80. Therefore, a vehicle entering via the vehicle entrance 4 will trigger the first loop detector 78 prior to triggering the second loop detector 80. In typical installations, the loop detectors also act as the inside and outside safety loops for the door or gate.

The loop detectors 78, 80 may be embodied as coils of wire, which act as metal detectors. A large amount of metal, characteristic of a vehicle, will influence a current in the coil of a loop detector, and indicate the presence of a vehicle. Of course, other types of loop detectors may be employed to detect the presence of a vehicle, such as a weight sensor. A typical weight sensor would include a loop-shaped area formed in the entrance ramp which transmits a surface weight to a sensor beneath, such as a piezo-electric strain gauge. As illustrated in FIG. 2, the loop detector system 64 may also include third and fourth loop detectors 82, 84, arranged proximate the vehicle exit 6, to detect the passage of vehicles past the vehicle exit 6, in a like manner.

Also as shown in FIG. 4, a video camera or cameras 90 are provided. This video camera 90 captures frames of information for each "event" recorded by the system of the present invention. It is contemplated that more than one camera can be used to capture images during such events, and there is no reasonable limit to the number of cameras which can be used. Additionally, the camera 90 can be controlled to pan, tilt, and/or move in a manner known in the security camera arts, to capture events. The capture of events is in a pre-programmed manner, and/or in response to manually controlled signals from a security officer or manager.

Figure 5:
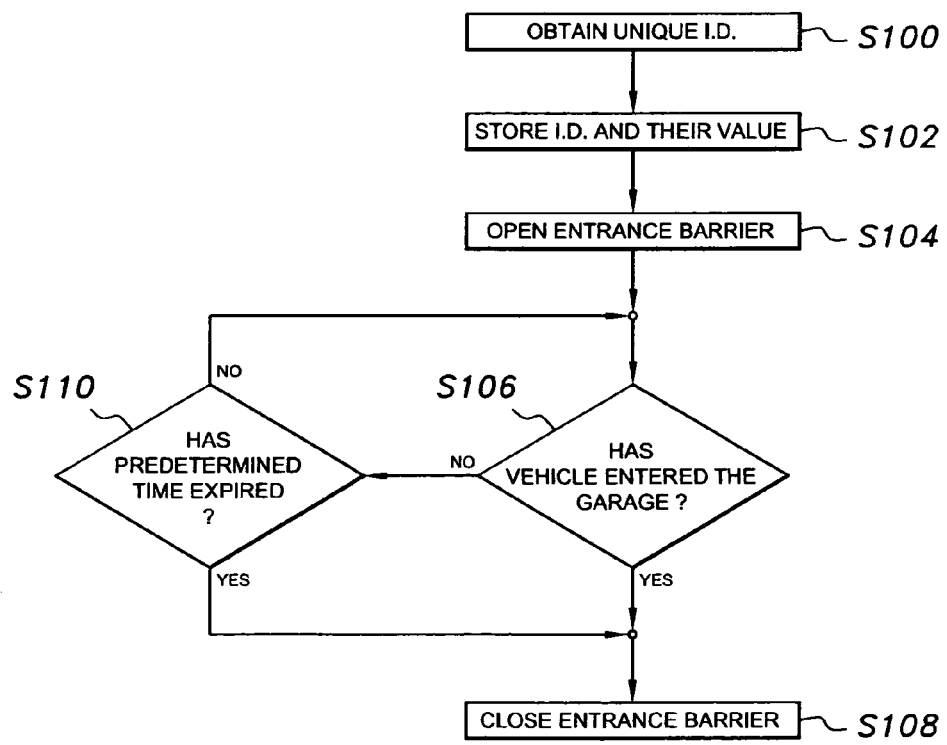
FIG. 5 is a flow chart illustrating a method of operation for allowing a vehicle to enter a parking area.

FIG. 5 is a flow chart illustrating a first aspect of operation for the present invention. The first aspect of operation relates to a vehicle or person's entrance into the parking area, e.g. parking garage. When entering the garage, a customer's vehicle approaches the first customer terminal 10 via the entrance ramp 12. The customer reviews rules posted at the first customer terminal 10 or at a billboard 66 attached to the building 2. The customer is instructed to present their driver's license or a credit card (hereinafter referred to as a customer's common card) to the card reader 24. In FIG. 3, the card reader 24 is provided in a pedestal-type customer terminal 10, and accessed directly by the customer. However, other types of customer terminals may house the card reader 24. For example, the card reader 24 may be provided in a customer terminal, taking the form of a customer counter or parking attendant's booth, and accessed by handing the card to an attendant.

In step S100, the card reader obtains unique identifying information from a bar code, magnetic strip or the like, on the customer's common card. It is not important that the control system 40 be able to actually identify the individual, but rather that the control system 40 simply be able to obtain unique data associated with the customer's common card.

In step S102, the control system 40 stores the read identification data in the memory 52 along with a timer value or timestamp, as taken from the timer 53. Then, in step S104, the control system 40 sends a signal to the first actuator 42 to open the first barrier 48 to permit the vehicle or person to enter the parking garage. In step S106, it is determined whether or not the vehicle or person has entered the parking garage using the loop detector system 64 or electric eye system 62. If not, the control system 40 goes to step S110. If so, the method proceeds to step S108 and the control system 40 sends a signal to the first actuator 42 to close the first barrier 48.

If the vehicle or person has not entered the parking garage, the control system 40 monitors the timer 53, in step S110, to see if a predetermined time has elapsed. For example, the predetermined time may be approximately 10 to 15 seconds. If the time since the opening actuation of the first barrier 48 has not yet exceeded the predetermined time, the process returns to step S106 to check if the vehicle has entered the parking garage yet. If the time since the opening actuation of the first barrier 48 has exceeded the predetermined time, the process goes to step S108 and the first barrier 48 is closed. This is a "time-out" procedure, whereby the first barrier 48 is not left open indefinitely.

Once a vehicle has entered and parked in the parking garage, it is customary for a person to leave the vehicle and go perform tasks in the building 2 or outside the building 2. In this regard, the person will need to exit the parking garage via a door leading to a street, stairway, or elevator room. FIGS. 1 and 2 illustrate a door 8 leading to a street. The door 8 is constructed to allow people to freely leave the parking garage. However, the door 8 is locked to prevent people from entering the parking garage. Of course, other similar doors 8 could be provided to control access to the garage from an elevator room, lobby, etc. The person could also exit or enter through the garage door.

Figure 6:
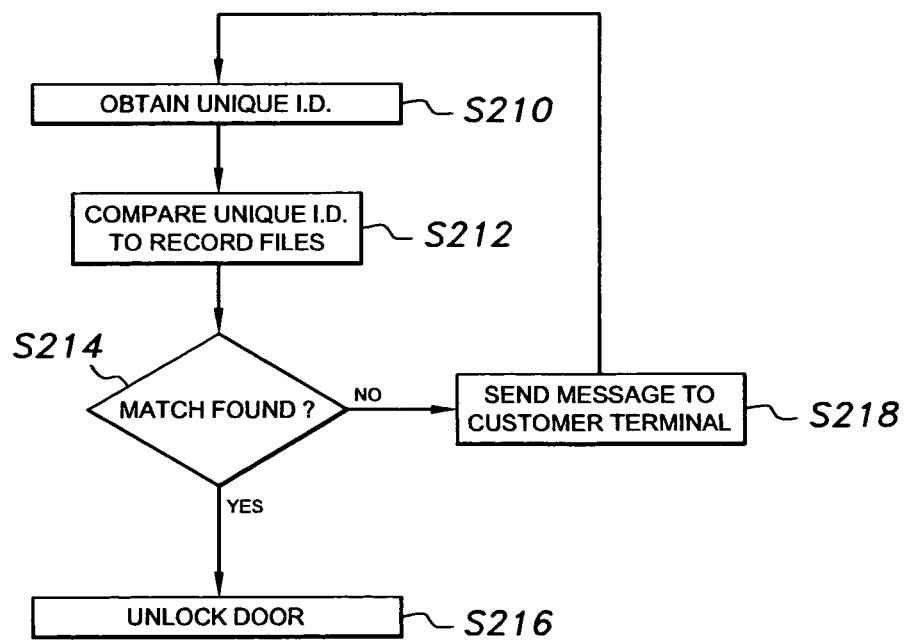
FIG. 6 is a flow chart illustrating a method of operation for allowing foot traffic into the parking area.

FIG. 6 is a flow chart illustrating a second aspect of operation of the present invention. The second method of operation relates to a person's ability to regain walking entrance into the parking garage. To regain entry into the parking garage, a person presents their customer's common card (e.g. driver's license or credit card) to the card reader 24 of the second customer terminal 16. In step S210, the card reader 24 of the second customer terminal 16 obtains unique identifying information from the bar code, magnetic strip, or the like of the customer's common card.

In step S212, the control system 40 compares the identifying information obtained in step S210 to the identifying information records stored in the memory 52. In step S214, it is determined if a match is found. If so, processing proceeds to step S216. In step S216, the control system 40 sends a signal to the door lock 46 to unlock the door 8, such as by withdrawing a deadbolt via a solenoid or de-energizing a magnetic lock. This allows the person to enter the garage.

If no match is found in step S214, processing proceeds to step S218. In step S218, a message is displayed to the person at the second customer terminal 16, via the video display 32, that the customer's common card presented was not previously used to gain access to the parking garage. The person is instructed to try again, or to call for assistance using the handset 26. The display could display a message that access is denied. This ensures that the person does not conclude that system cannot respond and is somehow defective.

For example, assume that a car rental agency has rental cars parked inside the parking area. If a person wishes to enter the parking area to obtain a rented car, the person will be asked to insert their customer card into a card reader 24 provided at the rental agency desk. The control system 40 will allow the person to enter the door 8, and perhaps a series of doors inside the parking area, so as to provide the person with an accessible path to the rental cars parked in the parking area. The control system 40 could also allow the person to exit the parking area with a rental car, using the same customer card.

Figure 7:
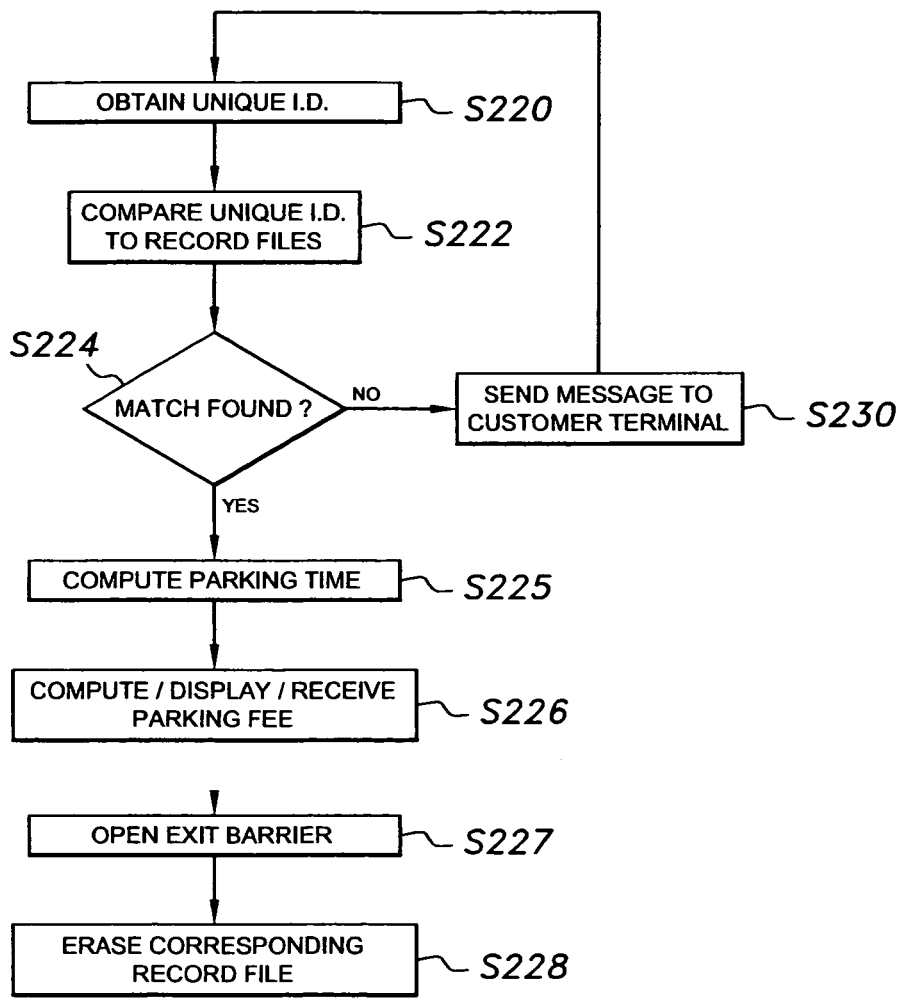
FIG. 7 is a flow chart illustrating a method of operation for allowing a vehicle to exit the parking area.

FIG. 7 is a flow chart illustrating a third method of operation for the present invention. The third method of operation relates to when the person exits the parking garage with their vehicle. To exit the parking garage, the person must present their customer's common card to the card reader 24 of the third customer terminal 20. In step S220, the card reader 24 of the third customer terminal 20 obtains unique identifying information from the bar code, magnetic strip, or the like of the customer's common card.

In step S222, the control system 40 compares the identifying information, obtained in step S220, to the identifying information records stored in the memory 52. In step S224, it is determined if a match is found. If so, processing proceeds to step S225. In step S225, the timer value stored along with the matching identifying information record is compared to a present value of the timer 53 and a total parking time is computed.

Next in step S226, a charge for the parking service is computed and displayed to the person at the third customer terminal 30, via the video display 32. The customer then pays for the parking service, either by cash or credit card to the third customer terminal 30 or an attendant, or by putting the charge on an account. After payment is settled, in step S227, the control system 40 sends a signal to the second actuator 44 to open the second barrier 50, and allow the vehicle to exit. Next, in step S228, the control system 40 erases the matching identifying information record from the memory 52. Alternatively, the control system 40 can flag the matching identifying information record. A flagged identifying information record can be erased after some period of time, for example ten days, or can be archived for later use.

If no matching identifying record is found in step S224, processing proceeds to step S230. In step S230, a message is displayed to the person at the third customer terminal 20, via the video display 32, that the customer's common card presented to the card reader 24 of the third customer terminal 20 was not previously used to gain access to the parking garage. The person is instructed to try again, or to call for assistance using the handset 26, or to his/her cell phone. A video image of the person can be taken, via the camera 34 of the third customer terminal 20. This video image can be stored in the memory 52, so that should a criminal event later be uncovered, the video image of the person can be retrieved.

The above described system and method of operation offers many advantages in the monitoring and control of a parking garage. First, the system makes is difficult for a person to enter the parking garage, unless that person has a vehicle parked in the parking garage. This reduces the likelihood of having criminals enter the parking garage and causing injury or damage to persons or property in the parking garage.

Second, the system works in cooperation with a person's credit card or driver's license. Presumably, all persons parking a vehicle in the parking garage should have in their possession their driver's license, and most people would have a credit card. Therefore, the parking control system is operating, based upon a card which is already in the possession of the parking patrons. There is no need to create, issue or update any dedicated parking card, which saves time and money for the parking service provider and parking customer. Further, parking customers need not carry an additional card for parking services.

One particular drawback of the prior parking control systems was that parking customers left their parking slips or parking cards in their parked vehicles. This occurrence is highly unlikely in the present system. People are very much in the habit of keeping their credit cards and driver's license in their wallets or purses, and would be very unlikely to leave their credit card or driver's license behind in a parked vehicle. Therefore, should a thief steal a vehicle from the parking garage, the thief would not have a credit card or driver's license with a matching identifying record stored in the memory 52. Therefore, the thief would call attention to himself when trying to leave the parking garage, and a video image of the thief would be stored in the memory 52.

Of course, a paper slip could still be issued by the parking control system of the present invention. However, the paper slip would not be used to exit the parking area, but would serve to identify the parking area, such as by address or a service provider's name. Such a slip could be carried by the parking customer to remind them where their vehicle is parked.

Although a credit card may be employed by the system, a person's credit card number might only be used to uniquely distinguish the person. It would not be necessary to identify the person, validate the credit card, or make any charge to the credit card. Rather, the credit card is used to make a unique identification record to be stored in the memory 52. Of course, if credit cards were used, it would be possible to charge the credit card for the parking services, if the customer desired. It would also be prudent to capture a partial record of the credit card information such as the last four digits so as to not create a hackable and valuable date record.

If a problem occurs at the parking area, such as a theft, vandalism, robbery, assault, etc., then the credit card account information on file at the time of the event could be used to track down the holders of the driver's licenses or credit cards. In this way, it is possible to reconstruct a list of those persons who may have been injured, suffered a loss of property, witnessed a crime, or be a suspect in the crime.

Of course, there will be special circumstances where a different person, not in possession of the customer's common card, will legitimately need to remove a vehicle form the parking garage. Take for example, the instance where a person has driven their vehicle to the parking garage, parked, and then left on a business trip. A spouse picks up the vehicle, later that day. The spouse would be unable to use the same customer's common card to gain entrance into the parking garage, via the door 8.

However, the spouse could speak with a guard, or remote service person, via the handset 26 or cell phone and explain the situation. The guard could then instruct the person to insert another customer's common card into the card reader 24 of the second customer terminal 16. The control system 40 would respond to customer's common card, and an override command issued by the guard or remote service facility 60, and would unlock the door 8 and create a new identifying information record in the memory 52. By this arrangement, the spouse could exit the parking garage using the spouse's customer's common card at the third customer terminal 20.

One particular advantage of the present invention is that data surrounding such special circumstances can be collected and stored for some time. For instance, driver's license information of the alleged spouse could be maintained for several days so as to make sure that no vehicle was stolen during the same time period. Further, the first and second video cameras 3, 23 mounted to view the vehicle entrance and exit area, and the video camera 34 of the customer terminals, can be used to store video images of the person or persons who needed special attention in order to gain entrance into, or exit from, the parking garage. Such measures go along way toward preventing and deterring persons from committing crimes, since their crimes are no longer anonymous, and the likelihood that they will be later identified are greatly increased. To this end, it is envisioned that brief video images of all persons entering and exiting the parking garage could be stored for some short period of time. If no unusual circumstances surface in the following several days, the video images would be overridden.

Another common problem in conventional parking area management and control systems involves "tailgaters." A "vehicle-type tailgater" involves an unauthorized vehicle closely following an authorized vehicle past the entrance barrier 48 and into the parking area. To exit the parking area, the unauthorized vehicle repeats the tailgating maneuver, and closely follows an authorized vehicle out of the parking area. "Vehicle-type tailgating" leads to lost revenues for the parking service provider. Further, the unscrupulous person who commits "vehicle-type tailgating" is not uniquely identified by the above-described methods of FIGS. 5-7. Therefore, that person could commit a crime inside the parking area and leave the parking area, not having left a recoverable record of their identity.

It is also possible for a person to inadvertently follow an authorized vehicle into a parking area. For example, sometimes the gate or door will remain open a sufficiently long time after an authorized vehicle enters a parking area, which leads a following vehicle to assume that the facility is open for business. The following person then enters the parking area, and is deemed an "inadvertent" tailgater. The inadvertent tailgater will have problems leaving the parking area since no record of their entrance into the parking area was created. In fact, if the parking area barrier is unattended, the inadvertent tailgater is essentially trapped in the parking garage. The system as invented can handle this recurrent condition. Upon an attempt to exit by foot or by vehicle, the trapped customer can call the operations center, explain the predicament and be "let-out". The operator letout sequence can include the taking the name of the individual, recording his license plate number verified through the associated camera and any other information deemed important and enter it into the letout log in the system.

Another common problem in conventional parking area management and control systems involves "pedestrian-type tailgaters." To enter a parking lot, an unauthorized person closely follows behind an authorized vehicle entering the parking area. By this maneuver, the person gains access to the parking area and bypass the security check of the second customer terminal 16, provided by the foot traffic access door 8. Again, the "pedestrian-type tailgater" is not uniquely identified by the methods of FIGS. 5-7, and could commit a crime inside the parking area with some degree of anonymity.

Figure 8:
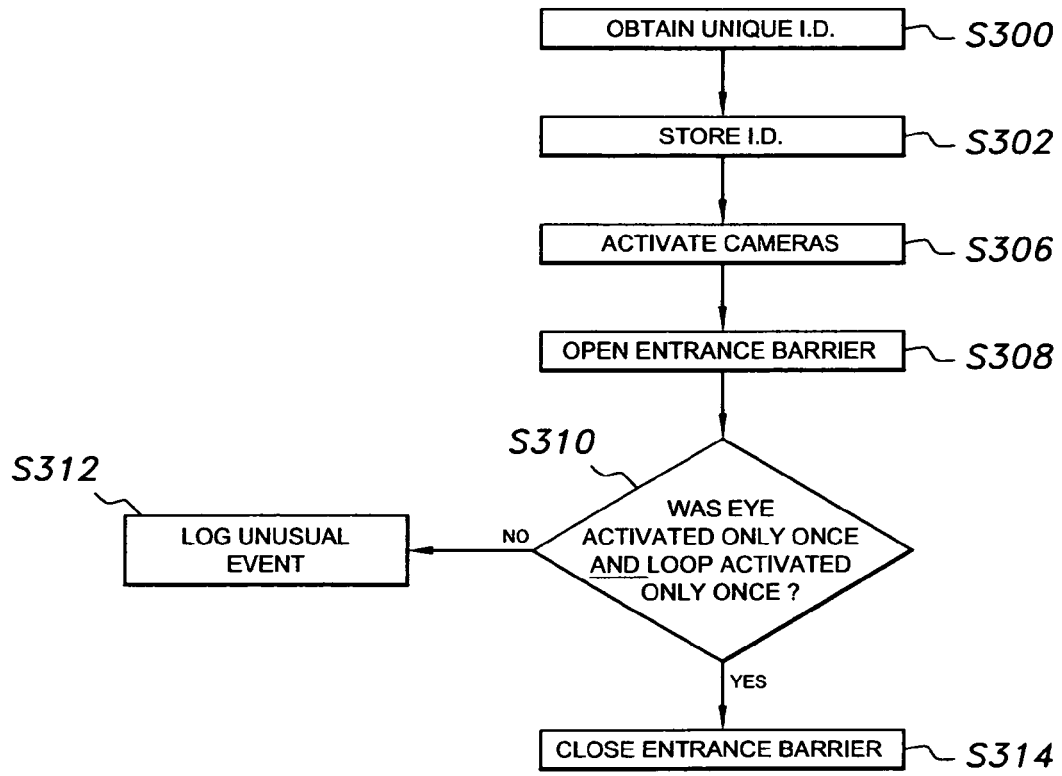
FIG. 8 is a flow chart illustrating a method of operation for discovering vehicle-type and pedestrian-type tailgating into the parking area.

FIG. 8 is a flow chart illustrating a further aspect of operation of the present invention, which enhances the security of the parking area by detecting vehicle-type and pedestrian-type tailgating. In step S300, the unique identifying information is obtained from the customer's common card, via the card reader 24 of the first customer terminal 10. In step S302, the unique identifying information is sent to the control system 40 and stored in memory 52. Next, in step S304, the first camera 3 and the second camera 23 are activated. By activating the first and second cameras 3, 23, it is possible to store video images of the vehicle entrance and exit area.

Next, in step S306, the entrance barrier 48 is opened. Then, in step S308, the outputs of the electric eye system 62 and the loop detector system 64 are monitored while the entrance barrier 48 is opened (see steps S106 and S110, in FIG. 5), and the process goes to step S310. In step S310, if the first loop detector 78 is activated only once and the first electric eye 70 is activated only once, prior to the first barrier closing, the control system 40 determines that only one authorized vehicle entered the parking garage, and the process goes to step S312, otherwise, the process goes to step S314. In step S314, the control system 40 sends a signal to the first actuator 42 to close the entrance barrier 48.

In step S312, the control system 40 notes that an unusual event has occurred. A log of the unusual event is stored in the memory 52. For example, if the first electric eye 70 was activated more than once and the first loop detector 78 was activated more than once, it is highly possible that a vehicle-type tailgating occurred. If the first electric eye was activated more than once and the first loop detector was activated only once, it is highly possible that a pedestrian-type tailgating occurred.

Whenever an unusual event occurs, as defined by the system program in response to the signal sequence and duration, the control system 40 will send an alarm signal to the local service facility 58 and/or the remote service facility 60. The video images of the first and second cameras 3, 23 will be stored in the memory 52. The images may be later evaluated by authorized personnel to determine if a vehicle-type tailgating or pedestrian-type tailgating actually occurred. Further, the images can be used to reveal the license plate and/or identity of the vehicle of person performing any vehicle-type or pedestrian-type tailgating.

If a vehicle has normally entered the parking area, as in step S314, the system can flag the video images. The flagged video images can be stored in the memory 52 for some period of time, e.g. ten days. However, it is envisioned, from a practical standpoint, that flagged images will eventually be erased or overwritten. By saving all video images for some period of time, it is possible to reconstruct comings and goings of vehicles relative to the parking area, should some criminal event surface later. For example, if an assault is reported to the parking service personnel several hours after it actually occurred, the video images would be available to determine the identities of vehicles entering and exiting the parking area around the time of the incident.

If desired, the electric eye system can include a second transmitter/receiver set 72 offset laterally from the first transmitter/receiver set 70. The second transmitter/receiver set 72 makes it highly unlikely that a pedestrian will pass by the electric eye system 62 undetected, such as by stepping over the light beam. Further, by providing a laterally displaced second transmitter/receiver set 72, the control system 40 can determine the direction of movement of the pedestrian, i.e. whether the pedestrian entered the parking area as an authorized vehicle entered, or whether the pedestrian exited the parking area, via the entrance, as an authorized vehicle entered the parking area.

Also, if desired the loop detector system 64 can include a second loop detector 80 offset laterally from the first loop detector 78. By providing a laterally displaced second loop detector 80, the control system 40 can determine the direction of movement of a vehicle, i.e. whether the vehicle entered the parking area when the entrance barrier 48 opened, or whether the vehicle exited the parking area when the entrance barrier 48 opened. A safety eye in association with a laterally offset loop detector can also provide the signal sequence needed to determine ingress or egress as can any offset devices designed to detect vehicles pedestrians or both.

It is also envisioned that multiple transmitter/receiver sets 74, 76 and multiple loop detectors 82, 84 could be employed in conjunction with the vehicle exit barrier 50. By this arrangement, a method similar to FIG. 8 could be employed to detect, and record video images of, vehicle-type tailgating and pedestrian-type tailgating at the vehicle exit.

The drawings have illustrated one entrance barrier 48, one exit barrier 50 and one pedestrian door 8. Of course, in practice, the parking garage could include a plurality of entrance and exit barriers, and a plurality of pedestrian doors 8, with each having a customer terminal cooperating with the control system 40 or a terminal capable of operating a plurality to barriers simultaneously. Further, the parking area could have a single barrier that allows both pedestrians and vehicles to enter and exit.

Further, the drawings have illustrated a parking garage; however the same advantages of the invention could be obtained with a parking lot. For example, a fenced-in, surrounded parking lot could be provided with vehicle barriers and pedestrian gates to control and monitor the parking lot in a manner similar and analogous to the system described above in relation to the parking garage.

By the present invention, a card reader outside of a parking area barrier, acting in combination with inside and outside loop detectors and electric eyes (typical safety controls for doors and gates), can be organized by a control system to trigger alarms and cameras when non-normal signal sequences occur. The programming of the control system, in accordance with the present invention, opens a timed window to allow a pedestrian to enter a garage to retrieve their vehicle, even after the garage closes, yet the control system stays vigilant to detect tailgaters and unauthorized pedestrians. Each access and egress by vehicles, pedestrians, or combinations of vehicles and pedestrians will generate a signal signature or data set of time stamped events. The controller program and or server will examine the signals for sequence and signal duration. Any sequence or signal duration that falls outside a prescribed value can be tagged as an anomaly and labeled on the server as such for later review or immediate notification of listed personnel.

Figure 9:
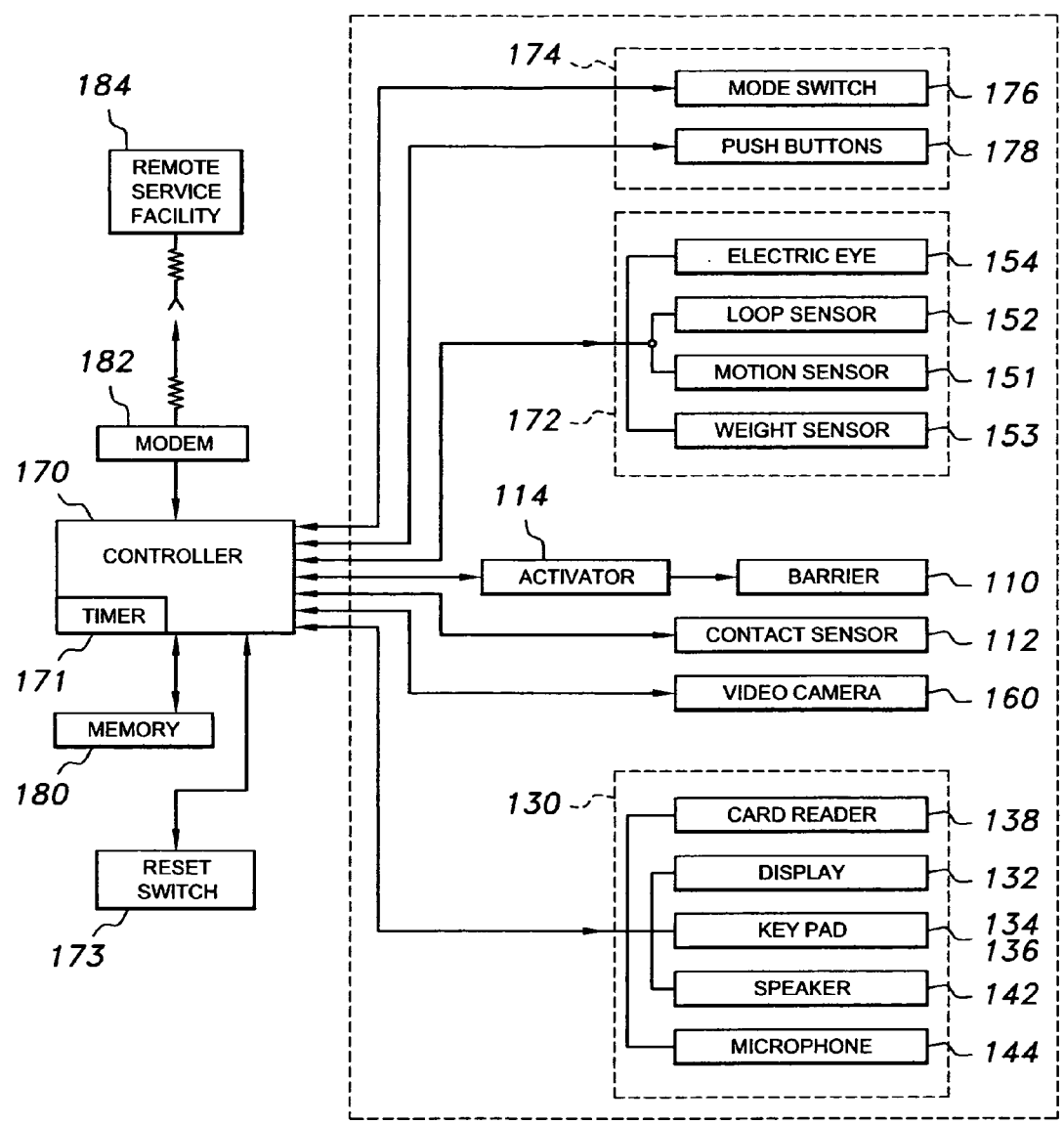
FIG. 9 is a block diagram illustrating various component of a control system of a parking area.

FIG. 9 illustrates a block diagram of a control system for the present invention. FIG. 9 illustrates a controller 170, which manages the operations associated with the first barrier 110. Of course, the controller 170 could also manage the operations associated with a second barrier (not shown) and second customer terminal, as well as other barriers, customer terminals, and attendant booths of the parking area. Controllers could be added to the system as necessary to operate any equipment in the portal. A memory 180, a modem 182 and a timer 171 are connected to, or formed integrally with, the controller 170. The modem 182 allows the controller 170 to communicate with a remote service facility 184 via the internet.

The features of the first customer terminal 130 are connected to the controller 170 via hardwiring or a wireless connection. Further, the first actuator 114 for causing movement the first barrier 110 is connected to the controller 170. The first edge sensor 112 and the first video camera 160 are also connected to the controller 170 via the server LAN, Ethernet, etc. One or more vehicle detectors 172 (such as the electric eye system 154, the loop sensor 152, a motion sensor 151, and/or a weight sensor 153) are connected to the controller 170. An example of the referenced "controller" is the iPortal™ Manager and Programmable Logic Controller model SDS-0400IP™

The attendant's booth 174 includes controls, which vend the gate usually associated with the fee computer. The mode switch 176 is used to set the operation mode of the parking area. For example, when the mode switch 176 is in the "day" mode, the attendant controls the barriers usually by using the fee computer. When the mode switch 176 is in the "free" mode, the barriers remain open, so that vehicles may pass by freely. Alternatively, when the mode switch 176 is in the manual mode, the operation of the barriers is controlled by a push button. The controller 170 will record the date and time when a particular mode was selected and store this data in the memory 180 or pass it to the database on the server. In the preferred case, an IP camera provides images of the event to the server as described hereinabove.

As illustrated in FIG. 9, the connections between the controller 170 and the various accessories concerning the operations of the barrier 110 can be two-way connections. In other words, the controller can both send to, and receive signals from, the various accessories. In a preferred embodiment, the circuitry employed in the various accessories, such as the electric eye 154, actuator 114, card reader 138, etc. include self-diagnostic circuitry. The features of self-diagnostic circuitry are known in the existing arts, and reference can be had to the existing arts to determine the various constructions and operations of such self-diagnostic circuits. Typically, UL rules specify monitored safety devices on motorized doors and gates.

During operation, the controller 170 will monitor the performance of the various accessories and determine whether the accessories are functioning properly. If a malfunction occurs during the operation of one of the barriers attached to the controller 170, the controller 170 will report the fault occurrence and identity of the faulty accessory to the central service facility 184 via the modem, Ethernet connection, Wi-Fi, LAN 182. Alternatively or in addition, the controller 170 could maintain a fault log in the memory 180, when a parking attendant enters a command via the keypad 134 on the customer terminal 130, the fault log could be displayed on the LCD screen 132 or on a smartphone display via Bluetooth allowing service personnel diagnostic capability when the controller is inaccessible. The Bluetooth connection also allows for reading data logs, performing system setup and allowing entry access by authorized personnel. QR codes posted on the equipment would provide an easy way to link into the Bluetooth access port, technical support, manuals, diagrams, etc.

Sending fault data via the modem or other connection 182 to a server or other central data storage, retrieval and management system provides a means by which the parking service company can be immediately informed of malfunctions in a parking barrier, so as to incur a minimal loss of parking revenue. Further, the parking service company will know the nature of the fault and will be able to dispatch only the necessary service personnel to correct the fault. Likewise, providing the display of the fault to a parking attendant on the premises, via the LCD screen 132, will enable the parking attendant to call only the necessary service personal, or possibly correct the fault himself.

With reference to the flow chart of FIG. 10, an operational embodiment of the present invention will be described. For simplicity of illustration, the flow chart illustrates a sequence of operations concerning an accident event logging and recording system for the first barrier 110. Of course, in practice, the system would log and record accidents, which occur with any of the entrance or exit barriers of the parking area.

In step S400, the system is in a ready state. In the ready state, the first barrier 110 is blocking the exit of the parking garage. The controller 170 awaits an interrupt signal. The interrupt signal indicates the presence of a vehicle. For example, one of the vehicle detectors 172 senses a vehicle, or an input is received by the first customer terminal 130. Once an interrupt signal is received, operation proceeds to step S402.

In step S402, data is accepted from the first customer terminal 130. For example, the customer reads instructions from the display 132, and inputs a pass code via the keypad 134. Alternatively, the customer may swipe a credit card or parking pass through the card reader 138, or may communicate with a parking garage attendant or the remote service facility 184 via the microphone 144 and speaker 142 or via his/her cell phone.

Based upon the data received in step S402, in step S404, the controller will analyze the input data, and/or any data received from the parking garage attendant or remote service facility 184, and determine whether the data is sufficient. If the data is insufficient, processing goes to step S406. In step S406, the parking garage attendant is called to assist the customer, or the customer is directed to return the parking garage and seek the assistance of a parking garage attendant. Then, the system returns to the wait state of step S400.

If the data in step S404 is sufficient, processing proceeds to step S408. In step S408, the controller 170 begins to receive video images from the video camera 160. Next, processing goes to step S410 where the controller sends a signal to the first actuator 114 indicating that the first barrier 110 should start opening.

Next, in step S412, the controller monitors the outputs of the vehicle detector 172 to determine when the vehicle reaches the predetermined distance d to the first barrier 110. Once the vehicle reaches the predetermined distance d to the first barrier 110, a "timer 1" of the timer 171 is started in step S414.

Next, in step S416, the controller samples the vehicle detectors 172 to determine whether or not the vehicle has completely exited the parking garage. If the vehicle detectors 172 indicate that the vehicle has not yet completely exited the parking garage, the controller 170 checks to see if the first edge sensor 112 has detected contact between the customer's vehicle and the leading edge of the first barrier 110 (step S418).

If the vehicle has completely exited the garage in step S416, processing proceeds to steps S420 and S422. In step S420, the first barrier is closed, and in step S422, the timer is reset and the video images are erased, archived, or flagged to be overwritten after a defined time period. Next, processing returns to step S400.

If contact is sensed in step S418 via an edge sensor (representing an abnormal condition) in the plane of the door, processing proceeds to step S424. In step S424, the timer 101 is stopped and the timer 101 value is stored in the memory 180. Next, in step S425, a position of the first barrier and movement direction of the first barrier, when the first barrier was hit, are determined. This may be accomplished by providing encoding marks on a shaft, which rotates in a first direction as the first barrier 110 is opening, and which rotates in a second, opposite direction as the first barrier 110 is closing. Positioning is well known in the art and is used to effect the top stop point and bottom stop point of a barrier. In addition, motor starters generally comprise a double set of contactors. Each ½ set operate the motor in one direction. By logging a "active" signal from each contactor, it is possible to determine the direction of travel and the timestamps provide a run time for time/distance calculations.

The encoding marks on the rotating shaft can be read and counted by an encoding reader to determine the position of the first barrier 110, the direction of movement of the first barrier 110, and even the speed of movement of the first barrier 110. Encoders for determining the rotations, position, direction, and speed of rotating shafts, are known in the art of motion control inside and outside of the garage door/gate/slide door and fire door industry, such as in the servo control systems art. All of this data can be recorded and incorporated into the system logs.

Next, in step S426, the parking attendant is notified about the physical contact between the vehicle and the first barrier 110. Next, in step S428, the video images recorded by the video camera 160 and information concerning the vehicle/driver that actuated the barrier (e.g., parking card number, credit card number, etc. as provided to the customer terminal 130) are stored in the memory 180.

Of course, whenever the contact sensor 112 senses contact to the first barrier 110, movement of the first barrier 110 is stopped. Stopping the first barrier 110 could be accomplished by a brake. Alternatively, the actuator 114 could be signaled to stop the first barrier 110, and then to open the first barrier 110. In either event, further damage to the vehicle and/or first barrier 110 will be minimized.

Figure 10:
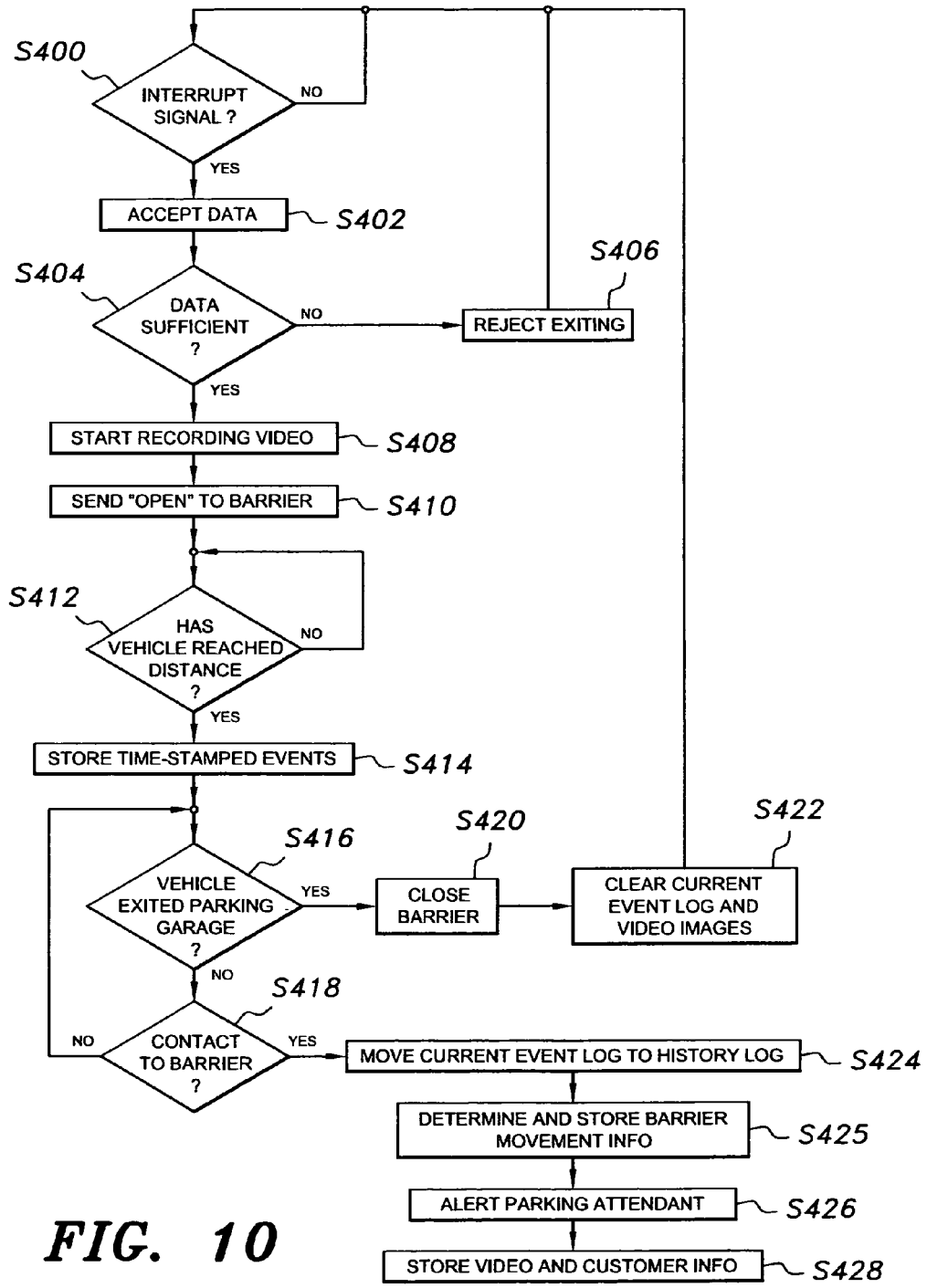
FIG. 10 is a flow chart illustrating a method of operation for the control system of FIG. 5.

In order to simplify the flow chart of FIG. 10, only the control steps concerning the first barrier 110 are discussed. In practice, the controller 170 would simultaneously control and monitor the operation of a second barrier (not shown), and could also control any other barriers of the parking garage. A like controller 170 would be used to control and monitor the second third and fourth barriers (not shown), for example, and any other barriers used at the parking lot. It is intended that the remote service facility 84 would service many such controllers 170 located at many parking garages and/or lots.

The operational method depicted in FIG. 10 is only one possible embodiment of the present invention. The operational method may be modified in many ways. The order of the steps could be altered. For example, steps S424, S425, S426 and S428 could occur in reverse order, or in any other order, such as S425, S428, S424, and then S426. Alternately, video images may be captured on an SD card or other memory device located in the camera or the camera could be connected to another memory device such as a PC or server. The controller could send its time-stamped signal information to the system server and the system server could query the camera or camera image storage device for image data associated with specific time periods. Image data could be collected "before" and "after" the times stamped events depending on the system programming with 5 seconds before and 5 seconds after being preferred.

The control method depicted in the flow chart of FIG. 10 may be modified in many other ways, while remaining within the spirit of the present invention and scope of the attached claims. For example, step S422 could be optional. Under some circumstances, it may be desirable to store video images of the activities relating to a parking entrance or parking exit indefinitely, or for some defined length of time regardless of whether or not an accident event occurred. A pricing schedule for image data storage could be created depending on data customer preferences.

Of course, the sampling of the vehicle detectors 172 (step S416) and the first edge sensor 112 (step S418) could be carried out simultaneously, or in a nearly simultaneous manner perhaps in milliseconds. Therefore, referring to FIG. 9, the controller 170 would be simultaneously monitoring for the vehicle to exit and for any contact between the vehicle and the first barrier 110.

FIG. 10 indicates that the control system stops after the data concerning the accident has been recorded. Presumably, the parking garage attendant would inspect the first barrier 110, and if appropriate, reset the system to start at step S400, if the first barrier were still functional.

Steps S424 and S428 indicate that the timer value and video images are stored in memory 180. Alternatively, the timer value and/or the video images could be transmitted via modem, internet, Wi-Fi etc. 182 to the remote data storage facility (server) 184 to be viewed, stored and/or processed.

The time stamp stored in step S424 minus the time stamp stored from the vehicle striking the first barrier 110 represents the time it took for the vehicle to travel the known, predetermined distance "d" prior to striking the first barrier 110. Therefore, the stored time can be used to calculate an estimated speed of the vehicle, as the vehicle approached the first barrier 110.

By the present invention, it is possible to generate an accident log relating to an accident event when a customer's vehicle contacts a parking barrier. The accident log can include data relating to the accident event. The data may include video images of the barrier before, during and after the accident. Further, the data may include the direction of travel of the barrier (e.g., was the barrier going up or down when the contact occurred), the speed of movement of the barrier, and the exact elevation of the barrier when contact was initially made. Moreover, the data can include identification and timing information concerning the vehicle which contacted the barrier, such as the date and time of day when the accident occurred, the parking pass number or billing information that the customer entered into the customer terminal just prior to contacting the barrier, and an estimated speed of the vehicle when contact was made with the barrier.

The accident event log is a valuable asset to the parking area management company. Such a log may be useful as evidence to establish and/or rebut claims of property damage, personal injury, negligence, etc.

Figure 11:
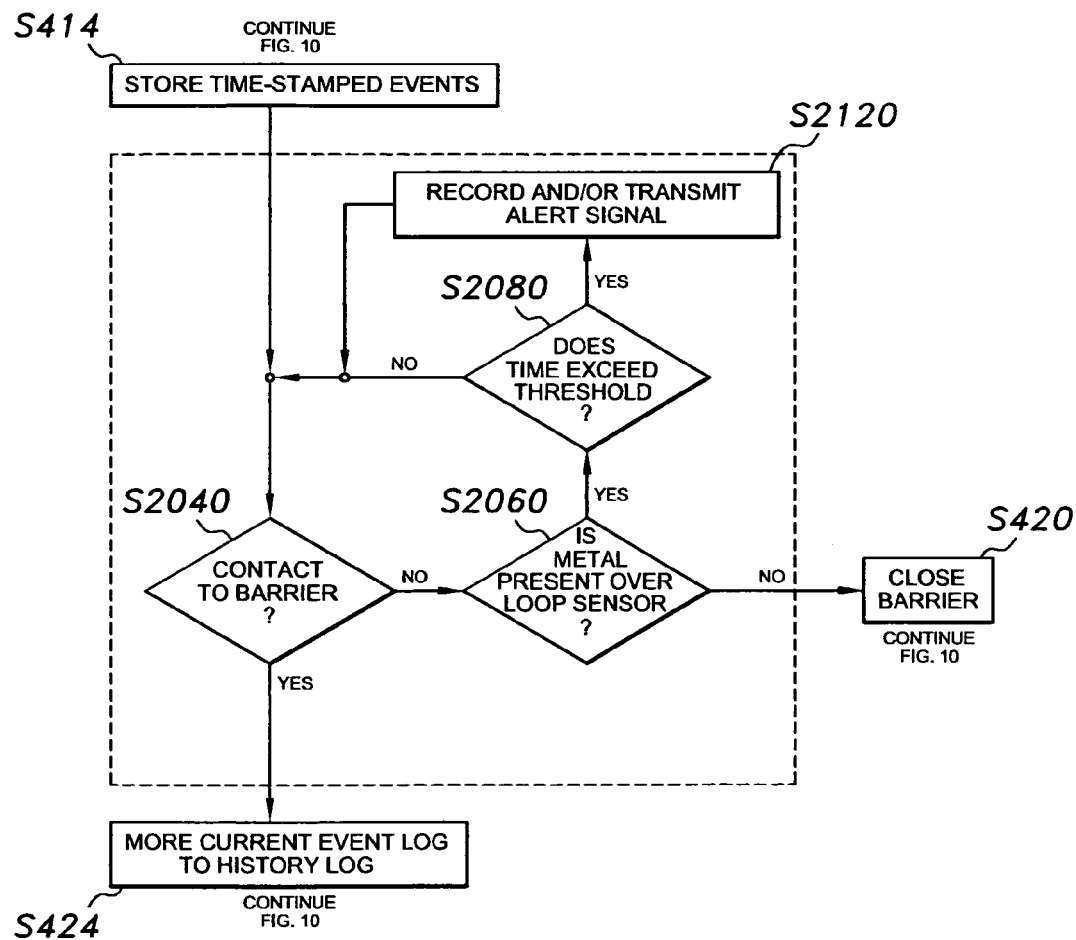
FIG. 11 is a flow chart illustrating additional method steps, which may be employed in the method illustrated in FIG. 10.

FIG. 11 is a flow chart illustrating an embodiment of a control method for the above system. The steps in FIG. 11 could replace the method steps S416 and S418 in FIG. 10. Of course, other method steps could be employed to ascertain whether or not the loop sensor 152 is activated for an excessive span of time.

In FIG. 11, after step S414 of FIG. 10, processing proceeds to step S202. In step S202 a "timer 2" is started by the timer 71. Next, in step S204, the controller 70 checks to see if the first edge sensor 12, or an electric eye, has detected contact between the customer's vehicle and the leading edge of the first barrier 10 (the step S204 is the same as step S118 in FIG. 10).

If contact is sensed in step S204, processing proceeds to step S124, and continues in accordance with FIG. 10. If contact is not sensed in step S204, processing proceeds to step S206. In step S206, the controller 70 checks the output of the loop sensor 52. If a sufficiently strong signal is sensed, a relatively large quantity of metal is proximate the first barrier 10. Normally, this would mean that a vehicle is present. If a weak signal, or no signal, is sensed, little or no metal is proximate the first barrier 10. Normally, this would mean that the vehicle has left the proximity of the first barrier 10.

If in step S206, the controller 70 concludes that the vehicle has exited the proximity of the first barrier 10, processing proceeds to step S210. In step S210, the controller resets timer 2, and subsequently sends a signal to the activator 14 to close the first barrier 10 in step S120. Processing then proceeds in accordance with the flow chart of FIG. 10.

If in step S2060, the controller 170 concludes that the vehicle is still proximate the first barrier 110, the first barrier 110 remains open and processing passes to step S2080. In step S2080, the controller 170 checks timer 102 and compares its value to a threshold value. If the threshold value is not exceeded, processing returns, or loops, to step S2040.

If the threshold value is exceeded in step S2080 the loop sensor 152 has been tripped for an excessive time period. The threshold value may be set at thirty seconds, one minute, or some other appropriate time, which would normally give plenty of time for a person to drive past the parking barrier. Once the threshold value is exceeded, processing goes to step S2120. In step S2120, an alert signal is sent to the remote service facility 184. The alert signal indicates that an abnormal event has occurred in that the loop sensor 152 has remained tripped for an excessive time period. The alert signal or timeout indicator is a named event with timestamp. The event data including the video or images associated with the time interval before and after the timestamp (if a camera is part of the system) is assembled in the server "event" file.

In FIG. 11, the alert signal is first sent to the remote service facility 184, after the loop sensor 152 is tripped beyond its set time-out threshold. Further, the alert signal is repeatedly sent to the central service facility 184 until the loop sensor 152 is no longer tripped. Of course, this process could be modified, such that an alert signal is sent periodically, perhaps in five-minute intervals, or just once. Further, the alert signal could be accompanied by timer 102's value, indicated a running total time that the loop sensor 152 is tripped. Or after the loop sensor 152 is tripped for a defined period of time and the alert is sent to the central service facility 184, the next log event message to the central service facility 184 could be the loop is no longer tripped.

The operations personnel at the remote service facility 184 can monitor the number of times a day that the loop sensor 152 is tripped for an excessive time period by running reports on named events, and can also monitor how long the loop sensor 152 is tripped during each of those time periods by the time stamp data. The remote service facility 184 can handle the situation in many ways, such as activating the camera 160 to view the first barrier 110; dispatching a security guard to the first barrier 110 to see if fraud is being committed by the attendant; dispatching a service person to the first barrier 110 to correct the problem; or calling the on-duty attendant to inquire about the problem.

Cumulative data concerning the loop sensor 152 or other accessories can be stored in the memory 180 connected to the controller 170, or in a memory connected to the remote service facility 184. The cumulative data may include the occurrence date and time when the activation period of the loop sensor 152 exceeded the threshold value, and the length of excessive time for each occurrence. Such cumulative data could be accessed on site or remotely via the modem 182 or IP connection. The data may prove useful in determining if a loop sensor 152 failure occurs more often when a certain employee is on duty, and may indicate that a different or new technique of defrauding the auditing system of the controller 170 has been developed and should be investigated.

A timeout function on a loop sensor has been described. In practice, any signal device can be monitored and timeout thresholds set beyond which would indicate an anomaly that may indicate fraud, malfunction, abuse, etc. which would merit investigation by maintenance or supervisor personnel. The installing personnel along with the customer would determine a system standard signal profile including thresholds and set routing for fault/alert messages to authorized security, operation and maintenance personnel.

Loading Dock

Figure 12:
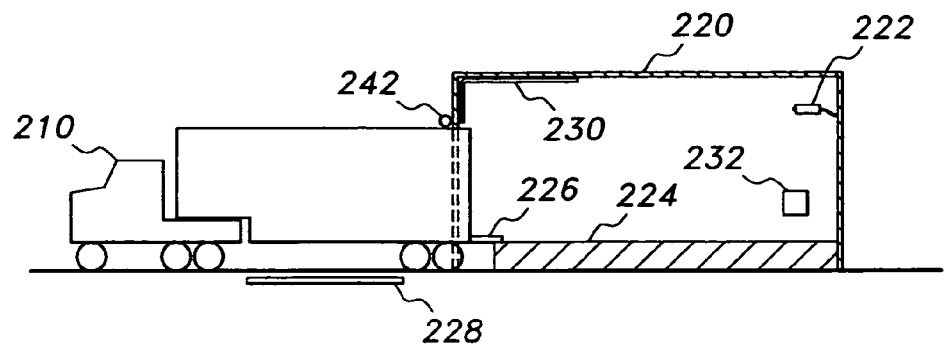
FIG. 12 is a schematic diagram of a loading dock showing a truck, camera, securement device, and sensors.

FIG. 12 is a schematic diagram of a loading dock 220 showing a truck 210, a camera 222, a securement device 226, normally called a truck restraint, and a platform 224. The loading dock 220 can have a movable door (not shown in FIG. 12) and includes a lift leveler 230 commonly called a dock leveler controlling access to the platform 224. A sensor 228 senses presence of a truck 210, and a dock door sensor 242 senses the position of the lift leveler 230.

An input terminal 232 is provided for use by loading dock personnel to enter their identifications, to indicate the activity or work being performed, and to allow input of other documentation such as documentation provided for the truck shipment including driver ID, truck ID, packages received, and so on. The camera 222 records events in a like manner indicated hereinabove with regard to FIGS. 1-11, and can be directed to pan, tilt, and/or move in a manner known to those skilled in the security camera arts.

It will be understood that there can be other doors to the loading dock 220, such as for entry of persons. Additionally, there can be other loading dock bays at the same location, either sharing the aforementioned camera 222, input terminal 232, lift gate 230, or alternatively each of such other loading dock bays can have its own platform area and optionally with its own lift gate door, camera, and input terminal. Thus, a large loading dock facility can be provided, using the security features described in the present invention. More than one camera can be provided at a given platform 224, and there is no reasonable limit to the number of cameras that may be employed.

The input terminal 232 can include any known security features such as the ability to read and store driver's license information, take fingerprint scans, iris scans, perform facial recognition, accept RFID information, voice recognition or even accept cell phone ID information via Bluetooth as the required ID for entry and egress from the facility. All these are within the ambit of anyone having skill in the security ID arts.

It is also understood that an expansive system is described which would gather a large data set and be useful to address many different concerns. However, because more expansive systems can cost more, oftentimes less is good enough. Therefore, a minimum system requirement which would meet the criteria of this invention would be an event generation signal device, a networked controller with an event ID generator with memory and application program, a networked camera with time stamped image data and a server with a searchable data management application that can gather the time-stamped events and the associated video images into an event log with secure sign in access.

Figure 13:
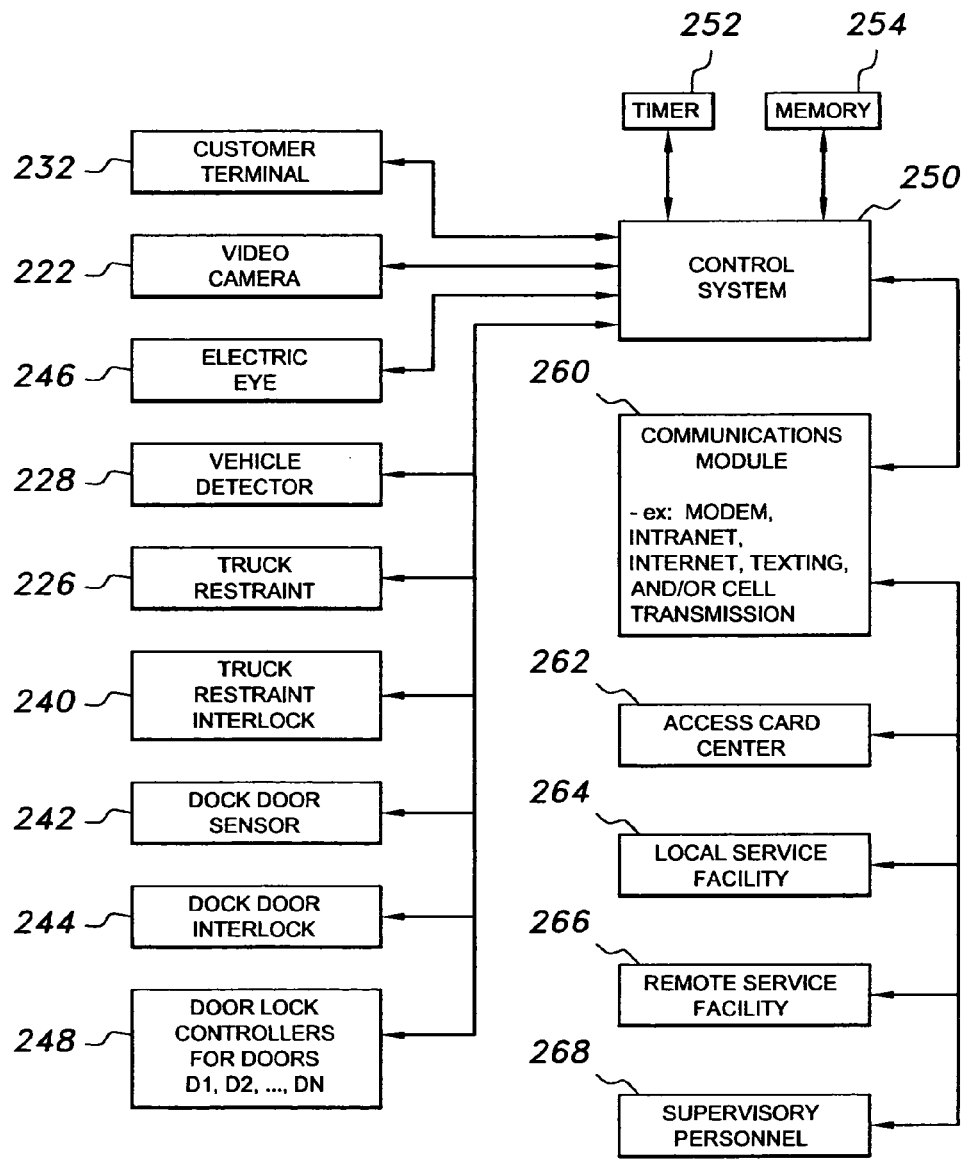
FIG. 13 is a schematic diagram of connections of elements usable in the loading dock of FIG. 12 integrated into a control and management system.

FIG. 13 is a schematic diagram of connections of elements usable in the loading dock of FIG. 12 integrated into a control and management system. Some, but not all, of the elements shown in FIG. 13 are depicted in FIG. 12, and it will be understood that FIG. 13—while having some different inputs and sensors—is otherwise similar to FIGS. 4 and 9 hereinabove, with a similar operation thereto. It will be understood that the depiction of sensors and other devices in FIG. 12 is merely representative and not exhaustive; FIG. 13 illustrates further such devices by way of further example.

For a loading dock management system, the events to be recorded can differ from those events recorded for a parking garage system. For example, entry and egress of persons will be recorded in like manner in both cases, but for the loading dock other sensors come into play. For example, the truck sensor 228 detects the presence of a truck 210, and also whether a securement 226 (truck restraint) is in a securement position to secure the truck 210 against rolling relative to the platform 224. The management system of the present invention enables those skilled in the trucking loading/unloading arts to define further relevant events. Collision sensors can also be included as well as other types of known sensing devices, and all such variations are contemplated as being within the scope of the present invention.

An important and significant value of the system set forth hereinabove is that the events are recorded and collated into a database of sortable events, so that relevant information can be retrieved when checking a specific event. For example, a truck docking event can include sensor data showing the condition and position of all doors and sensors, the personnel on duty as well as pictorial evidence taken by cameras that shows exactly which truck, and which personnel, were actually present, among other data which can be of interest.

Significant events to be recorded at the loading dock 220 can include the arrival and disposition of individual packages removed from the truck 210. The event of unloading the truck can be continuous, i.e. a frame or picture can be taken in one second intervals for example, or it can be discontinuous where a frame or picture is taken upon predetermined events such as scanning each individual package as it arrives to log it into the system or when the safety eye beam is interrupted. It happens that sometimes a package that is received is later miss-delivered, miss-stored, or simply lost somewhere. By recording the event of unloading of the individual packages, a picture is recorded which can greatly facilitate the finding of the lost package because the color, shape, and size of the package will be known from the pictures taken when it is unloaded and/or logged in.

As described above with regard to parking garage systems, other events recorded would include the entry and exit of personnel, as well as the opening of doors, arrival and departure of vehicles, and so on. Thus, all of the aspects of a parking garage system can be used for the loading dock, with the additional features shown and described with regard to FIG. 12 and FIG. 13 discussed hereunder.

FIG. 13 shows a control system 250 and a communications module 260 which are in communication with each other. The communications module 260 can additionally communicate with an access card center 262, a local service facility 264, a remote service facility 266, and supervisory personnel 268. The communications module 260 can communicate in any known manner including by modem, internet, intranet, microwaves, laser, blue tooth and cell transmission among others. It will be understood that the communications module 260 may communicate with other services or locations than those shown, and can include fewer than those shown. The control system 250 and the communications module 260 are similar in purpose and function to those shown hereinabove with regard to FIGS. 1-11, and are not further described herein. The control system 250 communicates with a timer 252 and a memory 254 in known fashion. The control system 250 is capable of sending email and/or text message alerts to management or other security officers, upon detection of specific events such as door left open, fire alarm active, smoke detector alert active, and so on. The controller can send email or can send data to a server where the data is analyzed by the server application and emails sent from the server application when defined criteria is met such as cycle counts, signal timeout exceeded, signal sequence criteria met or not met, or specific signal detected. In a preferred example the signals are named events such as safety edge activated, overload tripped, run state changed, manual hoist engaged, ceiling pull activated, card reader activated, etc. where labels are related to the signal source device. Each signal source device can also have an associated signal duration threshold set as an alarm criteria to indicate a non-standard fault event. The fault log(s) of multiple controllers can be combined on a server application to allow for common named faults to be searched and reports generated for review by operation managers. Commonly recurring faults may indicate substandard design, installation or improper use of equipment and aid in equipment design and choice.

The control system 250 additionally communicates with the customer terminal 232, the video camera 222, the dock door sensor 242, the truck restraint 226, the sensor 228 which operates as a vehicle detector, the lift gate and other door controllers indicated collectively at 248, a dock door interlock 244, an electric eye 246 for sensing objects near the lift gate 230, and a truck restraint interlock 240. All of these work individually in a fashion known in the truck loading and unloading industries, and operation of these can be used as signals for an event within the meaning of the management control system according to the present invention. Additionally, such event causes recordation of the state of all of the devices connected with the control system.

While single devices may be indicated in FIG. 13 connected to the control system 250, it will be understood that a plurality of such devices can be connected thereto. For example, the video camera 222 can represent a plurality of such video cameras. Within the control system 250, any of the cameras may optionally also pan, tilt, and/or move, as described hereinabove.

For example, if a theft occurs or there is a lost package, it would be useful for a manager or supervisor to be able to check each event (examples include unloading, opening of a door or portal, a malfunction report, or a timeout event, among many other possible types of events) to see all of the available information surrounding that specific event. Such available information is that provided by the sensors (presence sensors for vehicles, gate and door sensors showing positions thereof), as well as frames of video for that specific event). Thus, an unloaded package and the dock personnel handling that package will be visible in video frames at the "unloading" event, and may also be visible during "intruder" events, "malfunction" events, "scanning" events where bar codes of packages are scanned, etc.

Referring to the first example mentioned in the Background of the Invention relating to piecemeal solutions used in the prior art, by the present invention a camera system is advantageously provided and used as shown in FIGS. 12 and 13, and integrated into a system, such that it is controlled by the dock door being "not closed" and "safety eye activated" so that it would generate data only when activities relating to loading or unloading into a particular vehicle are actually occurring. Additionally, it may take images continuously and store them to memory with timestamps. The time-stamped events of safety eye activated, or door not closed at a certain time, safety edge activated, manual chain engaged, restraint deactivated, etc. and any other time stamped event all provide time-points (start and stop) where image data can be collected from the camera memory device (before and after) and inserted into the log event data depending on the controller program and the server program. These two programs capabilities are only limited by the connected devices and the imagination and skill of the programmer(s) in their ability to provide useful information and to the operator.

Referring to the second example mentioned in the Background of the Invention relating to piecemeal solutions used in the prior art, by the present invention as shown in FIGS. 12 and 13 a camera system is advantageously provided and used, and integrated into a system, such that it is controlled by input from personnel who activate the security seal cutting protocol by input to the iPortal™ Manager touchscreen or other user interface device such a magnetic strip or RFID "read" on an employee ID badge that would create a labeled tag for the video or camera images. A breaking of the seal could also be recorded by cell phone camera with an associated application that would input the event into the system along with the seal ID number. Or, the seal ID number could be entered via touchscreen. or activated during, the breaking of the security seal. Thus, various other data is associated by the present inventive system relating to this event, such as vehicle sensor data, shipping door position, other doors' positions, and video frame data, seal ID, seal integrity verification, etc. These items of information are all stored in such a way that they can be associated with specific events, and reports can be generated and the data can be reviewed by a manager or supervisor for such events. Thus, there is associated data when such security seals are broken, and thus the value of the security seal is greatly enhanced. This system would greatly enhance "secure shipping" capabilities of nuclear, biological, military or high value industrial or commercial shipments. One could add GPS data to the log file to provide additional "in route" security. A secure shipment tracking system is disclosed.

Fire Station

Figure 14:
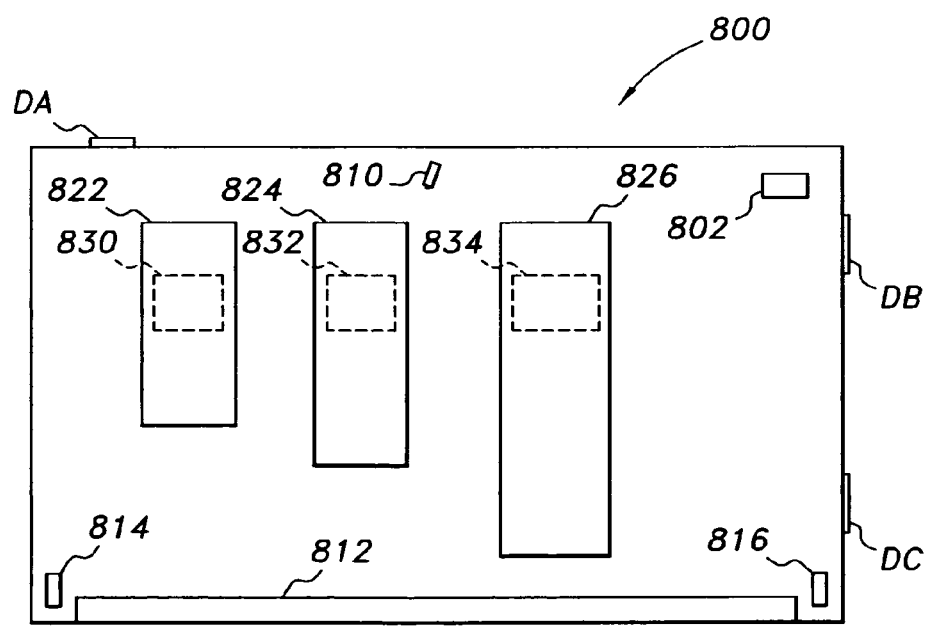
FIG. 14 is a schematic diagram of a fire station, showing fire trucks, door, camera, and sensors.

FIG. 14 is a schematic diagram of a fire station 800, showing fire trucks 824 and 826, a vehicle 822, a main truck door 814, a plurality of doors DA, DB, and DC for human access, a camera 810, and vehicle sensors 830, 832, and 834 for sensing the presence of a vehicle. A station terminal 802 is also provided which is similar to terminal 10 of FIG. 3 and to the terminal structure 130 of FIG. 9.

The terminal 802 can include any known security features such as the ability to read and store driver's license information, scan fingerprints, perform iris scans, perform facial recognition, accept RFID information, or even accept cell phone ID information via blue tooth as the required ID for entry and egress from the facility. All these are within the ambit of anyone having skill in the security ID arts. The sensors and control system, as well as individual events to be recorded, are similar to those set forth hereinabove with regard to FIGS. 12 and 13.

Figure 15:
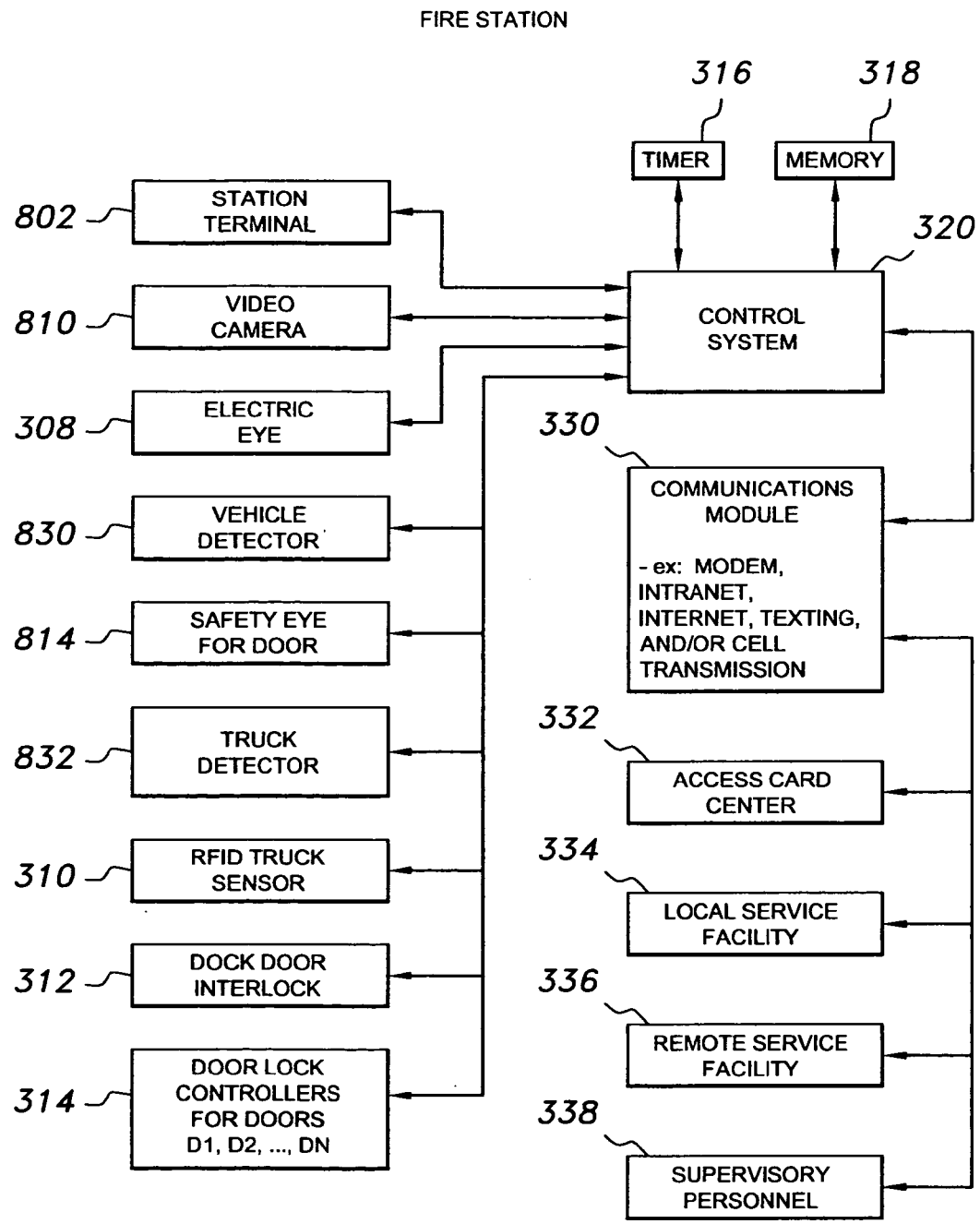
FIG. 15 is a schematic diagram of connections of elements usable in the fire station dock which is shown in FIG. 14 integrated into a control and management system.

The number of doors and number of cameras can vary, from a single door to many doors, and the number of cameras from a single camera observing a single area or access point, to many cameras observing many doors and entrances. It will be understood that the depiction of sensors and other devices in FIG. 14 is merely representative and not exhaustive; FIG. 15 illustrates further such devices by way of further example.

The system shown in FIGS. 14 and 15 enables a remote manager to monitor a number of different fire stations, so that readiness can be directly observed when summoning vehicles to a fire or other emergency. Additionally, the system allows monitoring to prevent or deter vandalism and theft, and if such vandalism or theft occurs then the system enables retrieval of full information relating to the event(s) which surround the vandalism or theft, so that appropriate measures can be taken by law enforcement to find responsible parties and to retrieve stolen equipment. The control system 320 is capable of sending email and/or text message alerts to management or other security officers, upon detection of specific events such as door left open, fire alarm active, smoke detector alert active, and so on.

FIG. 15 is a schematic diagram of connections of elements usable in the fire station 800 of FIG. 14, integrated into a control and management system. FIG. 15 shows a control system 320 and a communications module 330 which are in communication with each other. The communications module 330 can additionally communicate with an access card center 332, a local service facility 334, a remote service facility 336, and supervisory personnel 338. The communications module 330 can communicate in any known manner including by modem, internet, intranet, microwaves, laser, Bluetooth and cell transmission among others.

It will be understood that the communications module 330 may communicate with other servers or locations than those shown, and can include fewer than those shown. The control system 320 and the communications module 330 are similar in purpose and function to those shown hereinabove with regard to FIGS. 1-11, and are not further described herein. The control system 320 communicates with a timer 316 and a memory 318 in known fashion.

The control system 320 additionally communicates with the station terminal 802, the video camera 810, the truck detector 832 (and the detector 834), the vehicle detector 830, RFID truck sensors 310, GPS system (not shown) a door interlock 312, door lock controllers 314 for all doors (shown in FIG. 15 as doors D1, D2, . . . , DN), and a safety eye 814 for the main door. The electric eye 308 is used for sensing objects near the main door 812. All of these work individually in a fashion known in the fire station arts, and operation of these can be used as signals for an event within the meaning of the management control system according to the present invention. Additionally, such event causes recordation of the state of all of the devices connected with the control system. In addition, the server can communicate with GPS tracking systems to ascertain the location of vehicles on call and assemble this data on the station operations dashboard.

While single devices may be indicated in FIG. 15 connected to the control system 320, it will be understood that a plurality of such devices can be connected thereto. For example, the video camera 810 can represent a plurality of such video cameras. Within the control system 320, any of the cameras may optionally also pan, tilt, and/or move, as described hereinabove.

For the fire station of FIGS. 14 and 15, various installation and maintenance issues are addressed as follows. Currently station doors can be controlled at the door or in the station operations center where each door might require four wires to accommodate the open and close commands and additional wiring for truck presence indicators (usually an indicator light) and door open indicator. Typically, this takes a minimum of eight wires. Multiply this number by a typical 8 bay station and the result is 64 wires and banks of buttons. However, the IP networked door controllers in accordance with the present invention would allow a single data wire and a simple computer screen the ability to manage and operate the multiple doors saving thousands in installation costs, pounds of copper, steel and valuable control room real estate.

The system of the present invention, including all of the embodiments shown in FIGS. 12, 13, 14, and 5, includes electrically operated door and or locks, IP door controllers with event generation capability, integrated access control, cameras, and a network that is either local Ethernet® or internet with server, server program with parser and user secure login access. The preferred system of the present invention captures all on/off signals of all devices including motion detectors, loop detectors, electric eyes, access readers, door not closed sensors, door motor overload switches, safety eyes, safety edges, carbon monoxide detectors, heat and smoke detectors, motion detectors, etc. and generates an event log that is examined by the station operation program for anomalies and parsed into a database for report generation, immediate operational alerts, event reconstruction, etc. However, as mentioned earlier, it may be cost beneficial to limit the number of sensors to less than "all" available which would lower the cost of installation but then lessen the system capability.

Advantages

Some advantages of the present invention are summarized below:
1. System sends e-mail or text message alert if anomaly is detected such as door left open, door blocked, system malfunction, timeout value exceeded, threshold limit or parameter exceeded, etc.
2. System tracks presence of personnel and equipment.
3. System holds time stamped event data to reconstruct events such as vehicle door impacts allowing for meaningful system redesign, assigning responsibility, or training to occur.
4. System allows remote viewing, access, operation and diagnostics via IP cameras and IP door controllers and if equipped with Bluetooth smartphone access, diagnostic and setup.
5. Event data mining allows for operational cost analysis of comparable systems to be evaluated over time.
6. System allows for centralized security office to be established that oversees multiple stations from a single location.
7. Green Technology. System saves on service trips made unnecessary by remote diagnosis of faults and remote management of access control.

Referring to the third example mentioned in the Background of the Invention relating to piecemeal solutions used in the prior art for fire stations, by the present invention shown in FIGS. 14 and 15, a camera system is advantageously provided and used, and integrated into a system, such that it is controlled by or activated during events such as the station door being "not closed" and "safety eye activated" and would generate data on the server only when an intrusion event is actually occurring. This information is provided by the present invention as information related to the specific event in question. In the preferred embodiment, the camera captures ongoing image data with time-stamps. The IP controller creates an event ID and time-stamp file on the server. All time related data is tagged to the event file for easy retrieval and review. The data can include access card data, IP door control data and IP camera image data.

In addition, the present invention as shown in FIGS. 14 and 15 provides a system that immediately e-mails and/or text messages a concerned participant such as the station manager or supervisory personnel, when specified types of events occur.

Referring to the fourth example noted hereinabove of a need in the prior art, it is noted that in FIGS. 14 and 15 a safety loop that holds the bay door open against its timeout can by the present invention be integrated into a vehicle presence detector, and optionally can also use RFID technology or vehicle GPS tracking data that would be able to determine that a particular piece of equipment is "home" and ready for dispatch; and all this information is associated with individual recorded events.

Referring to the fifth example of a need in the prior art, by the present invention as shown in FIGS. 14 and 15, a camera that is constantly recording will by the present invention allow individual frames to be associated with specific events. If integrated into the door controller, the camera would capture door vehicle impacts as noted in one or more of this inventor's previous patent applications and patents identified hereinabove, and can also work to detect intruders in combination with the safety eye activation. The same camera integrated into the station operation platform according to the present invention would also enable remote verification that a piece of equipment is "home" and ready for use, would capture intruder events, and allow remote operation of door equipment on camera which would allow safe overriding of safety controls as is specified in UL specifications. Further, station bay doors typically can open on individual ceiling pull command, by push button station either at the door or at the station manager desk and or on "alarm" and by the present invention these events are recorded and associated with other available information for retrieval later in a convenient and readily accessible form. Likewise, the doors will then often close on timer command after the fire vehicle has exited, and not uncommon is the circumstance where the safety eye is blocked, safety loop malfunctions or other event occurs where the door fails to close which leaves the station open and venerable to theft and vandalism. In the present invention all of this information is available readily and conveniently associated together by recorded events.

An example of an apparatus and system related to the foregoing and which can be used in the present invention is a commercial embodiment which is known as SmartDoor System model SDS-0400IP™ iPortal™ Manager, and which in combination with the teachings of the present invention addresses the concerns of parking managers, parking attendants, overhead door service technicians, emergency fire and rescue, parking patrons, shipping clerks, building engineers, building owners, building managers and security officers. Each activity that occurs in the portal area is broken down into its individual components and then parsed into a data base where it can be reconstructed in report form so as to address the individual concerns of the designated area practitioners noted above. The above-noted SDS-0400IP™ iPortal™ Manager also is designed to switch into different operational formats in direct response to commands or circumstances as sensed by its network of sensors and its program. In the event of multiple signals or commands for simultaneous different run characteristics, the system responds based on a hierarchy determined by its program. This is standard "state machine" technology that is well understood by developers and programmers dealing in the art of motion control.

Figure 16:
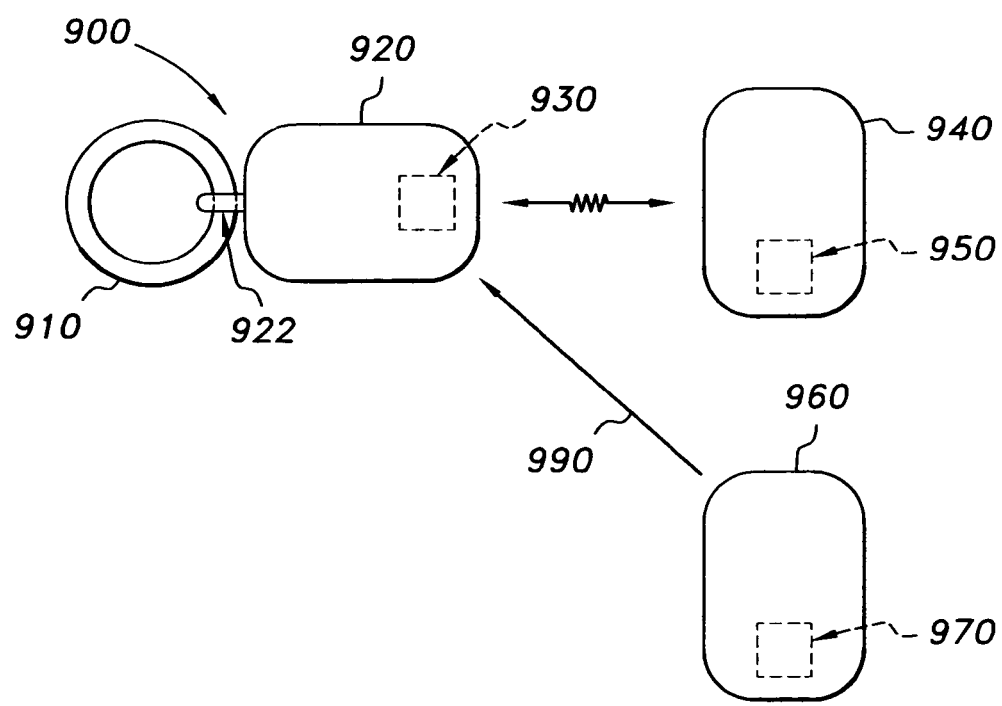
FIG. 16 is a schematic diagram of a transmitter and receiver for locating a cell phone using a device carried by a user.

FIG. 16 is a schematic diagram of a transmitter and receiver for locating a cell phone 940 using a device carried by a user. The cell phone 940 preferably has a GPS location device or circuitry 950 for determining the location of the cell phone. A cell phone case 960 can likewise be provided with RFID circuitry 970, allowing a RFID circuit 930 carried remotely in a casing 920 on a keychain 900 having a key ring 910. Signals 980 between the cell phone 940 and the keychain device 930, or signals 990 between the cell phone case 960 and the keychain device 930, allows notification such as an immediate ring of the phone if the cellphone becomes disconnected (moves out of range) of keychain device, ring worn by cell owner or cell phone case.

In the figure shown, the GPS detection circuitry is schematically shown as contained in the circuitry 950 along with RFID circuitry. Such cell phone devices are not currently known to be available with RFID circuitry, but this can be incorporated during manufacture in a known manner. The cell phone of FIG. 16 is exemplary, and includes picture-taking abilities; in the following there is no need for either the GPS circuitry or the RFID technology, which are not necessary to the present invention shown in FIGS. 17 and 18. Since this invention greatly enhances the use of a cellphone, losing or misplacing it can greatly affect operational efficiencies.

Figure 17:
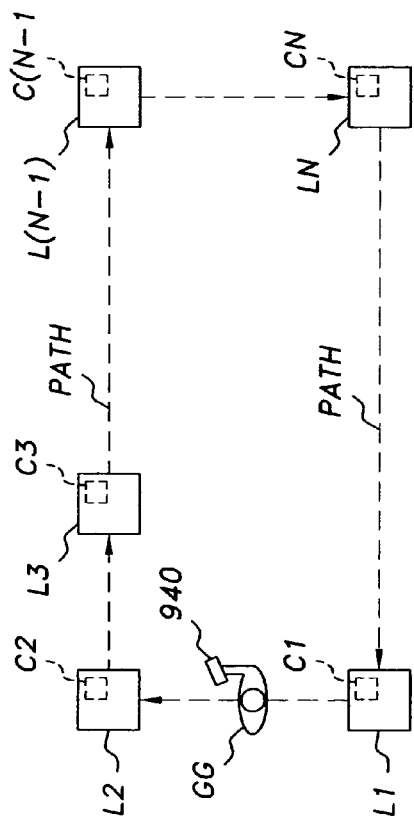
FIG. 17 is a schematic diagram of a plurality of locations visited by a guard using a cell phone camera for verification.

FIG. 17 is a schematic diagram of a plurality of locations L1, L2, . . . , L(N−1), LN which are to be visited by a guard GG following a path indicated in dashed lines in FIG. 17. The guard GG verifies locations that are visited by using the cell phone camera 940 to read or scan QR codes or barcodes C1, C2, . . . , C(N−1), CN which are disposed at the various locations L1, L2, . . . , L(N−1), LN for verification and documentation purposes. The QR code is adapted to be used by the Google™ Android™ operating system for decoding and transmitting QR code data captured by use with the included cell phone camera, as explained in detail in the Wikipedia listing for QR codes. Android APPs are one type of APP, and other APPs can be used, for example with other types of mobile OS (operating system).

According to Wikipedia, a QR code is a specific matrix barcode, or two dimensional code. The term QR stands for quick response, and it is readable by QR bar code readers and camera phones. The QR code is composed of black modules arranged in a square pattern on a white background. The information it contains can include text, URL codes, and other data.

Here, while a guard GG is shown, the path followed could instead be, for example, a delivery person, repair person, installation person, a sales person, or other service person making their rounds at a plurality of locations, and/or servicing various equipment, and which may or may not follow a predetermined path. In this instance, the capture of the QR codes C1, . . . , CN allows capture of location data, which are combined with a time stamp from the cell phone 940 as well as GPS (if provided with the cell phone 940) and transmitted by the cell phone to a predetermined location or person. Advantageously, if the QR codes correspond to unique locations, then the GPS feature is not necessary and can be omitted from the cell phone 940 or added to enhance tracking security.

Figure 19:
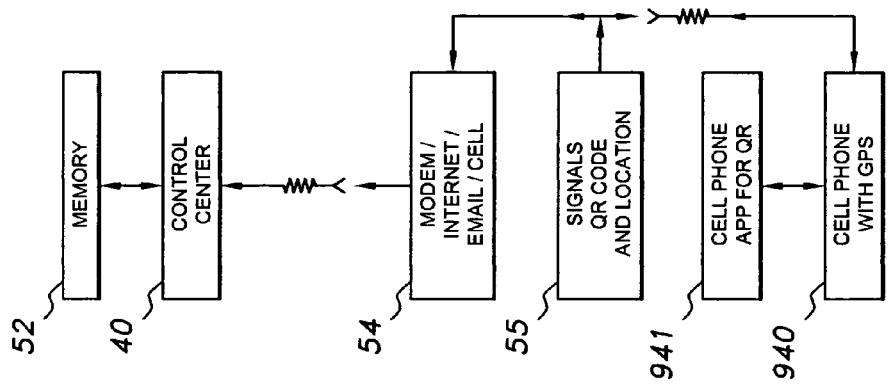
FIG. 19 is a block diagram showing how the cell phone of FIGS. 17 and 18 interacts with the control center and modem of FIG. 4, to send signals indicating the QR code and location.

The cell phone data, which as noted above includes time stamp data, QR code data, and possibly location data, is used by the system of FIG. 4 as described further hereunder with reference to FIG. 19.

Figure 18:
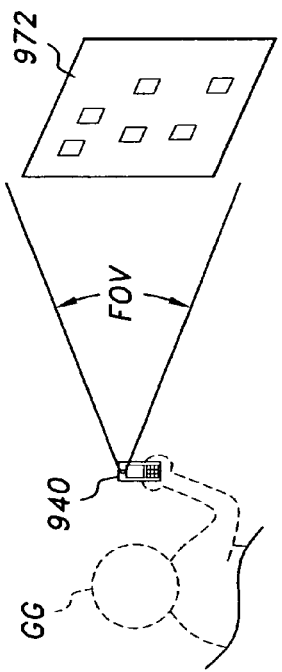
FIG. 18 is a schematic diagram of a QR barcode being scanned by a cell phone used by a guard as in FIG. 17, for scanning the barcode.

FIG. 18 is a schematic diagram of a QR code 972 being scanned by a cell phone 940 having a camera. The cell phone camera, having a field of view FOV, is used by a guard GG as in FIG. 17, for scanning the QR code 972. The QR code 972 corresponds to one of the QR codes of FIG. 17, namely the QR codes C1, C2, . . . , CN. As noted above, the software of the cell phone 940 is capable of decoding the QR code data, and uploading that data along with time stamp data, to a central receiver or supervisory personnel via text message, voice message, or data transfer.

FIG. 19 is a block diagram showing the cell phone 940 having a cell phone app (as described above) for decoding the QR codes using the camera carried by the cell phone 940. As shown in this figures, the cell phone 940 transmits a signal 55 indicating the time stamp, the QR code, and also includes the location data if the cell phone 940 has a GPS capability. The signal 55 is received ultimately by the modem 54.

Thus, FIG. 19 shows how the cell phone 940 of FIGS. 17 and 18 interacts with the control center 40 and modem 54 of FIG. 4, to send signals indicating the QR code and location. Here, the modem 54 is shown in its modern interpretation, as including a modem/internet/email/cell capability, all of which variations are intended as being encompassed by the generic term modem. The APP or application can include data cells for entering any information deemed necessary for the successful and transparent operation of the system.

The control center 40 stores the data received from the cell phone 940 in the memory 52 database as data. The data stored in the memory 52 can be used as described hereinabove, to associate data corresponding to specific events, including any data received from disparate sources, to form a convenient and readily accessible way for a manager or supervisory personnel to examine specific events such as service events on QR coded equipment, security inspection point events, or any information gathering events that are with the capabilities of this technology.

Here, the specific information generated by the operation of FIGS. 17, 18 and 19 could be used for determining location of a guard during a specific time, to track maintenance on equipment, and service calls, among many other types of activities which could be monitored in a task tracking system.

QR Codes—Cashless and Paperless Parking System

The aforementioned use of QR codes in FIGS. 17-19 also has application in the above-described parking management system of FIGS. 1-11, the loading dock management system of FIGS. 12 and 13, and the fire station management system of FIGS. 14 and 15.

Background:

Current parking technology requires cash, monthly account access cards or credit cards for payment.

In addition there exist different types of parking facilities: self-park, auto-park elevator systems and valet parking. Within the facilities there are single space, stacked space and elevated space parking types. And, facilities can be automated with traffic gates or manually operated with attendants.

The size of the facility and its primary use is another factor. A facility primarily used for a sporting event would have very high peak flow requirement as might a factory shift facility or a government office facility where traffic peaks at defined times. Whereas a facility used at a shopping mall might peak only at Christmas.

It is the joint decision and goal of the parking professionals to design and manage a particular facility in such a way as to generate the most revenue with the least cost and expense and at the same time meet and satisfy customer expectations.

Various technologies have evolved to facilitate the goal of the professionals and these technologies continue to evolve. The evolution is driven by the technologies and the limitations that are revealed in their application.

Lost revenue in its various aspects from lost customers due to poor performance by facility operators; employee theft of cash; high prices driven by operational overhead costs and the state of the local economy all affect the operator's bottom line.

The concerns for cost effective inventory management, security, access/egress identification, payment and traffic flow underpin the decision making of the facility operators taking into account the overall activity of the facility and the available technologies as described above. Any useful innovation would need to affect in a positive way some aspect or aspects of facility operations.

This inventor's previous patents and applications have touched on various aspects of the parking management conundrum and all of those documents are hereby expressly included by reference herein.

The focus of this invention relates to access, payment security, identification, and inventory management. The aforementioned QR codes offer a unique way to address various aspects of the parking conundrum and the method of application can be seen in the following manner.

Payment security—Cash payment offers many opportunities for employee theft and continues to be a problem that plagues the industry. The previous application by this inventor, U.S. Ser. No. 12/930,437 filed on Jan. 6, 2011 and expressly incorporated herein by reference thereto, refers to a ticket tracking system that attempts to improve payment security. Credit and debit card payment systems and monthly account card holders remove some but not all cash from the parking experience. A drawback in these systems is the cost of the equipment, the money lost in transaction fees and the real estate the transaction machines require. This technology works well with automated traffic gates and barriers. However, it is less useful in the manually operated facilities where the parking layout or the size if the facility make automation impractical.

The proliferation of cell phones and the additions of scanners and readers built into the camera function offer unique access and payment functionality for parking facilities. Three technologies combined make the system as envisioned:

1. An on line parking account tied to the parking company account.
2. The cell phone scanner with QR or bar code scanning capability.
3. An App.
4. A transaction acknowledgement device such as a PC with a LCD display.
5. A QR code unique to the parking facility.
6. An internet connection that connects the phone APP, the persons parking account, the parking company account and the LCD display.
7. An application on a server that connects all the above.
8. A traffic gate or attendant.

An enhancement might be an "internet hot spot" in the parking foyer. This can be included for use in the present invention.

Operation:

In operation, the parking patron would activate their parking APP and scan the QR code at the entrance. The cell phone would access the parking application on the server and verify account status and entry authorization if a secure facility or for available space. If allowed, the patron would enter the facility in access mode by the opening of a traffic gate and a timestamp of the access event would appear on the LCD. If the facility was a manual or valet facility, the attendant would motion the person to enter and hand them a multipart ticket and place a part on the windshield (for example), after which the attendant would take the car to a parking location or the person might self-park. An enhanced version would have the multipart ticket stamped with the event transaction number on each of its parts, so that one part of the ticket is left on the windshield, one part of the ticket is left on the keyboard, and one part of the ticket is given to the patron. The parking APP could include an address and Google® maps connection so the patron could easily find his way back to his parking location or e-mail the location to someone who is tasked to retrieve the vehicle such as a spouse or car rental agency.

There are two possible exit scenarios: prepayment at entry, and pay at exit. In either case, the system can pre-verify that sufficient funds are in the account and a quick scan on exit would complete the transaction. Since the system would already have a prepayment approval, the exit transaction would be very fast, unlike credit card transactions, which when used can hinder traffic during peak periods.

The following benefits can be expected over the current art:

1. The patron would benefit by not needing cash and this system would make expense reporting easier. The patron could have a Google® maps connection to his vehicle or a location map that could be easily e-mailed to someone for vehicle pickup.
2. The payment transaction would be faster than cash or credit; a critical factor in high traffic facilities.
3. The expensive pay stations with paper tickets could be eliminated or reduced in number.

4. More cash would be removed from the hands of attendants even in "manual" facilities removing the inevitable temptations.

Figure 20:
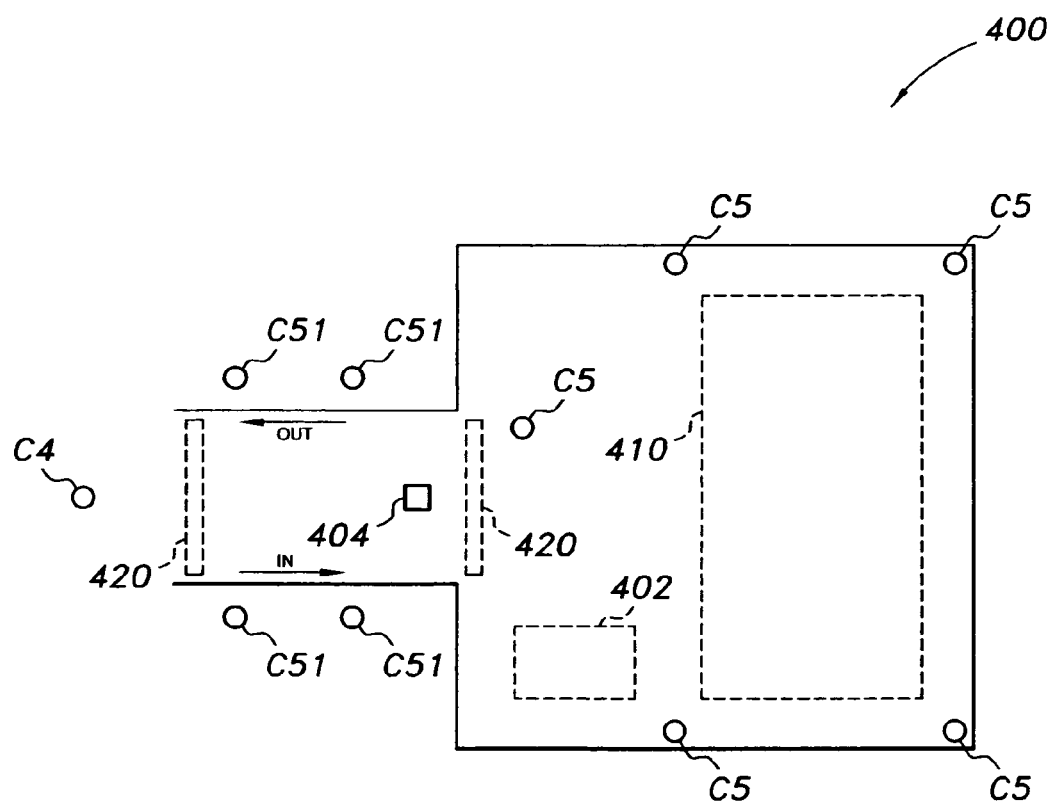
FIG. 20 is a schematic diagram of a rental car facility, showing an office, parking section, and entry/exit lanes, and cameras.

FIG. 20 is a schematic diagram of a rental car facility 400, showing an office 402, a parking section 410 for parking rental vehicles, entry/exit lanes marked IN and OUT, an overhead camera C4 which is also disposed to capture high resolution images of license plates, a plurality of security cameras C5 disposed around the rental car facility 400, and a plurality of cameras C51 disposed on sides of the entry/exit lanes. At least one set of barriers 420 is required to control entry and egress from the facility 400; two possible locations of such barriers 420 are shown, and it is possible to have two separate locations for the barriers 420 to use one for entry and the other for egress from the facility 400 or double barriers to prevent tailgating.

Additionally, other types of sensors, input devices, and communications systems can be provided as shown and described hereinabove with reference to FIGS. 1-19. All such systems and devices are integrated into a system as described hereinabove and also with reference to FIG. 21 below, and an example of an apparatus and system related to the foregoing and which can be used in the present invention is the above-described commercial embodiment which is known as the SmartDoor System model SDS-0400IP™ iPortal™ Manager.

Figure 21:
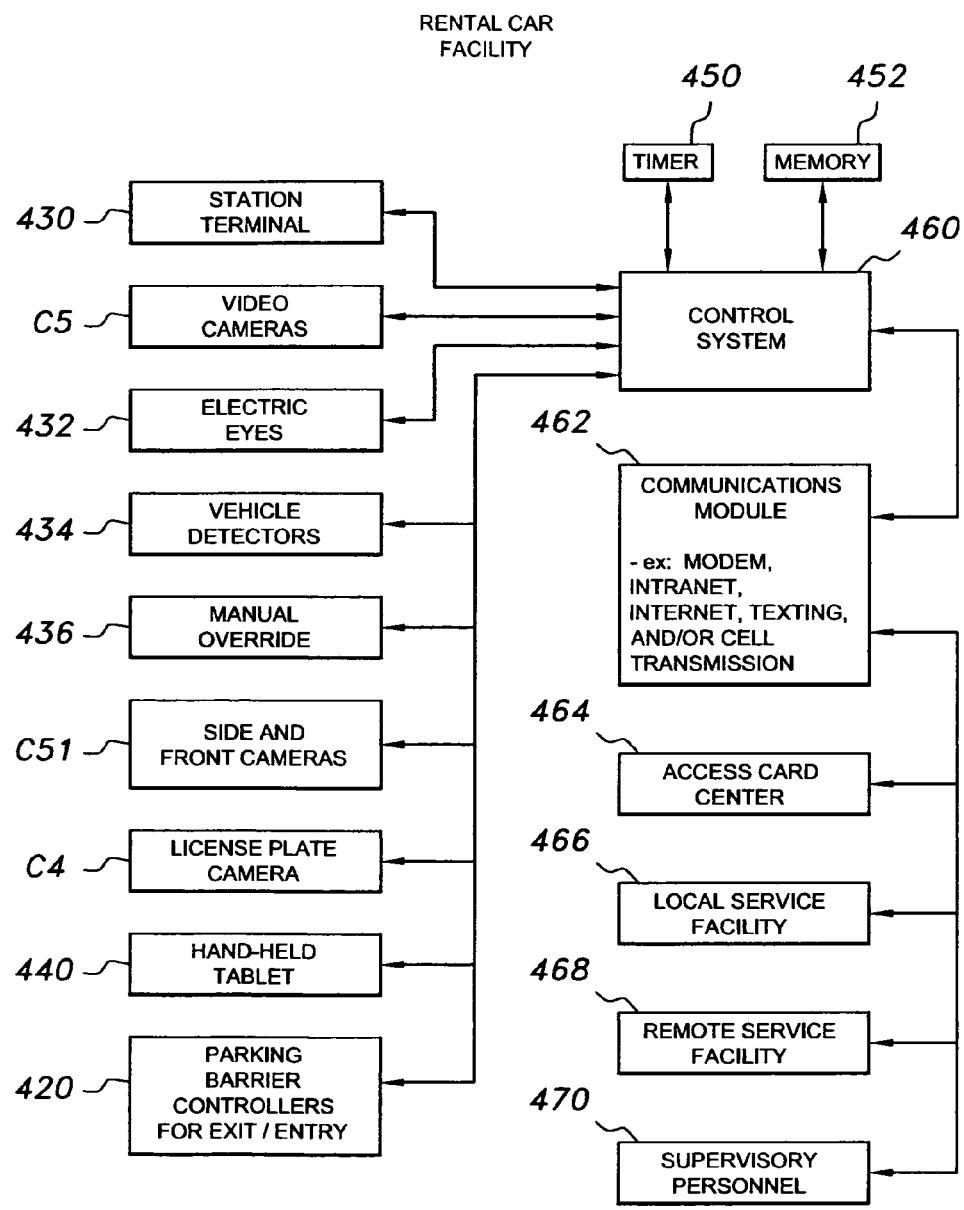
FIG. 21 is a schematic diagram of connections of elements usable in the rental car facility which is shown in FIG. 20 integrated into a control and management system.

FIG. 21 is a schematic diagram of connections of elements usable in the rental car facility 400 which is shown in FIG. 20 integrated into a control and management system.

FIG. 21 shows a station terminal 430, video cameras C5, electric eyes 432, vehicle detectors 434, a manual override 436, side and front cameras C51, a license plate camera C4, an optional portable hand-held tablet or smartphone input device 440 for rental facility attendants to use as they move about the facility 400, parking barrier controllers 420 for exit/entry control. All these are in communication with a control system 460, which is also in communication with a timer 450, a memory 452, and a communications module 462 which can communicate by email, text, modem, intranet, and/or cell transmission. The communications module 462 is in communication with one or more of: an access card center 464, a local service facility 466, a remote service facility 468, and supervisory personnel 470. The operation of the system of FIGS. 20 and 21 is described further hereunder. While a rental car facility is described, it will be understood that the present invention is applicable to other types of rental facilities for vehicles, such as truck rental facilities, construction equipment rental facilities, boat and watercraft rental facilities, etc.

The controlled exit system for a rental car facility according to the present invention solves the aforementioned breakdowns in existing systems by adding accountability, data logging, equipment monitoring, and communication to a system that typically lacks all of these.

The controlled exit system envisioned by the present invention comprises: one or more high resolution cameras (IP or similar such as SC Black model IPD105M), the model SDS-0400IP™ iPortal Manager™, the gate/barrier system, and the sensors and control inherent to the gate/barrier system and a broadband connection to the internet and system server.

The present invention allows for car rental businesses to shift more vehicle damage costs to renters using the time-stamped, search-able data logs with high resolution attached images to more accurately assess the condition of the car as it exited, which can then be compared to the returned condition. A hand-held tablet computer or smartphone with Wi-Fi connection to the custom server software can instantly bring up high resolution video or images of the car leaving the lot, making it easy to see what condition the car was in as it left the lot. This would eliminate the renter from arguing about when the damage occurred. A second set of cameras installed at the entrance to the lot would record the condition as the car was returned, eliminating human error or inattention from the process. This benefits the customer's peace of mind regarding scratch and dent scams. The rental company benefits from have verifiable proof of any damages done to the car. The intake attendant can also upload vehicle images with an APP to include QR code data affixed affixed to the vehicle the contract. The resulting intake activity would be a scan event with no additional input data necessary making the process fast and efficient unless damage is detected.

The system also monitors, controls, and notifies appropriate personnel of any breakdowns, failures, or tampering of the barrier and sensor system, in real-time via electronic communication, text message, email, SMS, or through a sounder, light or buzzer controlled by the model SDS-0400IP™ iPortal™ Manager. Logs of sensor activations, along with the photo records, simplifies troubleshooting of operational problems, including intermittent failures normally requiring multiple costly service calls to repair technicians. Such diagnostics can help onsite personnel repair simple problem themselves, reducing security-compromising downtime or repeated shredding of tire sets by intermittent failure of equipment.

Through signal monitoring and analysis, the model SDS-0400IP™ iPortal™ Manager detects and notifies if more than one vehicle exits during a let-out, eliminating vehicles from being "waved through" or otherwise leave the lot without proper verification. A vehicle that passes through the system sensors that exit (egress) without any verification/authorization instantly initiates an alert routine and notifies the manager, security, and/or other appropriate personnel. In these situations time is a critical factor, and with the SmartDoor System model SDS-0400IP™ iPortal™ Manager and management system of the present invention a manager can have high quality pictures of the car and driver in his email in-box within seconds of the event, long before reports of the theft make it to him from daily inventory reports. This added, high quality, timely information should prove invaluable to the speedy recovery and prosecution of thefts.

This system also allows for verified, time-stamped, photographed, contract linked unmanned let-out, reducing staffing needs and cost, especially during off hours. Entering a contract number into the device initiates a let-out procedure which can be either fully automated or verified and egress granted by an agent located at the rental counter or office.

Implementation of the Rental Car Facility Management System:

Upon entering the gate exit area, a loop, motion, or other vehicle sensor signals to the model SDS-0400IP™ iPortal™ Manager that a car is present. The controller communicates through LAN, serial or direct control to the camera or cameras to begin capturing images at a predetermined frame rate. This can continue until the sensor indicates that the car is no longer present, or alternatively can continue for a predetermined period of time. In the preferred embodiment, the cameras capture time-stamped image data to a local memory device. The controller(s) generate event ID's from the time-stamped sensor data and shift the information to a server. The server parses the data into its memory asks the camera for image data corresponding to the event time period before and after as determined by the system parameter(s) as noted earlier.

Manned Locations:

A car rental agent would enter contract number into the model SDS-0400IP™ iPortal™ Manager via touchscreen display or other terminal, reader, barcode scanner QR code or other connected input device connected to the database through the LAN or internet. This ties the expected let-out event to the rental contract, and to the set of pictures, time-stamped and available for review. In a preferred embodiment, the database would be on an internet based server with its associated database application. The server would be notified of the impending let-out event criteria when the contract is opened on the server and the system would notify the egress gate that a let-out should occur with the defined criteria. The let-out criteria could be allowed during a defined time window. The decision to let-out would then be local to the gate if the criteria is met allowing for speedier exits.

For remote let-outs, a call button could connect to the car rental agent who can select the type of let-out from a list: rental, delivery, contractor, vehicle maintenance, personal car, etc. This creates a search-able log of all exit events, search-able by time, type, contract number, etc. with the ID of the let-out agent. Security personnel would then have a searchable log that could reveal collusion between agents and thieves.

After data is entered, the model SDS-0400IP™ iPortal™ Manager opens the barrier system, continuing to record until the vehicle has cleared the gate and the gate has returned to the secure position.

Through the complete monitoring of sensor signals, the model SDS-0400IP™ iPortal™ Manager can determine if more than one vehicle has exited, triggering notification. Equipment breakdowns or signal anomalies are detected and notifications sent, reducing damages to vehicles and equipment.

Through automatic signal analysis, the model SDS-0400IP™ iPortal™ Manager can detect multiple types of faults, notify as determined by its program, and can disable equipment when defined faults are detected until repaired. This is very important in the rental car entry/exit gate equipment as faulty equipment can repeatedly cause the tiger teeth barrier equipment destroy tire sets on cars and passenger transport busses.

Manual control is possible in some fault conditions to allow equipment to be run with sensor faults. This is not the case with current control designs.

Un-Manned Exit:

A renter enters a contract number on a touchscreen of the model SDS-0400IP™ iPortal™ Manager or uses another connected input device. An agent at a second terminal remotely located verifies the contract number and initiates let-out as in a manned exit, and can view high resolution video feed as the renter exits to verify the process. Alternately, if the system recognizes an input that meets preset criteria, it can automatically initiate a let-out routine and open the barrier.

Non-renters can be let-out/in by the same process where the system recognizes a preset criteria such as a transponder signal, SOS, One Click, RFID, or any other recognizable signal device. Each ingress/egress event is labeled by type with image data captured.

Alternative Entry/Exit Method:

Permission to exit is granted at a rental office counter by a terminal that will generate a code using the let-out algorithm. This code can be set to be valid for a set amount of time and good for a single use. The code can be linked to the contract number, allowing for the same search-able, verified data as described above.

An entry lane or lanes preferably includes a terminal, touchscreen, card reader, bar-code scanner or QR code or similar data entry device, at least one preferably two cameras mounted such that as the car drives through, all sides are recorded, and a vehicle presence device. The renter would enter or scan an identifying contract number, a frequent renter card, or other unique identifier as was used to exit the facility originally. The server software would link the entering and exiting photo records together, time-stamped, and linked to the rental contract.

Residential Event Recording System:

The capture of recurrent activity in residential settings mimics commercial activity, just on a less frequent schedule. For instance, the portal opening on a house, i.e. the front door, garage door, back door, etc., only differs from a commercial application in the volume of the persons entering and leaving and the stakeholders for the space may be consolidated. A parent might wish to see, with a door open and close event, information that includes video or pictures of who comes into the house, when children come home from school or who comes into the house when the parents are away. A traveling businessman or woman might wish to see who comes into the house when they are away. In each case, a system as described that includes one or more cameras, portal(s) (swing door, garage door, driveway gate, etc.), ajar monitor switches or other indicators of activity such as magnetic sensors, loop detectors, motion detectors, electric eyes, and the event recording data storage and retrieval application of the present invention would create a system for this. In a broader application, a system that captured smoke alarm, water alarm, carbon dioxide alarm, and run times for heat and ac systems would all contribute to an identification of recurrent activities that can be gathered into a database and mined through an application for information that is useful to service technicians, security personnel and operational managers. In the current case example, the homeowner might be the "user" in each domain.

Figure 22:
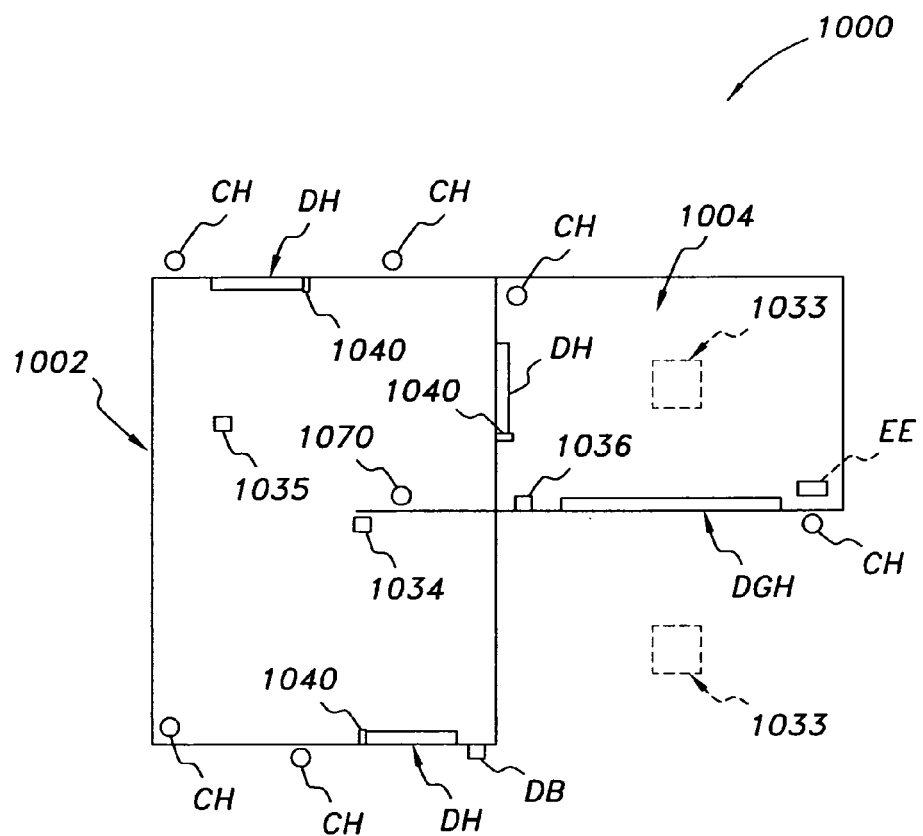
FIG. 22 is a schematic overhead diagram of a home system, showing a house portion and a garage portion.

FIG. 22 is a schematic overhead diagram of a home system 1000, showing a house portion 1002, a garage portion 1004, a smoke alarm 1034, a carbon monoxide alarm 1035, buried vehicle detectors 1033, 1033 to sense the presence of vehicles in the garage and also in the driveway, a plurality of doors DH at the front and rear of the house and one connecting the house to the garage.

FIG. 22 also shows an electric eye EE, a doorbell DB, and a thermostat 1070. A plurality of door sensors 1040 detect the open/closed condition of various ones of the doors, and preferably all of the doors. A plurality of cameras are mounted to observe the exterior and interior portions of the house and garage, and especially to monitor persons and vehicles approaching the front door, garage, and rear door. Alternately a camera could be incorporated directly into the homeowner's garage door operator.

Additionally, other types of sensors, input devices, and communications systems can be provided as shown and described hereinabove with reference to FIGS. 1-21. All such systems and devices are integrated into a system as described hereinabove and also with reference to FIG. 23 below, and an example of an apparatus and system related to the foregoing and which can be used in the present invention is the above-described commercial embodiment which is known as the SmartDoor System model SDS-0400IP™ iPortal™ Manager.

Figure 23:
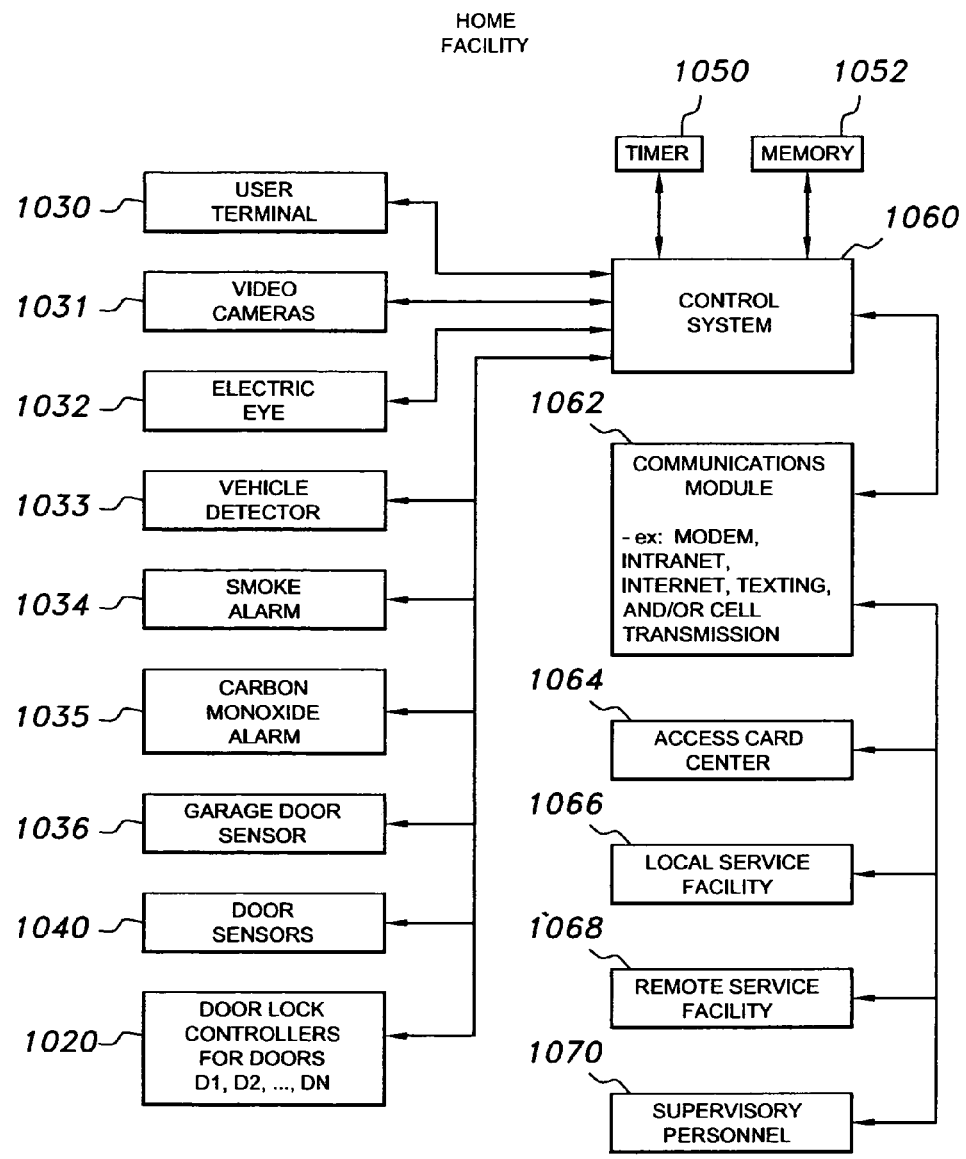
FIG. 23 is a schematic diagram of connections of elements usable in the home system which is shown in FIG. 22 integrated into a control and management system.

FIG. 23 is a schematic diagram of connections of elements usable in the home system 1000 which is shown in FIG. 22 integrated into a control and management system. FIG. 23 shows a user terminal 430 which can optionally be placed at any of the doors to grant access, for example to delivery or service personnel, visiting relatives and friends, etc. FIG. 23 also shows video cameras 1031, an electric eye 1032, vehicle detectors 1033, a smoke alarm 1034, a carbon monoxide alarm 1035, a garage door sensor 1036, door sensors 1040, and door lock controllers 1020. Radio Transmitters commonly called FOBS, keypad devices, and ordinary keys also commonly grant access to the house portal entrance and can be used in the present invention.

All or some of these are in communication with a control system 1060 which includes a door open sensor, presence sensor or motion detector (not shown in FIG. 23), which is also in communication with a timer 1050, a memory 1052, and a communications module 1062 which can communicate by email, text, modem, intranet, and/or cell transmission. The communications module 1062 is in communication with one or more of: an access card center 1064, a local service facility 1066, a remote service facility 1068, and one or more supervisory homeowners (or other supervising authority such as a house sitter) 1070. The operation of the system of FIGS. 21 and 22 is described further hereunder.

The home management system of the present invention allows for controlled entry/exit for delivery and service persons, visitors such as friends and relatives, etc. It also monitors events such as entry/exit, door openings, vehicle detections, smoke and carbon monoxide detection, and so on. All of these events are associated with the relevant sensory data and images, and events can be remotely monitored by the homeowner (for example), and texts/email alerts can be sent upon occurrence of predetermined conditions (alarms, door open too long, thermostat too high or too low, etc).

The controlled entry/exit system envisioned by the present invention comprises: one or more high resolution cameras (IP or similar), the model SDS-0400IP™ iPortal™ Manager, the gate/barrier/door system, and the sensors and controls inherent to the gate/barrier/door system and a broadband connection to the internet and system server with its data collection, storage and data retrieval application. A Bluetooth capability integrated into the controller, system setup diagnostic and system operation can be accomplished from a smartphone device application.

Further Example of Use with a Parking Management System

In a prior application, noted hereinabove, there is disclosed an inventory tracking system involving a parking management system that ultimately reconciles four currently disparate (different) data bases with a newly generated data base into a unified audit system.

The databases are summarized briefly as follows:
1. Closing inventory monthly and transients.
2. Monthly account holders
3. Opening inventory monthly and transients.
4. Overnight activity including monthly, transient (transient being daily pay patrons) and "others" to include tailgaters, building employees, etc., from the let-out logs, and monthly account holders' activity logs and image recordings.

The event parsing and reconciliation process of these databases on the server creates the possibility for audited reports of actual activity and ensures honest inventory accounting by the parking attendants.

In the existing prior art systems, the opening and closing inventory reports are generated on paper logs and sometimes days later uploaded into auditing software along with the ticket information to reconcile tickets and cash. However, it is contemplated that the SmartDoor System model SDS-0400™, iPortal™ Manager referred to hereinabove can be used to generate the opening and closing inventory report in a manner similar to that shown in FIGS. 17-19 above. That is, the opening and closing inventory report could be generated on an APP (application) on a cell phone, notebook computer such as an iPad®, etc., as the attendant walked through the garage. Such an APP could be made by anyone having skill in the cellphone APP programming arts, given the requirements set forth herein.

The aforementioned attendant could take down license plate numbers or even take pictures of the plates and enter in ticket numbers from windshield ticket stubs or monthly account holder's ID tag numbers. The APP would then upload the information to the server to be parsed into the database via email or hot spot Wi-Fi data link. A QR code (described hereinabove) on the ticket stub could preferably include ticket number and location information allowing quick and efficient scans of current inventory making the effort even more transparent.

Figure 24:
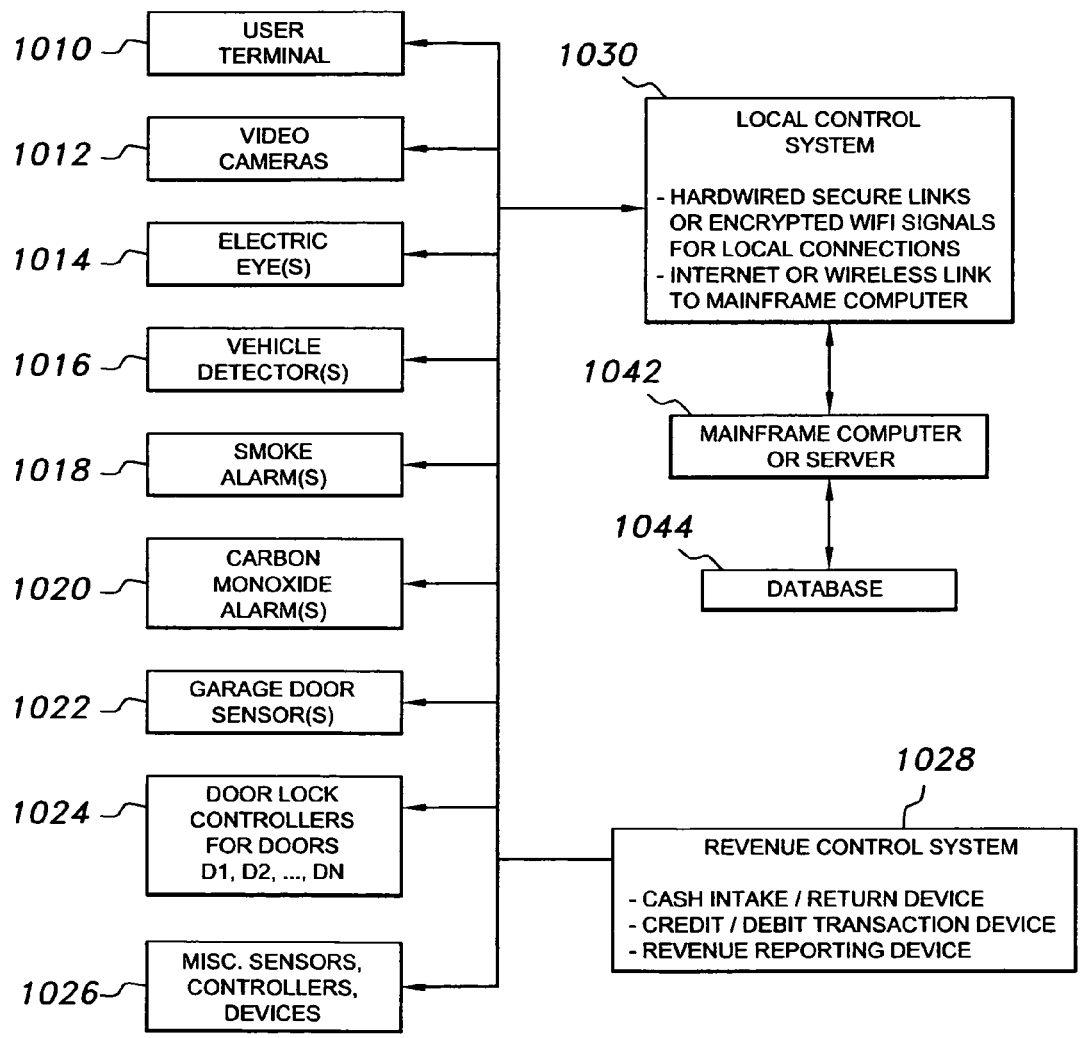
FIG. 24 shows a local control system or Intelligent Network which is in communication with a plurality of elements (discussed further hereunder) which include cameras, sensors, and actuators.

FIG. 24 shows a local control system or IN 1030 or Intelligent Network ("IN") 1030 which is in communication with a plurality of elements (discussed further hereunder) which include cameras, sensors, and actuators. The IN 1030 and the plurality of elements together form an Intelligent Facility Management System (IFMS). The local control system or IN 1030 in FIG. 24 advantageously is hardwired to provide secure links with all local elements, i.e. all elements which are in the same building or nearby buildings, or which can be connected by a secured hardwired connection even at greater distances. The hardwired system preferably has secure links in which the signals are preferably (but not necessarily) encrypted. Encrypted Wi-Fi signals can also be used.

The local control system or IN 1030 is also in communication with a mainframe computer or server 1042, which may be located somewhere near the local control system or IN 1030 or alternatively may be located at a distance therefrom. The mainframe computer or server 1042 is connected to a database 1044, for storing and retrieving information.

The mainframe computer or server 1042 could, for example, be located in the same building as the local control system or IN 1030 or it could be located farther away such as in another state or even on another continent. The communication between the local control system or IN 1030 and the mainframe computer or server 1042 can be by wireless carrier signals such as by satellite connections, by communications based on cell phone technology, and/or by world wide web or internet technology.

In an example of the system, the local control system or IN 1030 is in communication with the following devices: a user terminal or terminals indicated at 1010, video cameras 1012, electric eye(s) 1014, vehicle detector(s) 1016, smoke alarm(s) 1018, carbon monoxide alarm(s) 1020, garage door sensor(s) 1022, door lock controllers 1024 for one or a plurality of doors D1, D2, . . . , DN, and/or other miscellaneous sensors, controllers, and/or devices 1026 which anyone having skill in the control arts, detection arts, and actuator arts would understand as being capable of being used with the local control system or IN 1030.

The local device or non-local internet enabled system 1040 is also in communication with a revenue control system 1028. The revenue control system 1028 preferably includes a cash intake/cash return device or devices, a credit/debit transaction device or devices, a revenue reporting device or devices, ticket spitter or spitters, and a vehicle gate or gates. Thus, the revenue control system 1028 also produces data which is time-stamped and thereby can be reported as "event" data for events as described hereinabove with regard to FIGS. 1-23.

The elements shown in FIG. 24 can be of the type described in detail hereinabove with reference to FIGS. 1-23, including the local control system or IN 1030 and the mainframe computer or server 1042 which correspond to the previously described control systems and computers.

Figure 25:
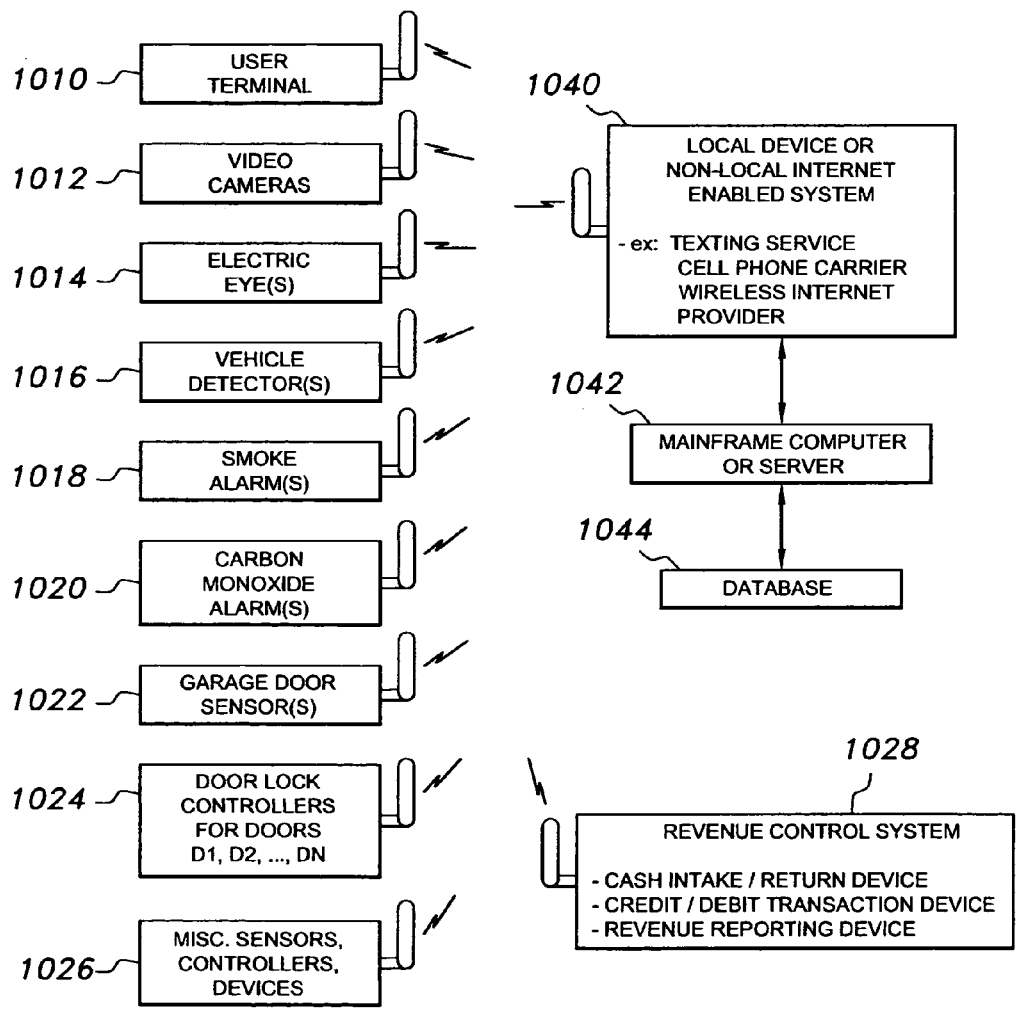
FIG. 25 is generally similar to FIG. 24, but wherein the devices shown therein have antennas for wireless communications, and wherein the local control system of FIG. 24 is replaced by a local device or non-local internet enabled system which likewise has an antenna for a wireless communications device.

FIG. 25 is generally similar to FIG. 24, but wherein the devices 1010-1028 all have antennas for wireless communications, and wherein the local control system or IN 1030 of FIG. 24 is replaced by a local device or non-local internet enabled system 1040 which likewise has an antenna for a wireless communications device.

FIG. 25 also contemplates a mixed type of system, with some devices hard-wired and some devices adapted for wireless communications. In most cases sub-devices such as loops and eyes will generate signals and be hard wired to the device they directly control. The "device" such as the door controller, vehicle gate controller, ticket spitter controller, IP camera, etc., would all be network capable devices able to communicate with the server/mainframe by the cell phone network, Wi-Fi, LAN, etc., as discussed hereinabove as well as in the following.

Prior to the digital age, all sub-devices only controlled their associated device to which they were hard-wired. Each device at that time performed its function based on the signals it received from its sub-devices or signal switches.

In general, each sub-device in the control circuit is an on/off switch. Whether the switch or sub-device is "on" or "off" has a specific control function in regards to the function of the device. It was not possible to create an intelligent network among devices such as door and gate operators, movable barriers, revenue control systems, access control readers, cameras and security system except in a very primitive form using banks of multi-pole relays, hand wired at great cost.

As a brief summary, the system of the present invention contemplates a preferred manner of operation as follows:

1. "All" signals from each specified sub-device can be time stamped and sent as "events" to the server.

2. "All" signal generating sub-devices can be monitored for signal duration. Signal durations that extend beyond a set threshold can indicate that either the subdevice is defective or a named event has occurred. For instance: A stop button that outputs a signal beyond a specified time usually a second or less would indicate a stuck button as the button is usually operated momentarily. As another example, a safety loop detector on a door that outputs a signal beyond five seconds would indicate either a defective loop or a vehicle loiter indicating a situation where a guard should be notified. In the preferred embodiment, a signal duration time threshold would be set for each sub-device signal input. Depending on the sub-device and its function, a person skilled in the functioning art would set the threshold, define the event and send the alert notification to maintenance managers, operational managers or security managers or a combination of managers as well as log the event in the database.

3. "All" signals can be time stamped, but not all of the time-stamped signals need be sent to the server. The specified device could locally store all time stamped signals for a time in its logs, but the person skilled in the art would recognize that not all signals are relevant and might unnecessarily burden the system with useless information. Therefore, the device program written by a person skilled in the art could determine which signals and events (i.e., all or some) would be transmitted to the server. The specified device then instructs transmission of selected ones of the time-stamped signals based on the recognition of the device program as "events", whereupon the mainframe/server assembles event information from the signals it has already received from other devices that have been commanded to be transmitted for association with the specified "event".

4. The device program (also as explained with reference to FIGS. 1-23) can identify combinations of signals, sequences or combinations, sequences and duration of signals and label this signal "set" as an "event" (which can be "named" by a code, time, or other label) and send the specified named event as a time stamped event to the server.

The device program as written by any person skilled in the art could identify a series of signals and their specified duration as "typical" or "normal" for its standard operation. Any deviation from the typical standard signal set could be labeled as an "event" and logged with a name that is assigned to the non-standard signal set or exception. Many non-standard signal sets (exceptions) could be identified and labeled in advance. Previously mentioned in an earlier application (see the "continuing data" on the first page hereof), examples of such additional "events" determined by the signals are: intruders, tailgaters, wrong way drivers, over height vehicles, back-outs, vehicle gate open with loop activity (indicating possible revenue theft), vehicle gate closed with vehicle gate loop activity (possible situation with gate arm removed), no vehicle gate activity but door loop and eye activity (suggesting that the gate has been bypassed or turned off); among many other possible examples.

Many devices have a few signal generating sub-devices that control them and can then be relatively easily defeated (i.e. by intentional acts of individuals, or by accident or malfunction). However, when the signals from a combination of devices, as is typical in a portal area examined by the server program of the present invention that gathers the event data from a plethora of devices (i.e. from many sources), it is significantly more difficult to defeat the security that the device was intended to create.

For example: An overhead door can typically be opened manually by a chain hoist. The security magnetic sensor can be easily bypassed. However, if the manual chain hoist engagement switch that typically keeps the motor from operating while the manual hoist is engaged is brought into the security network, as well as the bottom limit switch via the signal monitoring program in the device, it is much more difficult to defeat the security system.

Another example of the capability of networked devices versus stand alone systems is the use of airport scanners and detection systems. In a particular case flights were grounded, and whole concourses were closed and everyone re-screened, because a scanner was not turned on. News reports were that the event cost millions of dollars. A networked event generating and monitoring system, such as in the present invention, has a server that "expects" events to occur (each of which involves a number of specified, associated signals). It might expect a system "on" event, a scan event and a detect event every so many scan events or through a particular time period. If it failed to receive the predetermined signal log after elapse of a specified amount of time, that could be flagged immediately indicating a possible malfunction or requirement for inspection. This type of system would have prevented the occurrence of the aforementioned airport security problem.

5. Each networked device can communicate to each other networked device so that that:
   A. A sub-device attached to a specified device can provide a "signal" to another networked device or devices. Some examples of this follow:
      1. Safety Eye on a door can trigger a camera.
      2. Safety loop on a door can also act as a reset loop for a vehicle gate which would close the gate.
      3. Safety loop on a door can increment "in" or "out" count on the revenue control system.

4. An outside safety loop can double as a sensor to detect vehicles parked outside the door and blocking the driveway and send notification to a guard or designated administrator.
5. An arming loop for a card reader that could double as a free out loop in the event of reader failure to open a gate or door by changing a setting in the operational program from a remote operations center.

B. An event ID can be generated to tag the event data each device has generated so that the "summation" event data can be assembled from different devices that generate the data. The event ID would include a time-stamp entry initiating a routine where the server uploads image data corresponding to the time interval.

The program on the mainframe computer or server gathers the "events" and parses them into a relational database. Here again the program on the server has the capability to review the event data as it arrives and make operational decisions based on the data and its program as shown in the above-mentioned airport scanning example. It can make new named events from a combination of events, generate reports from a single facility or from a plurality of facilities for each of the event categories or named data cells and send alerts to named administrators with secure login, encryption, etc. as is common in data base management. All of this programming would be within the ambit of anyone having skill in the relational database programming arts.

The local device or non-local internet enabled system 1040 can, for example, employ a wireless data or texting service for communication, or communicate via cell phone technology, or communicate via a wireless internet provider, etc. Such wireless communications from the devices 1010-1028 can be by Wi-Fi or Bluetooth signals in communication either directly with the local control system 1040 or indirectly through use of sub-stations, repeaters, local hotspots, etc.

Furthermore, the wireless communications can employ wireless cell phone technology, such that each of the elements 1010-1028 have cell phone technology built in and are able to communicate with the local control system or IN 1030 by sending messages or data by ordinary cell phone transmissions. Cell phone technology is well known, and anyone having skill in integrating cell phone technology into devices could provide the devices 1010-1028 with such technology.

FIG. 25 shows that the local control system 1040 is in communication with the plurality of elements 1010-1028 (similar to those already discussed hereabove with reference to FIG. 24) which include cameras, sensors, and actuators. The local control system 1040 advantageously preferably has encryption to provide secure links with all local elements, i.e. all elements which are in the same building or nearby buildings, or which can be connected by a secured hardwired connection even at greater distances. Encrypted Wi-Fi signals can also be used.

The local device or non-local internet enabled (IP) system 1040 is also in communication with a mainframe computer or server 1042, which may be located somewhere near the local device or non-local internet enabled (IP) system 1040 or alternatively may be located at a distance therefrom. The mainframe computer or server 1042 is connected to a database 1044, for storing and retrieving information.

Time, History and Size

The terminology "mainframe", "server", "PC", "PLC" has to do with the memory size and the number of work stations connected. However, as computing power has increased and cost has decreased, the differences are more historical in linguistic terminology. In terms of memory, PLC's of today have more computing power than mainframes of the 50's and 60's and can be networked in machine to machine (M2M) systems where one acts as a server or mainframe for a plethora of others. Accordingly, the terminology used herein is regarded as flexible and interpreted in light of modern understanding of these devices. A specific reference to the terminology used herein for distinctions such as: signal, PLC, mainframe, server, communication, detector, device, memory, program, alarm, alarm sensor, alert message, notification, (notify message) machine code, event, internet protocol (IP), Wi-Fi, network, encrypted, exception, database, information, intelligent network, and other distinctions regarding computing and communications and can be found in *Computer Science and Communications Standard Dictionary*, Volume 1 and Volume 11, authored by Martin H. Weik D. Sc., Copyright 2000 (KAP publisher).

The mainframe computer or server 1042 could, for example, be located in the same building as the local control system 1040 or it could be located farther away such as in another state or even on another continent. The communication between the local control system 1040 and the mainframe computer or server 1042 can be by wireless carrier signals such as by satellite connections, by communications based on cell phone technology, and/or by world wide web or internet technology.

In an example of the system, the local control system 1040 is in communication with the following devices: a user terminal or terminals indicated at 1010, video cameras 1012, electric eye(s) 1014, vehicle detector(s) 1016, smoke alarm(s) 1018, carbon monoxide alarm(s) 1020, garage door sensor(s) 1022, door lock controllers 1024 for one or a plurality of doors D1, D2, . . . , DN, and/or other miscellaneous sensors, controllers, and/or devices 1026 which anyone having skill in the control arts, detection arts, and actuator arts would understand as being capable of being used with the local device or non-local internet enabled system 1040.

The local device or non-local internet enabled (IP) system 1040 is also in communication with a revenue control system 1028, similar to that described hereinabove with regard to FIG. 24. The revenue control system 1028 preferably includes a cash intake/cash return device or devices, a credit/debit transaction device or devices, and a revenue reporting device. Thus, the revenue control system 1028 also produces data which is time-stamped and thereby can be reported as "event" data for events as described hereinabove with regard to FIGS. 1-23.

While various forms of communication have been described hereinabove between the devices 1010-1028 and the control system 1040, a relatively new type of communication system has become available, namely machine-to-machine transmission using cell phone equipment and protocols, particularly those related to cell phone locators. In this relatively new communications protocol, numeric data (i.e. machine code) is transmitted instead of voice signals. Certain companies lease this data capability from major cell phone carriers, and then sell the capability to other users.

In the present invention, for example, the machine-to-machine capability can be used, and can be the preferred form of transmission for all components and devices except for the image data, because the images are too large to carry using the machine-to-machine protocol. In the present invention, referring to FIG. 26 and the description hereunder, the video images can be stored with the cameras taking those images, and only transmitted upon request from the control system 1040 using any different (i.e., not machine-to-machine) communication capability, such as any of those described hereinabove including internet, regular cell phone transmission, Wi-Fi, dedicated hardwired line, and so on.

A Further Bus Terminal Example

In addition to the embodiments described in FIGS. 1-23 hereinabove with specific uses, a particularly advantageous system for bus terminals and entire corporate bus systems is described below according to the present invention In this new bus system, one of the input devices requires the driver to swipe or scan his/her driver's license. At that instant, the "event" of scanning the license is recorded, and associated data and images will include photographs of the driver swiping/scanning the license, images of the bus (including bus number, license number, etc.) at that time and/or at the time of departure to provide evidence of existing damage, images of returning buses for comparison to show possible new damage, and possibly also images of the returning drivers for driver verification. The event information would be collated as described hereinabove, and sent to management of the bus operation. The bus system could be a single terminal, or a group of terminals, or even an entire corporate nationwide system of buses. The events of importance are the detected departure and arrival of buses, with actual event information as described above. Such information would be useful for validating condition of buses, timing of departures and arrivals with photographic and sensory evidence, validation of operators and their licenses along with actual photographic evidence of the driver returning the bus.

Further, GPS data from GPS tracking companies such as Virtual Fleet Supervisor and data concerning the trip such as destination, number of passengers, etc. could all be added to the "event" data via integration methodology such as APPS on Smartphones, tablet computers such as Ipads, and/or other devices that are capable of collecting information an transmitting it to a server.

Figure 26:
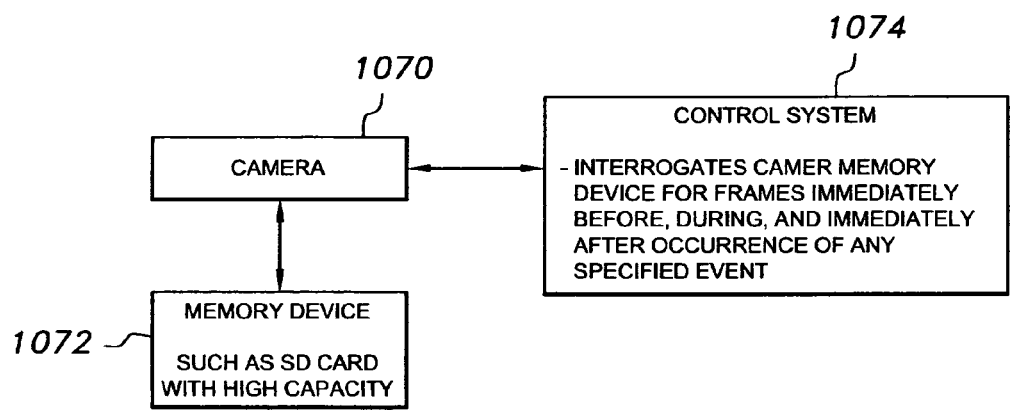
FIG. 26 is a schematic illustration of the connection of a camera and an included memory device for use with a control system.

FIG. 26 is a schematic illustration of the connection of a camera 1070 and an included memory device 1072 for use with a control system 1074. The control system 1074 is similar to any of the control systems used in FIGS. 1-25 hereinabove, except that instead of receiving streaming video and/or frame-by-frame picture information from each of the cameras connected to the system, the camera 1070 stores one to two months' worth of video images in a high capacity memory device such as an SD card with high capacity.

Thus, the camera(s) 1070 themselves store the image data with associated time stamp information, and the control system 1074 interrogates the memory device 1072 when compiling "event" information surrounding specified events, whereupon the video information is supplied by the camera 1070 to the control system 1074 as needed. This arrangement greatly reduces the amount of data traffic, and/or reduces the required bandwidth for communications, as compared with the embodiments shown hereinabove in FIGS. 1-25.

The present invention as shown in FIGS. 27-31 is described in detail as follows.

An access system is shown and described herein that is based on the combination of five technologies. There technologies are: an IP door controller; QR codes; the Internet; a server; and a smart phone with a QR code scanning application. Additional specific equipment will be described within the text hereunder and the system according to the present invention is not limited by the aforementioned.

Smart Phone Technology

A discussion of the smart phone (also spelled as smartphone in the literature), mentioned above as being among the aforementioned technologies, is as follows.

A smartphone is a mobile phone with more computing capability and connectivity than a feature phone. Such smartphones typically include a camera and computing functions. Such smartphones typically can run software referred to as "apps" indicating software applications. The most modern smartphones include web browsers that can access and display standard web pages, and have high-speed data access via Wi-Fi and mobile broadband.

In the following discussion, wherever the word "smartphone" is used, it is intended to encompass all other portable devices having the features of a smartphone, namely communication ability over Wi-Fi and/or mobile broadband, a camera, and computing power sufficient to decode QR codes from an image captured by the camera.

Thus, in the following discussion the terms "smartphone" and "smart phone" cover all existing and future technologies having the features of a smartphone. As noted above, such features include communication ability over Wi-Fi and/or mobile broadband or other communication abilities, a camera, and computing power sufficient to decode QR codes from an image captured by the camera.

Examples of devices which are encompassed include: iPhones, iPads, iPods, tablet computers, netbook computers, notebook computers, PDAs, etc. These examples are not exhaustive, but are merely illustrative of the technologies encompassed.

Video Capture System Variations

In the foregoing, and also in the following, reference is made to cameras for video and/or image capture. Those images are stored and time-stamped for future retrieval and use. Such cameras can be standard cameras which are always on image capture to video recorders. Alternatively, such cameras can be specifically actuated by sensed events such as actuation of a door or door controller, and in that way economize on the number of images captured and stored. For example, a camera can be mounted on a movable gate barrier to better image vehicles front and/or back ends to capture license plate image data as well as images of the driver.

Furthermore, the time-stamped images can be stored in the local storage of the cameras themselves, typically using high capacity SD cards or other local memory devices. Alternatively, the time-stamped images can be transmitted from the cameras to the remote server for storage there, rather than having the remote server interrogate the cameras when the data is needed.

Further, while time-stamped images are mentioned, the present invention contemplates that time-stamped videos can be used as well. Typically, a video (i.e. like a television or movie being shown) is a collection of separate still images, but some technologies may compress or covert such images into video files, and the present invention is intended to encompass all such variations under the terminology "time-stamped images".

How the Present Invention Shown in FIGS. 27-31 Operates

Figure 28A:
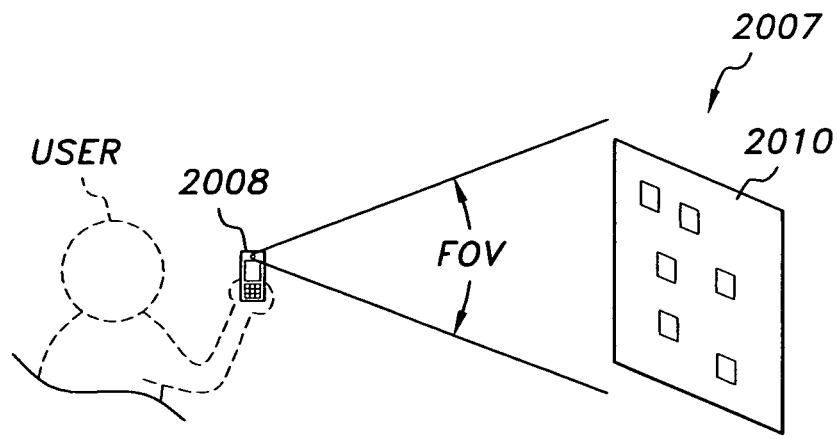
FIG. 28A schematically illustrates a user with a cell phone capturing an image of a static display of a QR code, which may be preprinted or may be reproduced on a display.

A readable image, such as a static QR code 2007 as shown in FIG. 28A, is displayed near a door or access gate that is controlled by an IP door (access) controller. A user with a smart phone would scan the QR code 2007 with the aforementioned QR code scanning application. The QR code 2007 would contain information that directs the scanning application to connect to the access control center on the server through the smart phone's Internet capability. The access control center would check the database to determine if the user is authorized in the system. If the user is authorized and presented the proper credential, such as a PIN, the server would issue an open or access command to the IP door controller, such as the SmartDoor Systems, Inc's iPortal Manager SDS-0400IP. The controller would then activate a routine which would activate a lock release mechanism or provide an open command to the door motor operator. In this manner, access would be granted (or denied) at one or more access points at one or more facilities without the need of keys or keycards.

A more capable embodiment would have the access event be recorded into the access log and an IP camera would provide a picture or video of the access event. The picture or video would be transmitted to and compiled on the server for logging and review of the event as described in this applicant's earlier patent applications and issued patent described hereinabove.

Further refinements are discussed in the following.

Image Missing or Damaged

In the event that the QR code 2007 or "image" is damaged, missing, or unreadable, an access administrator could email a new readable image to support staff that manages the portal related to the image in question. The end user could then scan the image directly from the second user's smart phone thereby initiating the routine to gain access. Or the remote operations center could just open the door by the command protocol on his operations platform that is linked to the portal controller that must be opened as was described in the previously-mentioned pending patent applications and the aforementioned issued patent.

Once or Limited Use Access:

In a pay to park facility a customer could pre-purchase image codes assigned to a specific access point and make them available to clients (or himself) via mail, e-mail fax or any other conveyance where the client would present the image to an authorized agent such as a parking attendant who would scan the image via his smart phone which would be authorized into the system. Upon successful reading of the scanned image code, the client would be able to do one or more of the following: gain access, park free, park with payment from his on-line parking account, electronically pay for access, or be allowed to enjoy whatever privilege the holder is authorized to receive. A further embodiment would have a flat screen display panel located in visual range that would display the image read acknowledgement for both the "in" (access) and "out" (egress) event. The server could calculate the time lapsed and the resulting charges that accrued to the parking customer. The system could deduct and register the payment from the user's on-line parking account and display the transaction on the screen without the need to make payments in cash to the attendant who may or may not report the transaction, or; make the payment in cash or credit card as determined by the system and displayed on the screen.

Dynamic/Digital Time-Sensitive Codes

If higher security is required, a dynamic, digital version of the QR code 2009 (shown in FIG. 28B as an QR code active display 2009) can be displayed through a digital display. This QR code 2009 will grant access to the system in a similar manner to the aforementioned static codes, but will include the timestamp encoded with the payload. Upon decoding the payload, the access control center would take this timestamp into consideration when denying or allowing access. If a pre-defined period of time has passed since the QR code's initial generation, access will be denied despite a user's credentials. The dynamic QR code could be updated periodically at pre-defined increments.

In the event that a digital display is not feasible, hard copies of the codes can be updated periodically to address security concerns. On-site technicians can print out these codes and display them as necessary.

On-Demand Payments

Upon scanning the QR code 2007 or 2009, an option for the user to pay via an online payment portal would be provided. Users can use this portal to make a payment with a credit card. Upon receiving notice that the payment was successful, the access control server will submit the command to grant the user access.

Internet Failure; Wireless Access

A local server with a wireless login can provide a local "hot spot" a user would log onto through his/her Smartphone's Wi-Fi connection. The local access controller can keep a log of all previous users who were authorized, and follow protocols to periodically scrub the database or to update it with a primary server-based data file when the connection is active. Since many uses are routine, access can be granted if it was granted previously from the locally based database.

In summary, the present invention shows a system which overcomes the problems associated with keys, cards, and money and presents a way to manage the gaining of access to a plurality of scattered locations, tracks and logs those who have gained access, charges those who should pay and presents a universal way (for those with smart phones, which encompasses many persons already and in the future may include just about anyone) to have access granted or denied with nothing more than their smart phone.

Figure 27:
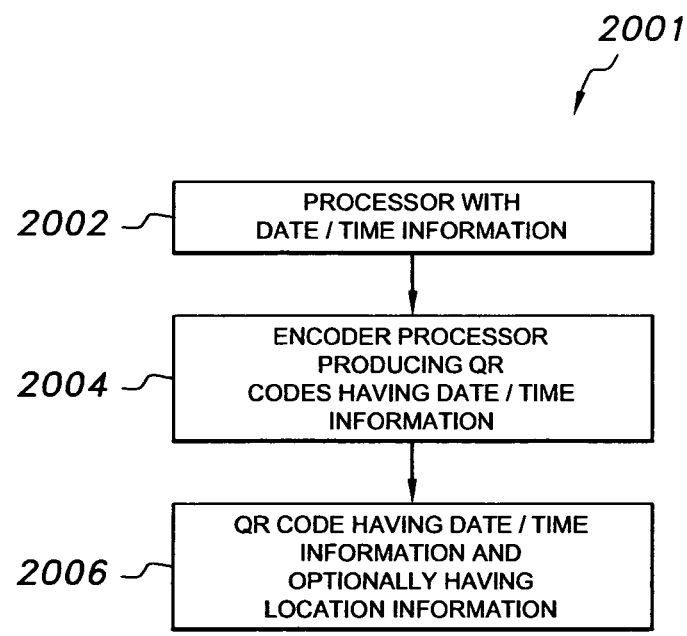
FIG. 27 schematically depicts elements usable in an apparatus for producing QR codes in a parking management system.

FIG. 27 schematically depicts an apparatus 2001 for producing QR codes in a parking management system. The apparatus 2001 includes a processor 2002 which produces date/time information, and an encoder processor 2004 receiving the date/time information from the processor 2002 for producing QR codes having date/time information. The apparatus 2001 produces an output as a timestamped QR code 2006 from the output of the encoder processor 2004, in which the output timestamped QR code 2006 incorporates date/time information.

The QR code 2006 in FIG. 27 represents the current date/time information, so that the timestamped QR code can be used to timestamp a current date/time. The QR code 2006 is useful in conjunction with a smartphone, so that a user can conveniently record an arrival or departure time for billing purposes or for other timekeeping purposes. For example, a workman performing tasks in a facility can use the timestamped QR code 2006 to record start/stop times for tasks, or to record the workday start/end times for payroll purposes.

The timestamped QR code 2006 can be produced on a changeable display. Such displays can include a computer monitor, a tablet computer, an e-ink reader, a standard or HD television display screen, or LED screen, for example. All types of changeable display are contemplated as being usable with the timestamped QR codes 2006 of the present invention.

Alternatively, the timestamped QR code 2006 can be produced in a hardcopy printed format. For example, the timestamped QR code 2006 can be printed on paper or other substrate. The printed version of the timestamped QR code 2006 could then be taken, for example, to a QR code scanner at another location such as an exit portal, a pay station, or other location where the timestamped QR code 2006 would be needed.

Where the user is able to capture the timestamped QR code 2006 on a smartphone type of device, the QR code could be used either in conjunction with a programming "app" installed in the smartphone, or alternatively the QR code itself could be simply displayed on the smartphone for presentation to scanners located at appropriate locations in a managed facility. In this manner, the timestamped QR code 2006 can also be used as an authorized identification to permit passage through portals where the user is authorized to pass. For example, a parking lot patron would have access to different areas than a parking facility manager, a parking lot attendant, or a workman. In fact, different levels of access can exist for different types of users, all programmable into the system described hereinabove. The printed version of the timestamped QR code 2006 would be useful where the user needs to take the date/time information from one location to another, as noted above.

While timestamp information is discussed hereinabove, it is also contemplated that the timestamped QR code can contain location information as well as date/time information. That way, the location where the timestamp was given is also encoded, which can be used in the management system for various purposes, such as for patron parking fees, workman task recordkeeping which includes both location and time/date information, security patrol path documentation, and so on. There may be uses where location information alone is relevant, such as for recognition of managerial authorization permitting access to all of the areas of the managed facility, and the management system discussed hereinabove can be programmed for such recognition.

FIG. 28A schematically illustrates a USER with a cell phone 2008 in the process of capturing an image of a QR code 2010 produced by any type of QR code generator. The QR code 2010 represents an identifier for a portal located in the vicinity of the QR code 2010. As described hereinabove, the QR code static display 2007 can be a simple printed display mounted on a wall, and the portal near this QR code is actuatable by a controller as described hereinabove in response to permission granted in response to the USER's smartphone capture and use of the QR code static display 2007.

Figure 28B:
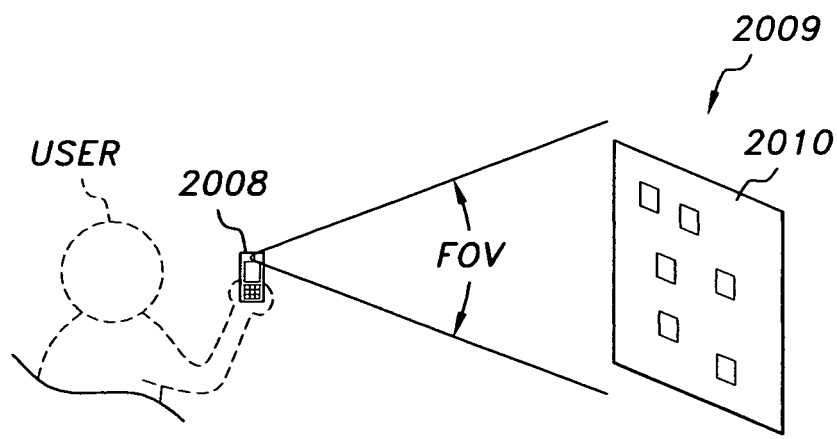
FIG. 28B schematically illustrates a user with a cell phone capturing an image of a QR code active display, which is produced by the apparatus shown in FIG. 27 and which can be either in printed format or shown on a display.

FIG. 28B schematically illustrates a USER with a cell phone 2008 in the process of capturing an image of a timestamped QR code 2010 produced by the QR code generator apparatus 2001 of FIG. 27. The timestamped QR barcode 2010 of FIG. 28 corresponds to the timestamped QR code 2006 of FIG. 27. The timestamped QR barcode 2010 is captured within the field of view FOV of the cellphone 2008.

The timestamped QR barcode 2010 of FIG. 28B is displayed on a QR code active display 2009. Such displays can include a computer monitor, a tablet computer, an e-ink display of an e-ink reader, a standard or HD television display screen, or LED screen, for example. All types of changeable display are contemplated as being usable with the timestamped QR barcode 2010.

In FIG. 28B, once the USER captures the timestamped QR barcode 2010, that timestamped QR barcode 2010 can be used at access or payment locations either by simply presenting the captured timestamped QR barcode 2010 on the display of the smartphone, or alternatively this can be accomplished by processing of the timestamped QR barcode 2010 by the smartphone using an "app" such that the smartphone itself can provide the authorizations or payment as needed. For example, entry/exit doors can be unlocked or locked in response to the signal, or a payment can be deducted from a credit card, using the information encoded in the timestamped QR barcode 2010. In another example, where a workman or security guard uses the timestamped QR barcode 2010 with a smartphone app, the various entry/exit portals can likewise be opened or locked depending upon the access authorization of the workman or security guard while at the same time enabling the management system to track the progress of the workman through the facility.

Figure 29:
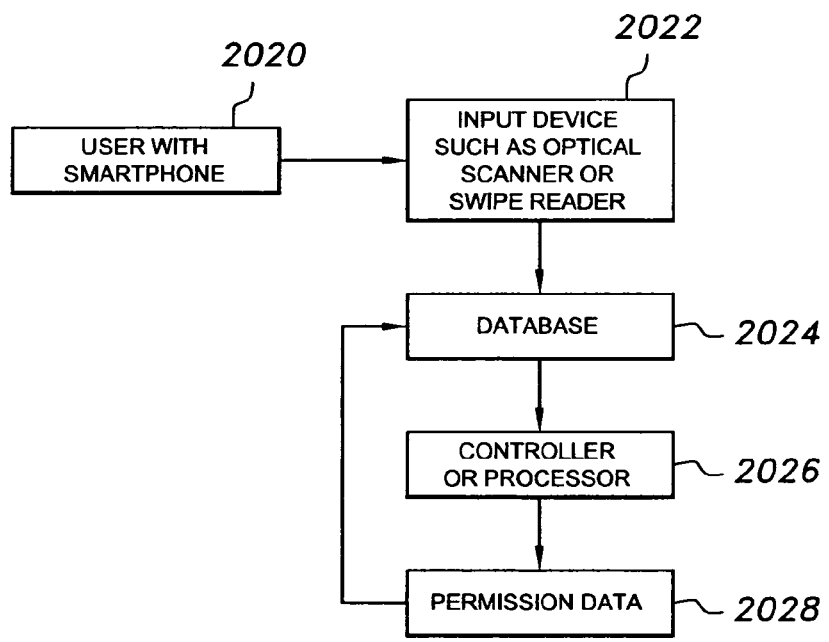
FIG. 29 schematically depicts an apparatus for storing and accessing information in a management database, including providing permission data, in the QR code system of FIGS. 27 and 28.

FIG. 29 schematically depicts an apparatus used with the aforementioned system for storing and accessing information in a management database, including providing permission data, in the QR code system of FIGS. 27 and 28A and 28B. In this figure, a USER begins the initial process for gaining permission by registering his/her information with a database.

As shown in FIG. 29, at step 2020 a USER with a smartphone accesses an input device at 2022 to begin the registration process. The device can be a scanner or swipe reader 2022. The input data registration is supplied to a database 2024, following which—in later uses—a controller or processor 2026 accesses the database 2024 to grant or refuse access in the form of permission data 2028. The permission data can also be sent to the database 2024. The database 2024 is accessed at later times by the device and system of the present invention as described hereinabove, for granting or refusing access at one or more portals which are controlled by the permission data.

Figure 30:
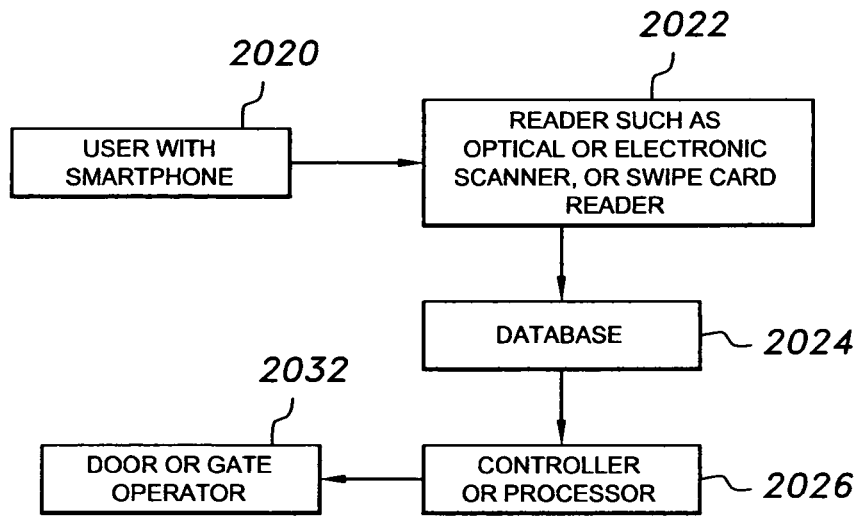
FIG. 30 schematically depicts an apparatus for accessing information in a management database, using a smartphone device, in the QR code system of FIGS. 27-29.

FIG. 30 schematically depicts steps used with the above-described apparatus and system for accessing information in a management database, using a smartphone device, in the QR code system of FIGS. 27-29. In this view, at step 2020 a USER with a smartphone appears at a portal having a QR code display nearby. At step 2030, the USER having scanned the QR code into a smartphone "app", the smartphone sends the processed QR code data into the system as described hereinabove above (e.g. using a Wi-Fi or other internet communication) where a database is consulted (Step 2024) to grant access permission, and at Step 2026 a controller or processor responds to the permission by operating a door or gate operator as shown at Step 2032.

The steps shown in FIG. 30 are schematic and illustrative, and not limiting. For example, as shown in the dashed outline in FIG. 30 the result of Step 2030 could go to the processor first, which may in turn consult a database.

Figure 31:
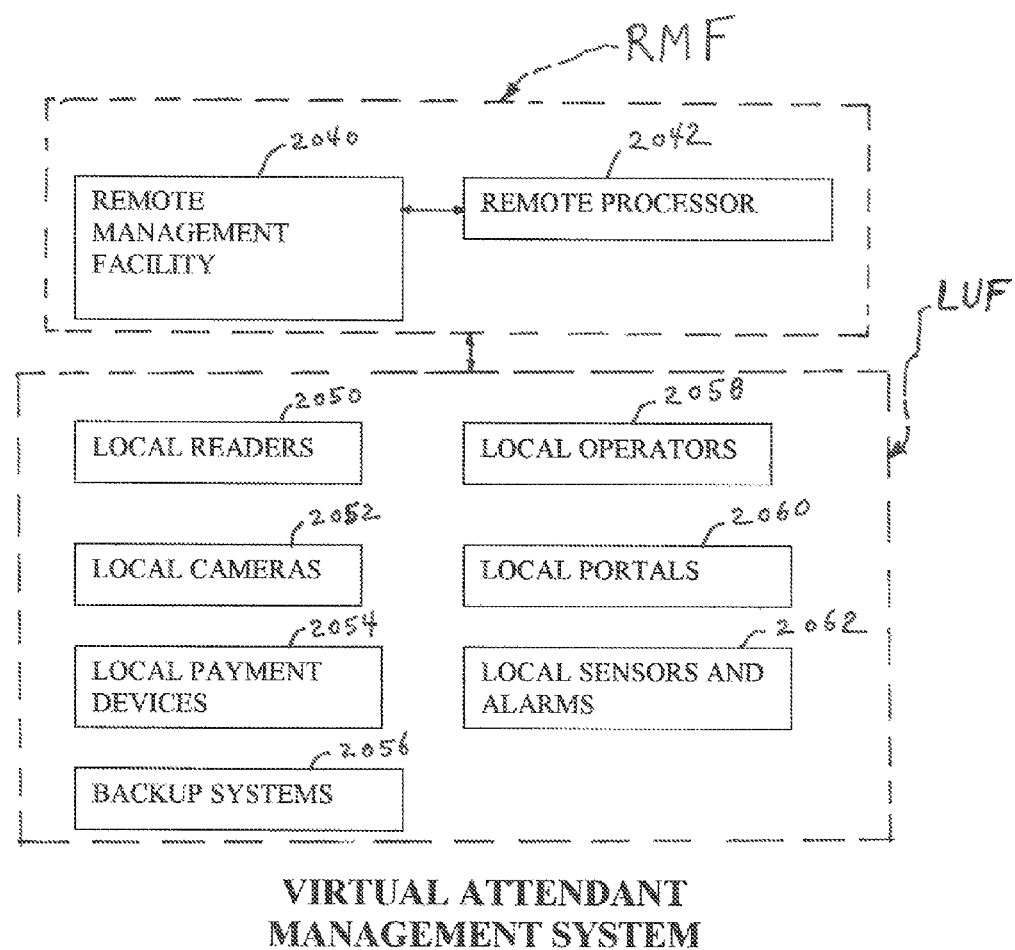
FIG. 31 schematically illustrates a Virtual Attendant Management System having a Remote Management Facility (RMF) and a Local Unattended Facility (LUF), according to the present invention.

FIG. 31 schematically illustrates a Virtual Attendant Management System having a Remote Management Facility (RMF) and a Local Unattended Facility (LUF). In this view, the RMF includes a remote management facility office 2040 and a remote processor 2042. The LUF includes a plurality of local readers 2050, a plurality of local cameras 2052, one or more local payment devices 2054, optional backup systems 2056 (which can be omitted), a plurality of local portal operators 2058, a plurality of local portals 2060, and a plurality of local sensors and alarms.

The management of the LUF is within the purview of the aforementioned prior pending patent applications and issued patents, using the aforementioned system SDS-0400IP. The management of the RMF can be an independent entity, such as a management company, which can operate one or a plurality of LUF locations.

Thus, the system shown in FIG. 31 represents a Virtual Attendant Management System.

Additional Features

It is contemplated that the controller system and other components can be Bluetooth enabled, such that remote diagnostic and/or remote control equipment can be used when in proximity therewith. The typical mounting locations for some equipment are ceiling mounts, which can be hard to reach, and therefore there is a convenience associated with having such equipment Bluetooth-enabled for diagnostic and/or control purposes. The diagnostic device would have a similar Bluetooth capability, in order to communicate with the other Bluetooth-enabled equipment and devices.

Once a blue tooth module is provided on the controller, it is possible to eliminate the controller diagnostic screen which is costly and often inaccessible. It is also contemplated as being within the scope of the present invention to have blue tooth diagnostic capability to link to any paired smartphone and also use the blue tooth capability for access control.

Blue tooth diagnostic capability would allow service tech personnel or engineers to figure out service problems and email reports to the service center if LAN or Internet communications were down, or alternatively this can be provided for a stand-alone non-IP unit.

Working Example of Use of the Foregoing Embodiments

The way the Credit Card access works at typical companies is that a USER drives up to an ingress terminal and swipes their card. The system records their card data and authorizes their card in the system. The USER can then leave on foot and return through a locked door by again swiping their card on an access reader. On exiting the garage by vehicle, the USER swipes their card at the exit machine, the toll (fee) is calculated and the machine vends the gate for their exit. A variation has a preset fee charged to the card before the exit event.

New PCI rules on credit card data security may effect this capability although the industry offers PCI compliant technology.

In Regards to the Event Logging Technology and the Camera Data:

The commercially available equipment mentioned hereinabove used in the present invention has the current capability at this moment, from any device or devices, to create an event ID and pull video from any number of cameras. In essence then it is possible to "freeze" time. There are many uses where this could be important, for example in places where one of the sensors is a gunshot detector, it can be crucial to know what events where happening at times prior to and just after the gunshot using the timestamped data and images.

The above gunshot example is just one of many possible applications. Industrial processes, chemical processes, school access, hospital drug vaults, speed cameras, warehousing, etc. all have use for this type of application. All one has to do is have broadband available, hang a camera(s), mount the commercially available panel used in the present invention, and connect to the event trigger device. The event trigger named device with on/off time stamp event is sent to a server. The server can then interrogate any system camera or cameras for imagery data at a particular time(s). All the imagery together has the capacity to freeze time in a defined area for analysis. The server has full log-in access security with multiple level access and multi-level grouping. These capabilities are described hereinabove as well as in the above-identified prior patents and pending patent applications.

Image Capture Discussion

To capture the images of an event, the cameras are in a continuous capture mode. In one preferred embodiment, each image is timestamped and stored on an SD card in the camera. When a controller identifies an input event that it is set to trigger on, it sends an event message to the server that contains the timestamp when that event occurred. After a timeout period or an end event input, for example when a door starts to open and the end is when the door finishes closing at the end of the cycle, the controller sends end event to the server with another timestamp. The server uses these events and the timestamps to determine what camera to get images from and what time range of images to retrieve. The server can also be set to capture images seconds or minutes before and after the event timestamps. This makes it possible to capture images of an event before it happens and while it happens so a viewer such as a manager or supervisor can see the entire event. The server also sends periodic time and date synchronization data to the camera and the controller to make sure the timestamps of the images and the events from the controller match up.

Some Examples of Use:

The following is a brief summary of examples of potential use for the invention described hereinabove:

For the parking industry—Customer/location/door (device)/reader.

For military—Command/division/storage facility/door (device)/reader.

For Fire companies: County/engine company/door(device)/reader

For industry: Facility/building/room/door(device)/reader.

DEFINITIONS

The "reader" is any security access device: card reader, # pad, RFID, biometric, etc. Any device that has Wiegand Standard output. (Card reader, pin pad, Radio transmitter)

Event Trigger—Any device (detector) that has a on/off or low/high/off switching capability.

Plain English messaging—All event trigger devices can be named in plain English (or other language) and the name is carried through the database.

For example—Door two-latch switch.

Database search engine—similar to e-mail search engine. Search by key word/facility/device/time/Camera(s):

Camera(s): Any number of cameras video can be associated with the event. Each triggering device allows designated cameras to have their feed pulled into the event file.

Industrial machine/process control—In addition to the event logging capability, the SDS-O400 panel is resource rich in process/machine control capability. There are 32 inputs and 14 relay outputs all controlled by an FPGA create a reliable control platform. There is USB in/out, Ethernet, 2-RJ45, serial port, and these allow connection to a plethora of devices. On board SD cards and flash memory provide a memory rich resource environment for programs and data.

In all of the foregoing, wherever reference is made to intermittent image capture by cameras as shown and described, it will be understood that continuous image capture by such cameras is also contemplated. In the past, memory costs and size limitations might have made such continuous image capture impractical or non-cost-effective, but currently improvements in technology permit greater image storage for such cameras while maintaining a relatively small size and relatively low cost. In use of the cameras, in the present invention each image captured is time-stamped by the system (e.g. by the SDS-0400IP controller, or by separate software located within each camera, or by a remote computer, or by other ways using computers or processors).

Figure 32:
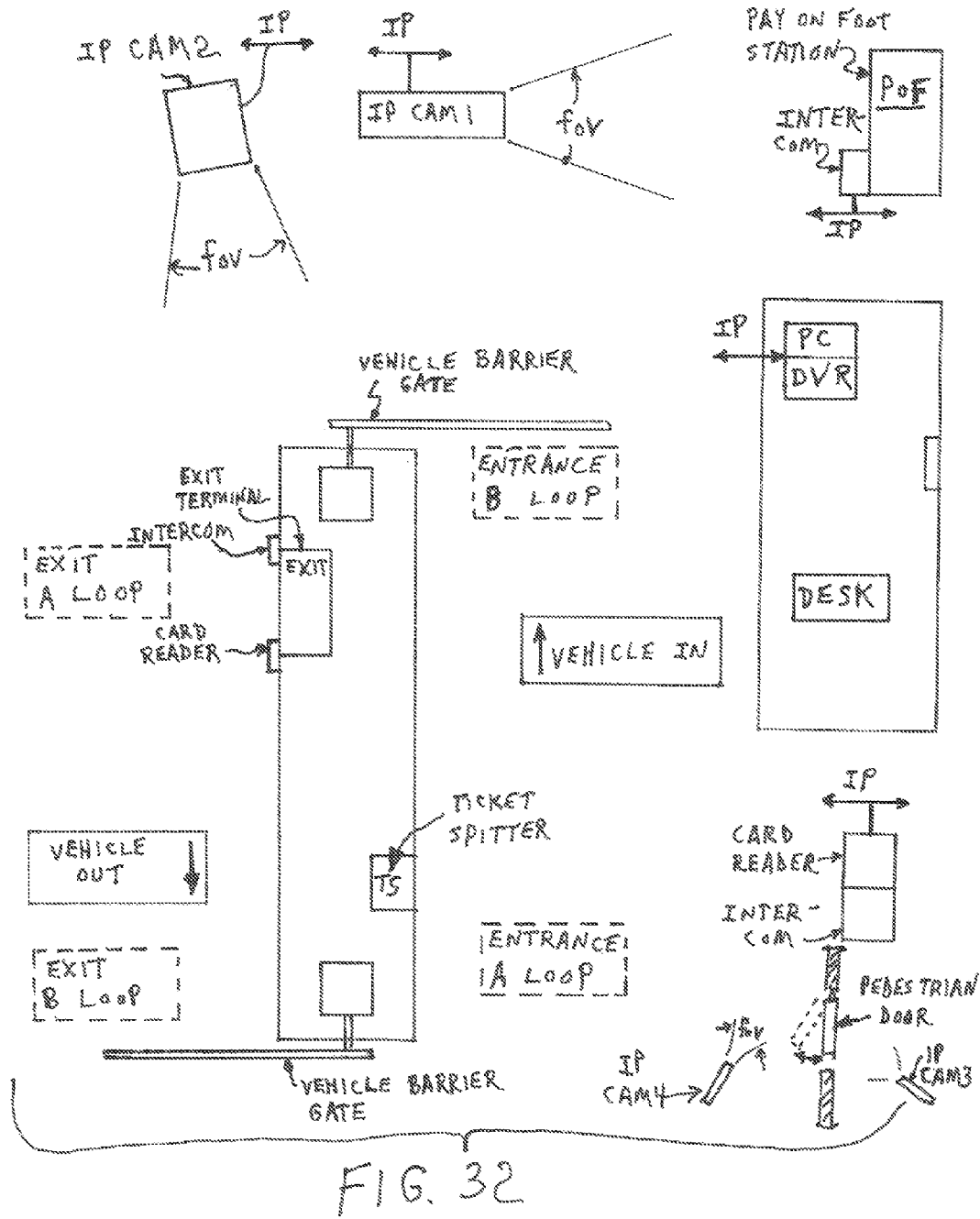
FIG. 32 schematically illustrates an overview of a parking facility including a pay-on-foot system with intercom and a pedestrian door with intercom.

FIG. 32 schematically illustrates an overview of a parking facility including a pay-on-foot system with intercom and a pedestrian door with intercom. The elements are as labeled in the drawing, as are described further as follows.

In the overview of FIG. 32, vehicles go in the lane marked "Vehicle In" and go out via the lane marked "Vehicle Out", with the respective arrows showing the direction of movement. The vehicle going on the "Vehicle In" path will pass over an "Entrance A Loop" (shown in dashed outline) and an "Entrance B Loop" (also shown in dashed outline) for the purposes described hereinabove. The vehicle going on the "Vehicle Out" path will pass over an "Exit A Loop" (shown in dashed outline) and an "Exit B Loop" (also shown in dashed outline), also for the purposes described hereinabove.

In FIG. 32, a ticket spitter TS is shown to provide a way for the user to pay and later exit from the premises. When taking the ticket, in a typical operation a vehicle barrier gate is opened, and such a barrier gate is schematically shown in the upper portion of the figure. An exit barrier gate is depicted at the lower portion of the figure, in the "Vehicle Out" path.

Several cameras are shown schematically, for typical uses, and are labeled IP CAM1, IP CAM2, IP CAM3, and IP CAM4. The double-headed arrow labeled IP near each device in FIG. 32 is used to indicate an IP type of connection which communicates data to a central device or computer such as the PC/DVR schematically shown in an office with a desk. In FIG. 32, the small box to the right and slightly above the desk schematically indicates an intercom.

The intercoms shown in FIG. 32 are shown as being connected for VOIP use. The intercoms shown have a "vend" function to remotely open the associated gates where the individual intercom is located. However, it will be understood that the intercoms can be of any known variety, for example communicating by telephone land lines, or by remote radio broadcast, and so on.

In the lower right hand portion of FIG. 32, a pedestrian entrance is shown having a card reader, intercom, pedestrian door, and an IP connection to the card reader and intercom.

In the upper right hand portion of FIG. 32, a pay-on-foot (POF) station is shown. This allows the user to insert their ticket and pay by cash/credit/debit/ and/or /prepaid card, for example. The POF station also has an intercom with an IP connection. The user then takes the ticket to their vehicle and goes to the "exit terminal" of the "Vehicle Out" lane. An IP connected intercom is also provided near the "exit terminal" along with an IP connected "card reader."

The IP cameras mentioned above each have a field of view ("fov"), to watch different parts of the system shown and described with reference to FIG. 32.

In the above-described typical system shown in FIG. 32, all of the devices are linked by broadband to a Virtual Attendant Control Center (shown in FIG. 32 by the desk and PC/DVR). This Virtual Attendant Control Center can be distant from the other elements shown in FIG. 32, and can preferably remotely observe and operate a plurality of such locations—even dozens or hundreds of such locations can be observed and operated by the system of the present invention.

In currently available systems, typically the revenue control, cameras, and intercom equipment are separate systems. Although they can be displayed at one location, those systems cannot provide the possibility of management supervision since no time-stamped data are provided. However, by contrast, the Virtual Attendant Control Center of the present invention can be implemented for IP door controllers, IP cameras, and IP reader systems already using the commercially available SDS-0400IP controller which provides time stamp information, among other features. A management function uses the time-stamped data in a manner as described in the foregoing, to generate useful data and alerts/alarms to management personnel.

In the embodiment shown in FIG. 32, where conventional equipment is used, some modifications may be required to make the equipment IP connected. Such modifications would be within the ambit of skill of one have ordinary skill in the art of control systems, and could include sensors or detectors, and/or the installation of signal splitters to take and analyze data from the individual devices.

Virtual Attendant™ Dashboard Software and Platform: Multi-Facility Management Platform The following is a discussion of the Virtual Attendant™ Management System and Virtual Attendant™ Dashboard Software and Platform, for management of multiple facilities. The facilities managed can thereby be in the dozen or hundreds, for example, or more.

Historically, the access, security and equipment operation platforms have been separate systems. This separation evolved because of separate development paths perused by the different industries involved. In previous applications, this inventor (Martin H. Weik III) discussed the limitations that accrue to separate systems and the possibilities offered by system integration with the added idea of time-stamping input signal data and using that time-stamped data in a management system; thus bringing the different technologies together on a single platform. In addition, this inventor discussed the capability of the SDS-0400IP in the generation of an event ID that the server would use to pull together all the associated data and imagery into a single data file. In a more scaled down system for a pedestrian door, and part of the present invention as shown in FIG. 32, an associated IP intercom and or associated IP reader system is programmed to generate an event ID which is then sent to the server and used to generate a consolidated data file to include the timestamps necessary to pull camera or DVR data—as well as other data from devices connected to the system—to the server.

As stated in previous applications noted at the beginning of the present application, the rise of digital technology and IP capability including internet on a chip technology, has created a technological opening that allows for cost effective integration of access, camera and equipment control systems. The process of integration has been made possible by platforms such as the SDS-0400IP door controller by SmartDoor Systems, Inc. Furthermore, IP camera systems such as the SC Black model BLK-IPS102M camera and server-based access control technology and server-based intercom systems such as the Aiphone AN-8000 IP network series or the Commend GE 800 IP series—each modified by the necessary programming—could generate an event ID (time-stamped) when activated and/or when deactivated, whereupon the system server discussed herein would use that data and time information to pull imagery and/or other networked-based data from additional sources as directed by its program. This creates the possibility of expanding the data collection net beyond the localized event log generated by the immediate device and to name the events as items within a larger context. For instance: If networked device A (intercom) is activated and generates an event ID, the server program may be tasked to pull image data related to that location.

When designing an integration platform for IP equipment there are a number of primary factors to consider: data generation and transmission rates, data storage and management, and data access and/or human interface (HI). Of secondary importance are links to associated internet based information that may be of importance to the system user that can be linked digitally into the HI display menu or dashboard.

The possibility of integration is theoretical, however, until one succeeds in providing a system, device, and/or apparatus for implementing it; which has been done by the inventors of the present application. In the following is a discussion of the various obstacles to integration and the unique way the present invention overcomes the limits of the technologies involved.

Section 1: Data Generation and Transmission Rates; File Generation; Storage and Transfer.

In a successful integration, some basic questions need to be addressed at a very fundamental level such as:

1. Will the systems various processor(s) have cooling fans? Many operational environments are not climate and dust controlled. Any system that requires a cooling fan will, as a result, create operational problems as the heat sinks clog with dirt and overheat.

2. Are the various data networks involved—internet, Ethernet, intranet—capable of handling the data flow rates usually measured in mbps of the various devices?

3. Do the various pieces of memory media have the necessary read/write capability to support the data acquisition, storage, data buffering and transmission requirement?

4. Can the server and its software handle the data inflow, system operations functions and human interaction(s) simultaneously from one unit? Is it scalable to a thousand units and beyond?

5. Do critical control functions that provide motion control to large, heavy objects have the capacity to function safely in the event of network or data reporting system failure? And can the networked controller handle control, data acquisition, data transmission and network functions simultaneously without crashing?

6. Can the controller be cycled on and off without damage to boot loader files and boot up critical control functions quickly?

As technology inevitably evolves in the faster, more capable, less expensive direction, it is inevitable that different solutions to the foregoing will arise. All of the potential future technological developments and advances will be considered within the scope of the present invention. For instance: "Spintronic" technology now being researched would offer the potential to consolidate two or more of the below named memory devices into a single unit, if and when such technology becomes available.

Each of the foregoing questions and possible solutions to the design issue involved will be addressed below.

With regard to item 4 above, a single server instance can support operations from multiple units and the system as a whole can be expanded as necessary. Additional hardware may be added to the system to handle operations. Units will be associated with certain server instances to balance the load as required.

With regard to item 6 above, system Memory Devices may include:

Flash memory, Field Programmable Gate Array (FPGA), Secure Digital (SD) memory card, main multi-thread processor, secondary main processor, SD computer, Camera SD card, and the server itself.

Flash memory provides a stable and reliable residence for the boot loader and basic configuration files. This allows the unit to be "hot" cycled on and off without file corruption. The flash memory also loads quickly allowing system operation to begin in fewer than five seconds from power on.

The FPGA provides hardware logic including state machines that are very fast, more stable and reliable than software that runs on the main processor. All hardware input and output circuits are connected to the FPGA. The FPGA logic can respond to events that require a response within micro seconds regardless of what the processor is doing. This is especially important for safety circuits that need to be continuously monitored and provide immediate feedback to output circuits to prevent accidents. The FPGA also provides logging with timestamped events of all input and output activity that the processor can retrieve during its normal operation. Because the FPGA preforms these functions the processor does not have to monitor critical inputs and outputs in real time.

An SD memory card can provide a relatively large amount of storage space for system generated data files. The SD card is also used to temporarily store updated configuration information and the main operating systems while the flash memory is updated. If the card is corrupted it does not affect continued safe equipment operation. The system can reboot from the flash memory and clean the SD card for continued operation.

Main processor—runs a multi-threaded kernel that provides access to hardware such as the FPGA, network interface, flash and SD card memory. The threads that run in the main processor each provide a service. There is a thread for communications to the secondary processor, one for network communications, another for FPGA monitoring, and one for maintaining a connection to the server and sending data to it.

The main processor also contains ROM, FLASH and RAM along with several peripherals that are used for communications and connection to external peripherals. The ROM in the main processor contains a low level monitor application that supports updating the internal FLASH over a serial port. The FLASH in the main processor contains a boot loader that is used to boot the main operating system. This boot loader can load the operating system from several different locations including NAND FLASH, SD CARD, Ethernet or USB memory devices. In a typical system the main operating system is stored in NAND flash and loaded to SDRAM during the boot process. The operating system then loads device drivers to interface to all the peripherals and memory devices on the board.

Secondary processor—the function of the secondary processor is to receive commands from the main processor to update the user interface on the display and to monitor input from users and Wiegand and serial reader devices. When data is received from an input device it is reported back to the main processor.

The SD Computer—Mini PC (no fan preferred) accepts video feed from camera(s) and stores captured images; facilitates the retrieval of images by the server.

The camera SD card—can hold images for retrieval from the server.

The server—the server parses event data received from the main processor and stores the parsed event data in the database for manipulation by the system and users; retrieves images associated with events from cameras or SD computers; and addresses operational user concerns of different stakeholders involved in facility operations as mentioned in the previous applications cited in the continuing date at the beginning of this application. The server associates images with events by retrieving the camera or SD computer relationships with the specified unit included in the event data payload.

Server storage—hard disk drive; stores files retrieved from peripherals or other components.

System database—relational database; holds event data and image meta-data.

In one preferred embodiment of the invention, the parking facility has no cashiers on site, and the intercoms are provided with VOIP and—upon activation of the intercom by a user—generates an event ID. The event ID would then allow the server to pull the picture record for the event from the DVR or directly from the camera memory.

The intercom in this embodiment would act as the SDS-0400IP panel in this regard, and can already vend a door or gate.

Currently, the IP intercom operates in real time as a voice link with a remote open capability only. The cameras roll tape to a DVR usually on motion detection, but the actual use of the intercom or use of the POF or exit station is not specifically linked to the camera imagery with video event logging by named events from named equipment.

The invention being thus described, it will be evident that the same may be varied in many ways. Such variations are not to be regarded as a departure from the spirit and scope of the invention and all such modifications are intended to be included within the scope of the claims.

What is claimed is:

1. An intelligent facility management system for a facility, comprising:
 a computer;
 a database in communication with said computer;
 a task tracking means in communication with said database;
 an access management means in communication with said database, for supplying event information to said database;
 a vehicle detecting means in communication with said database, for supplying event information to said database;
 a plurality of sensors which have respective output signals, said plurality of sensors being in communication with said database; and
 an alert means in communication with said database, using said event information;
 wherein said vehicle detecting means and said plurality of sensors communicate with said database via wireless signals sent to and received from a wireless receiver which is in communication with a mainframe computer and with said database; and
 wherein said sensors include at least one camera having a high capacity SD memory card, software for associating a time stamp with each image captured by said at least one camera, and wherein said database can interrogate said at least one camera to receive only the images associated with a specific time;
 whereby said computer uses the event information supplied to said database to compile an event library which is configured to generate alerts, compile reports, and control access to and egress from the facility.

2. An intelligent facility management system for a facility as claimed in claim 1, further comprising a network providing communication with said database and with said computer.

3. An intelligent facility management system for a facility as claimed in claim 1, wherein said sensors supplying output signals include at least one of the following: video camera, electric eye, smoke alarm, carbon monoxide alarm, door sensor, and door lock controller.

4. An intelligent facility management system for a facility as claimed in claim 3, further comprising an event monitor for recording an event which includes providing a time stamp for the event.

5. An intelligent facility management system for a facility as claimed in claim 1, further comprising a revenue control system.

6. An intelligent facility management system for a facility as claimed in claim 5, wherein said revenue control system includes a cash intake/return device, a credit/debit transaction device, and a revenue reporting device.

7. A virtual attendant management system for remote management of a local facility, comprising:
 a remote management facility having a remote processor which is remote from the local facility;
 a database in communication with said remote processor, said database being remote from the local facility;
 an access management means in communication with said database, for supplying event information to said database;
 a vehicle detecting means in communication with said database, for supplying event information to said database; and
 an alert means in communication with said database, using said event information;
 said remote processor receiving said output signal of said at least one intercom and adding date/time information for storage in said database as event information;
 wherein said local facility comprises:
 a plurality of local readers;
 a plurality of local cameras;
 at least one local payment device;
 a backup system in event of failure of communication with said remote processor;
 at least one local portal,
 at least one local operator for operating a barrier associated with said at least one local portal; and
 at least one local sensor;
 whereby said computer uses the event information supplied to said database to compile an event library.

8. A virtual attendant management system for facility as claimed in claim 7, wherein said event information is used to generate alerts, compile reports, and control access to and egress from the facility.

9. A virtual attendant management system for facility as claimed in claim 7, wherein said local facility comprises at least one local portal, and at least one local payment device.

10. A virtual attendant management system for facility as claimed in claim 7, wherein said local facility comprises at least one local portal, and at least one local payment device; and wherein said at least one intercom communicates with said remote facility using VOIP.

11. A virtual attendant management system for remote management of a local facility having intercom access and at least one pay-on-foot station, comprising:
 a remote management facility having a remote processor which is remote from the local facility;
 a database in communication with said remote processor, said database being remote from the local facility;
 an access management means in communication with said database, for supplying event information to said database;
 a vehicle detecting means in communication with said database, for supplying event information to said database; and
 an alert means in communication with said database, using said event information;
 at least one intercom in communication with said remote facility and having an output signal indicating use;
 said remote processor receiving said output signal of said at least one intercom and adding date/time information for storage in said database as event information;
 wherein said local facility comprises:
 a plurality of local readers;
 a plurality of local cameras;
 at least one local payment device;
 a backup system in event of failure of communication with said remote processor;
 at least one local portal,
 at least one operator for operating a barrier associated with said at least one local portal; and
 at least one local sensor;
 whereby said computer uses the event information supplied to said database to compile an event library.

12. A virtual attendant management system for facility as claimed in claim 11, wherein said event information is used to generate alerts, compile reports, and control access to and egress from the facility.

* * * * *